US 009854386B2

(12) United States Patent
Karp

(10) Patent No.: US 9,854,386 B2
(45) Date of Patent: Dec. 26, 2017

(54) METHODS AND APPARATUS FOR USING SMART ENVIRONMENT DEVICES VIA APPLICATION PROGRAM INTERFACES

(71) Applicant: Google Inc., Mountain View, CA (US)

(72) Inventor: Igor Karp, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/722,012

(22) Filed: May 26, 2015

(65) Prior Publication Data

US 2015/0372833 A1 Dec. 24, 2015

Related U.S. Application Data

(60) Provisional application No. 62/016,052, filed on Jun. 23, 2014.

(51) Int. Cl.
*G06F 15/16* (2006.01)
*H04W 4/00* (2009.01)
(Continued)

(52) U.S. Cl.
CPC ............ *H04W 4/008* (2013.01); *G05B 13/04* (2013.01); *G05B 15/02* (2013.01); *G05D 23/1904* (2013.01); *G05D 23/1917* (2013.01); *G06F 9/54* (2013.01); *G06F 9/541* (2013.01); *G06F 9/546* (2013.01); *G08B 17/10* (2013.01); *H04L 12/282* (2013.01); *H04L 12/2816* (2013.01); *H04L 12/2818* (2013.01); *H04L 12/2823* (2013.01); *H04L 12/2829* (2013.01); *H04L 67/1097* (2013.01); *H04L 67/12* (2013.01);
(Continued)

(58) Field of Classification Search
CPC .......................... H04W 4/005; H04L 12/2803
USPC .............................................. 709/217; 706/4
See application file for complete search history.

(56) References Cited

U.S. PATENT DOCUMENTS 5,903,455 A    5/1999  Sharpe, Jr. et al.
6,349,883 B1   2/2002  Simmons et al.
(Continued)

OTHER PUBLICATIONS

International Search Report and Written Opinion for PCT Application No. PCT/US2015/037215 dated Oct. 9, 2015; 10 pgs.
(Continued)

*Primary Examiner* — Alicia Baturay
(74) *Attorney, Agent, or Firm* — Colby Nipper

(57) ABSTRACT

Systems and Methods disclosed herein relate to provisioning vendor information to associate vendor data access rights, vendor data writing rights, or both, of a data model comprising information related to one or more smart-devices, one or more smart-device environment structures comprising the one or more smart-devices, or any combination thereof with the vendor; provisioning a particular electronic device type of the vendor by providing information about the particular electronic device type to a service that interprets this information to understand subsequent data submissions of the particular electronic device, wherein the provisioning of the particular electronic device is associated with the vendor; pairing the particular electronic device with a system hosting the data model by registering the particular electronic device with the system hosting the data model; and sending the subsequent data submissions from the one or more smart-devices to the service.

20 Claims, 13 Drawing Sheets

(51) Int. Cl.

| | | |
|---|---|---|
| *G05B 15/02* | (2006.01) | |
| *G05D 23/19* | (2006.01) | |
| *G06F 9/54* | (2006.01) | |
| *H04L 12/28* | (2006.01) | |
| *G05B 13/04* | (2006.01) | |
| *G08B 17/10* | (2006.01) | |
| *H04L 29/08* | (2006.01) | |
| *H04M 1/725* | (2006.01) | |
| *H04L 29/06* | (2006.01) | |

(52) U.S. Cl.
CPC .............. *H04L 67/22* (2013.01); *H04L 67/42* (2013.01); *H04M 1/72533* (2013.01); *H04W 4/003* (2013.01); *G05B 2219/2642* (2013.01); *H04L 29/06047* (2013.01); *H04L 63/08* (2013.01); *H04L 2012/285* (2013.01); *H04L 2012/2841* (2013.01)

(56) References Cited

U.S. PATENT DOCUMENTS

| | | | |
|---|---|---|---|
| 6,993,658 | B1 | 1/2006 | Engberg et al. |
| 7,904,209 | B2 | 3/2011 | Podgorny et al. |
| 8,718,826 | B2 | 5/2014 | Ramachandran et al. |
| 8,843,935 | B2* | 9/2014 | Hegdal .............. G06F 11/0712 709/224 |
| 8,862,096 | B1* | 10/2014 | Viswanathan .......... H04L 29/06 455/410 |
| 9,154,303 | B1 | 10/2015 | Saylor |
| 9,191,771 | B2* | 11/2015 | Viswanathan ........ H04W 4/001 |
| 9,491,571 | B2 | 11/2016 | Karp et al. |
| 9,532,094 | B2 | 12/2016 | Karp et al. |
| 9,668,085 | B2 | 5/2017 | Pi-Sunyer |
| 9,788,039 | B2 | 10/2017 | Karp et al. |
| 2001/0034754 | A1 | 10/2001 | Elwahab et al. |
| 2002/0023258 | A1 | 2/2002 | Elwahab et al. |
| 2003/0041107 | A1* | 2/2003 | Blattner ................. G06Q 10/10 709/204 |
| 2003/0044017 | A1 | 3/2003 | Briscoe |
| 2003/0208527 | A1 | 11/2003 | Lglesais et al. |
| 2004/0019900 | A1* | 1/2004 | Knightbridge ..... G06Q 30/0207 725/23 |
| 2004/0111499 | A1 | 6/2004 | Dobrowski et al. |
| 2004/0137891 | A1* | 7/2004 | Clark ................... G06Q 30/02 455/418 |
| 2004/0138961 | A1* | 7/2004 | Clark ............... G06F 17/30905 705/26.1 |
| 2004/0139119 | A1* | 7/2004 | Clark ................... G06Q 10/02 |
| 2004/0139120 | A1* | 7/2004 | Clark ................... G06Q 10/02 |
| 2004/0142683 | A1* | 7/2004 | Clark ................... H04M 15/68 455/418 |
| 2005/0119794 | A1 | 6/2005 | Amundson et al. |
| 2005/0140574 | A1 | 6/2005 | Tamura |
| 2005/0188402 | A1 | 8/2005 | de Andrade et al. |
| 2005/0280704 | A1 | 12/2005 | Clare et al. |
| 2006/0053164 | A1 | 3/2006 | Ewing et al. |
| 2006/0080408 | A1 | 4/2006 | Istvan et al. |
| 2006/0271911 | A1 | 11/2006 | Palapudi et al. |
| 2007/0043478 | A1 | 2/2007 | Ehlers et al. |
| 2007/0293264 | A1* | 12/2007 | Marsh ................... G06Q 50/10 455/552.1 |
| 2008/0077867 | A1 | 3/2008 | Hake et al. |
| 2008/0090617 | A1 | 4/2008 | Sutardja |
| 2008/0209491 | A1 | 8/2008 | Hasek |
| 2008/0262822 | A1* | 10/2008 | Hardwick .......... G06F 11/3414 703/21 |
| 2009/0249428 | A1 | 10/2009 | White et al. |
| 2010/0131618 | A1* | 5/2010 | Brewis ............... H04L 41/0806 709/220 |
| 2010/0131619 | A1* | 5/2010 | Brewis ............... H04L 41/0806 709/220 |
| 2010/0131622 | A1* | 5/2010 | Brewis ............... H04L 67/303 709/221 |
| 2010/0131652 | A1* | 5/2010 | Brewis ............... H04L 41/0879 709/227 |
| 2010/0217837 | A1 | 8/2010 | Ansari et al. |
| 2011/0015802 | A1 | 1/2011 | Imes |
| 2011/0046805 | A1 | 2/2011 | Bedros et al. |
| 2011/0082574 | A1 | 4/2011 | Pachet et al. |
| 2011/0119317 | A1 | 5/2011 | Kazoun et al. |
| 2011/0131304 | A1* | 6/2011 | Henson ................. G06F 3/0607 709/222 |
| 2011/0131384 | A1* | 6/2011 | Henson ................. G06F 3/0605 711/154 |
| 2011/0202185 | A1 | 8/2011 | Imes et al. |
| 2011/0238978 | A1 | 9/2011 | Majumdar et al. |
| 2011/0269465 | A1 | 11/2011 | Xu et al. |
| 2011/0276396 | A1 | 11/2011 | Rathod |
| 2011/0289113 | A1* | 11/2011 | Arling ................... G08C 17/02 707/769 |
| 2011/0290893 | A1 | 12/2011 | Steinberg |
| 2011/0314163 | A1* | 12/2011 | Borins ................. H04W 4/005 709/227 |
| 2012/0016524 | A1 | 1/2012 | Spicer et al. |
| 2012/0172027 | A1 | 7/2012 | Partheesh et al. |
| 2012/0179547 | A1 | 7/2012 | Besore et al. |
| 2012/0305661 | A1 | 12/2012 | Malchiondo et al. |
| 2013/0073094 | A1 | 3/2013 | Knapton et al. |
| 2013/0328663 | A1 | 12/2013 | Ordaz |
| 2014/0047368 | A1 | 2/2014 | Yang et al. |
| 2014/0058567 | A1 | 2/2014 | Matsuoka et al. |
| 2014/0082702 | A1* | 3/2014 | Supalla ................ H04L 63/10 726/4 |
| 2014/0201256 | A1* | 7/2014 | Pinheiro ........... H04M 1/72533 709/201 |
| 2014/0206326 | A1 | 7/2014 | Hodges et al. |
| 2014/0222862 | A1* | 8/2014 | Arling ............... G06F 17/30477 707/769 |
| 2014/0309788 | A1 | 10/2014 | Blum |
| 2014/0337879 | A1* | 11/2014 | Arling ................ H04N 21/812 725/32 |
| 2014/0351870 | A1 | 11/2014 | Amine et al. |
| 2014/0359602 | A1* | 12/2014 | Sawaya ..................... G06F 8/62 717/176 |
| 2015/0098455 | A1* | 4/2015 | Fritsch ............... H04L 12/2816 370/338 |
| 2015/0227118 | A1* | 8/2015 | Wong ..................... G05B 15/02 700/44 |
| 2015/0236913 | A1* | 8/2015 | Nakano ................. H04L 67/10 709/223 |
| 2015/0279183 | A1* | 10/2015 | Kobayashi ........... G08B 15/001 455/404.1 |
| 2015/0334165 | A1* | 11/2015 | Arling ..................... G05B 15/02 717/177 |
| 2015/0370615 | A1 | 12/2015 | Pi-Sunyer |
| 2015/0370621 | A1 | 12/2015 | Karp et al. |
| 2015/0372832 | A1 | 12/2015 | Kortz et al. |
| 2015/0372834 | A1 | 12/2015 | Karp |
| 2015/0373149 | A1 | 12/2015 | Lyons |
| 2016/0134932 | A1 | 5/2016 | Karp et al. |
| 2016/0142758 | A1 | 5/2016 | Karp et al. |
| 2016/0261425 | A1 | 9/2016 | Horton et al. |
| 2016/0297479 | A1 | 10/2016 | Ritschel et al. |
| 2017/0118499 | A1 | 4/2017 | Karp et al. |

OTHER PUBLICATIONS

"Advisory Action", U.S. Appl. No. 14/531,805, dated Oct. 14, 2015, 3 pages.

"Final Office Action", U.S. Appl. No. 14/531,805, dated Jul. 31, 2015, 13 pages.

"Final Office Action", U.S. Appl. No. 14/531,805, dated Dec. 29, 2016, 17 pages.

"Final Office Action", U.S. Appl. No. 14/577,635, dated Jan. 23, 2017, 44 pages.

"Final Office Action", U.S. Appl. No. 14/722,023, dated Sep. 19, 2016, 15 pages.

"Final Office Action", U.S. Appl. No. 14/987,679, dated Feb. 13, 2017, 25 pages.

(56) References Cited

OTHER PUBLICATIONS

"First Action Interview Office Action", U.S. Appl. No. 14/531,805, dated Apr. 6, 2015, 4 pages.
"First Action Interview Office Action", U.S. Appl. No. 14/722,034, dated Jul. 21, 2016, 3 pages.
"First Action Interview Office Action", U.S. Appl. No. 14/722,003, dated Feb. 24, 2016, 5 pages.
"First Action Interview Office Action", U.S. Appl. No. 14/722,023, dated Apr. 21, 2016, 5 pages.
"First Action Interview Office Action", U.S. Appl. No. 14/988,278, dated Jun. 7, 2016, 3 pages.
"Non-Final Office Action", U.S. Appl. No. 14/531,805, dated Jun. 23, 2016, 16 pages.
"Non-Final Office Action", U.S. Appl. No. 14/577,635, dated Jul. 5, 2016, 32 pages.
"Non-Final Office Action", U.S. Appl. No. 14/722,034, dated Jan. 12, 2017, 17 pages.
"Non-Final Office Action", U.S. Appl. No. 14/987,679, dated Jun. 2, 2016, 22 pages.
"Notice of Allowance", U.S. Appl. No. 14/722,003, dated Jun. 23, 2016, 7 pages.
"Notice of Allowance", U.S. Appl. No. 14/722,023, dated Feb. 23, 2017, 10 pages.
"Notice of Allowance", U.S. Appl. No. 14/722,032, dated Nov. 21, 2016, 7 pages.
"Notice of Allowance", U.S. Appl. No. 14/988,278, dated Oct. 3, 2016, 7 pages.
"Pre-Interview Communication", U.S. Appl. No. 14/988,278, dated Mar. 10, 2016, 3 pages.
"Pre-interview First Office Action", U.S. Appl. No. 14/531,805, dated Feb. 10, 2015, 4 pages.
"Pre-interview First Office Action", U.S. Appl. No. 14/722,003, dated Nov. 3, 2015, 4 pages.
"Pre-interview First Office Action", U.S. Appl. No. 14/722,023, dated Dec. 14, 2015, 4 pages.
"Pre-interview First Office Action", U.S. Appl. No. 14/722,032, dated Mar. 11, 2016, 4 pages.
"Pre-interview First Office Action", U.S. Appl. No. 14/722,034, dated Mar. 21, 2016, 4 pages.
"Final Office Action", U.S. Appl. No. 14/722,034, dated Apr. 18, 2017, 16 pages.
"International Preliminary Report on Patentability", Application No. PCT/US2015/037215, dated Jan. 5, 2017, 8 pages.
"Notice of Allowance", U.S. Appl. No. 14/987,679, dated Jun. 1, 2017, 7 pages.
"Notice of Allowance", U.S. Appl. No. 14/722,032, dated Mar. 28, 2017, 8 pages.
"Advisory Action", U.S. Appl. No. 14/722,034, Sep. 1, 2017, 3 pages.
"Non-Final Office Action", U.S. Appl. No. 14/531,805, Jun. 30, 2017, 12 pages.
"Non-Final Office Action", U.S. Appl. No. 14/577,635, Jul. 26, 2017, 47 pages.
"Notice of Allowance", U.S. Appl. No. 14/722,023, Jul. 25, 2017, 10 pages.
"Final Office Action", U.S. Appl. No. 14/531,805, Oct. 20, 2017, 13 pages.
"Final Office Action", U.S. Appl. No. 14/722,034, Oct. 30, 2017, 15 pages.

\* cited by examiner

US 9,854,386 B2

METHODS AND APPARATUS FOR USING SMART ENVIRONMENT DEVICES VIA APPLICATION PROGRAM INTERFACES

CROSS REFERENCE TO RELATED APPLICATIONS

This application is a Non-Provisional application claiming priority to U.S. Provisional Patent Application No. 62/016,052, entitled "Methods and Apparatus for Exploiting Application Programming Interfaces to Smart Home Environment Electronic Components", filed Jun. 23, 2014, which is herein incorporated by reference. This application incorporates in their entirety co-pending U.S. patent application Ser. No. 14/722,003, Ser. No. 14/722,023, Ser. No. 14/722,026, Ser. No. 14/722,032, Ser. No. 14/722,034, entitled "METHODS AND APPARATUS FOR USING SMART ENVIRONMENT DEVICES VIA APPLICATION PROGRAM INTERFACES", filed May 26, 2015.

BACKGROUND

This disclosure relates to accessing data and/or controlling electronic devices (e.g., smart devices) via one or more application programming interfaces (APIs).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

People interact with a number of different electronic devices on a daily basis. In a home setting, for example, a person may interact with smart thermostats, lighting systems, alarm systems, entertainment systems, and a variety of other electronic devices. To interact with some of these electronic devices, a person may communicate a command using an application program running on another electronic device. For instance, a person may control the temperature setting on a smart thermostat using an application program running on a smartphone. The application program may communicate with a secure online service that interacts with that thermostat.

To preserve the user experience associated with an electronic device, the manufacturer of the electronic device may develop the application programs to control the electronic device. Opening access to the electronic devices to third party developers, however, may potentially improve the experience of some people with the devices—but only if third party application programs do not cause the electronic devices to behave in an undesirable manner. Accordingly, while it may be desirable to open access to the electronic devices to third party developers, it may also be desirable to place restrictions on that access so as to reduce the risk that the third party access may negatively impact the operation of the electronic devices and thus the user experience associated with those devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

According to embodiments of this disclosure, applications may access different installations of smart home devices (e.g., via an application programming interface (API)). Namely, the third party applications may communicate not directly with a smart home device, but rather through a device service. The device service may provide a corresponding update signal to the target smart home device based on one or more factors such as operation status parameters of the device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
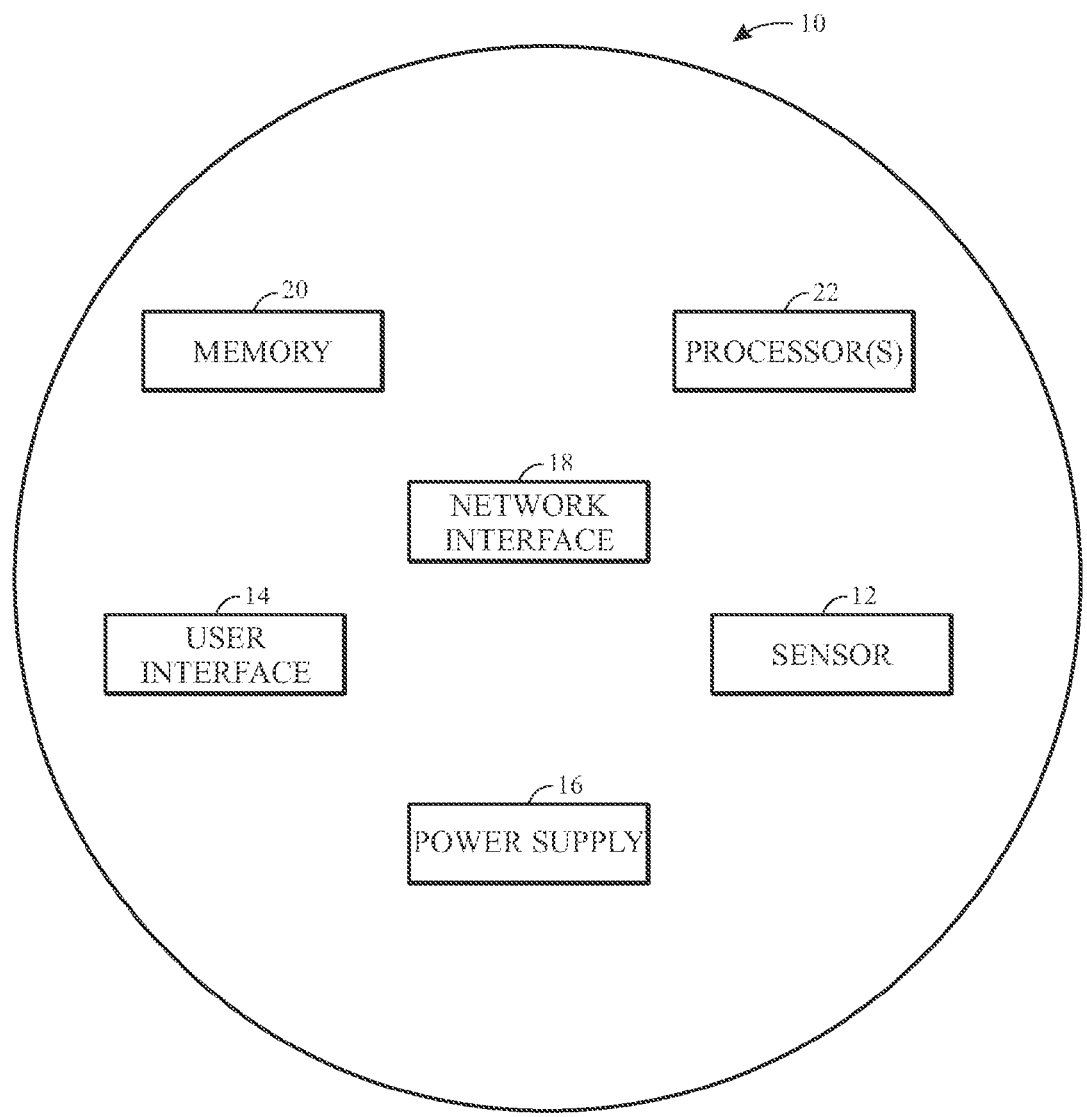
FIG. 1 is a block diagram of a smart home device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure relate to an electronic device, such as a thermostat or a hazard detector (e.g., smoke detector, carbon monoxide detector, etc.), that may be disposed in a building (e.g., home or office) such that the electronic device may detect the presence of a human being in the building and distinguish between the presence of a human being and a pet. Generally, the electronic device may employ a sensor, such as a passive infrared (PIR) sensor, to detect the presence of a human being. However, each PIR sensor may be inherently sensitive to different levels of noise. By accounting for the different sensitivity levels of each PIR sensor, the electronic device may improve its detection of human beings and better distinguish between the presence of human beings and pets.

Keeping this in mind, the electronic device may include a low-power processor that may store the sensor measurements acquired by the PIR sensor during a time period when the electronic device does not expect a human in the building or portion of the building being monitored by electronic device is not expected to have a human being present. In one embodiment, after storing the sensor measurements over some period of time, the low-power processor may send the stored sensor measurements to a high-power processor of the electronic device. The high-power processor may then calculate a threshold or adjust the previous threshold for determining a presence of a human based on the stored sensor measurements that correspond to the time period when a human being is likely not present in the building. The high-power processor may then send the newly calculated or the adjusted threshold to the low-power processor. The low-power processor may then use the newly calculated or the adjusted threshold to detect the presence of a human. Since the new threshold is calculated based on the respective sensor measurements for the respective PIR sensor of a respective electronic device, the new threshold may compensate for the inherent sensitivity characteristics of the respective PIR sensor. As a result, the electronic device may detect the presence of a human being more effectively and efficiently.

Smart Device in Smart Home Environment

By way of introduction, FIG. 1 illustrates an example of a general device 10 that may that may be disposed within a building environment. In one embodiment, the device 10 may include one or more sensors 12, a user-interface component 14, a power supply 16 (e.g., including a power connection and/or battery), a network interface 18, a high-power processor 20, a low-power processor 22, a passive infrared (PIR) sensor 24, a light source 26, and the like.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor, many embodiments may include multiple sensors. In some instances, the device 10 may include one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more user-interface components 14 in the device 10 may receive input from the user and/or present information to the user. The received input may be used to determine a setting. In certain embodiments, the user-interface components may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 14 or based on a displacement of a user-interface components 14 (e.g., adjusting a set point temperature by 1 degree F. for every 10° rotation of a rotatable-ring component). Physically and virtually movable user-interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component may be associated with a magnitude of a setting adjustment, such that a user may dramatically alter a setting with a large movement or finely tune a setting with a small movement.

The user-interface components 14 may also include one or more buttons (e.g., up and down buttons), a keypad, a number pad, a switch, a microphone, and/or a camera (e.g., to detect gestures). In one embodiment, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or an audio speaker.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices. As such, the network interface 18 may enable the device 10 to communicate with other devices 10 via a wired or wireless network. The network interface 18 may include a wireless card or some other transceiver connection to facilitate this communication.

The high-power processor 20 and the low-power processor 22 may support one or more of a variety of different device functionalities. As such, the high-power processor 20 and the low-power processor 22 may each include one or more processors configured and programmed to carry out and/or cause to be carried out one or more of the functionalities described herein. In one embodiment, the high-power processor 20 and the low-power processor 22 may include general-purpose processors carrying out computer code stored in local memory (e.g., flash memory, hard drive, and/or random access memory), special-purpose processors or application-specific integrated circuits, combinations thereof, and/or using other types of hardware/firmware/software processing platforms. In certain embodiments, the high-power processor 20 may execute computationally intensive operations such as operating the user-interface component 14 and the like. The low-power processor 22, on the other hand, may manage less complex processes such as detecting a hazard or temperature from the sensor 12. In one embodiment, the low-power processor may wake or initialize the high-power processor for computationally intensive processes.

By way of example, the high-power processor 20 and the low-power processor 22 may detect when a location (e.g., a house or room) is occupied (i.e., includes a presence of a human), up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an internet protocol (IP) address of a received signal, detecting operation of one or more devices within a time window, or the like. Moreover, the high-power processor 20 and the low-power processor 22 may include image recognition technology to identify particular occupants or objects.

In certain embodiments, the high-power processor 20 and the low-power processor 22 may detect the presence of a human using the PIR sensor 24. The PIR sensor 24 may be a passive infrared sensor that may measures infrared (IR) light radiating from objects in its field of view. As such, the PIR sensor 24 may detect the Infrared radiation emitted from an object.

In some instances, the high-power processor 20 may predict desirable settings and/or implement those settings. For example, based on the presence detection, the high-power processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the high-power processor 20 may initiate an audio or visual indicator of where the person, animal or object is or may initiate an alarm or security feature if an unrecognized person is detected under certain conditions (e.g., at night or when lights are off).

In some instances, devices may interact with each other such that events detected by a first device influence actions of a second device. For example, a first device can detect that a user has entered into a garage (e.g., by detecting motion in the garage, detecting a change in light in the garage or detecting opening of the garage door). The first device can transmit this information to a second device via the network interface 18, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

In addition to detecting various types of events, the device 10 may include a light source 26 that may illuminate when a living being, such as a human, is detected as approaching. The light source 26 may include any type of light source such as one or more light-emitting diodes or the like. The light source 26 may be communicatively coupled to the high-power processor 20 and the low-power processor 22, which may provide a signal to cause the light source 26 to illuminate.

Figure 2:
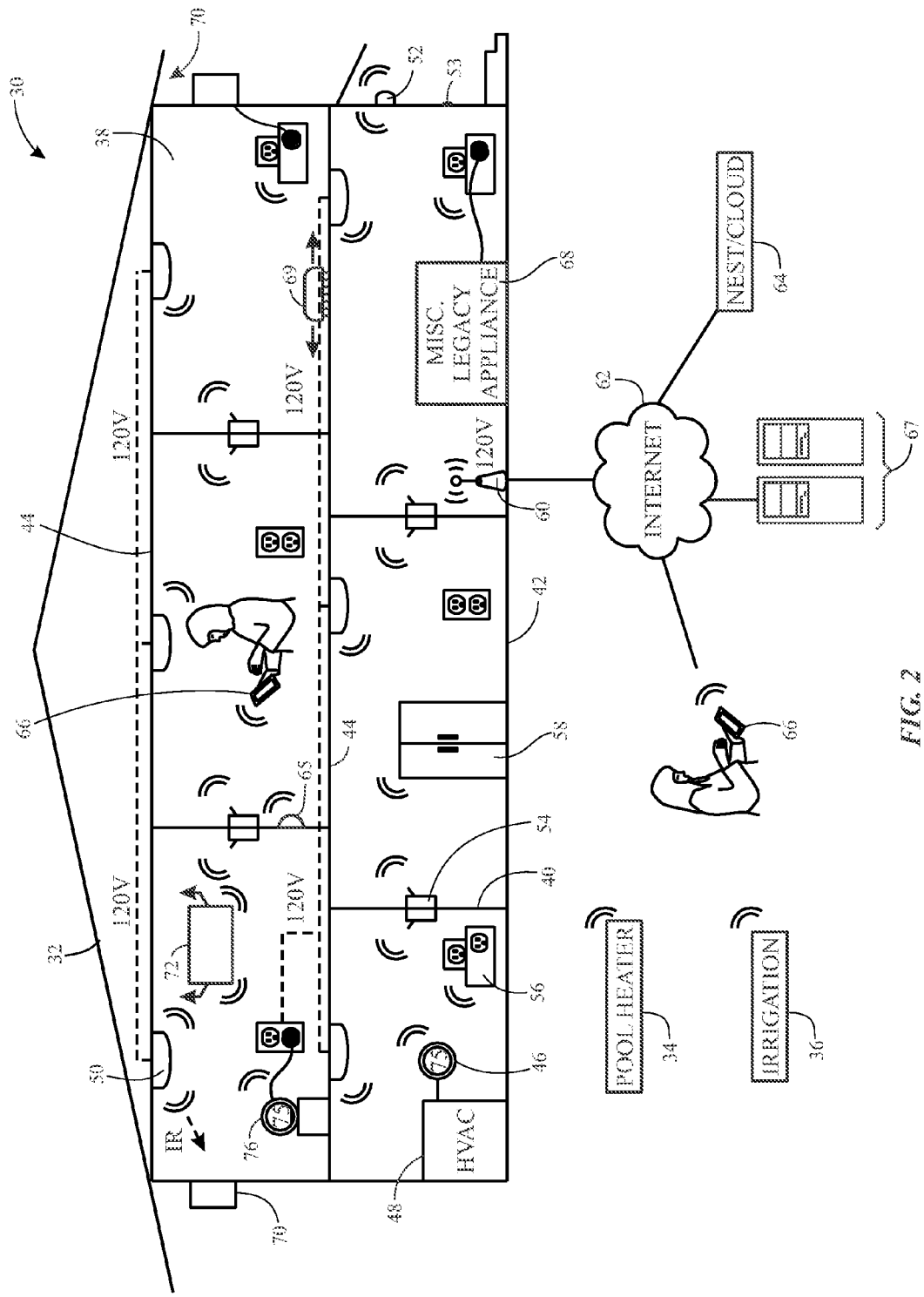
FIG. 2 is a block diagram of a connected smart home environment that includes a number of smart home devices, in accordance with an embodiment.

Keeping the foregoing in mind, FIG. 2 illustrates an example of a smart-home environment 30 within which one or more of the devices 10 of FIG. 1, methods, systems, services, and/or computer program products described further herein can be applicable. The depicted smart-home environment 30 includes a structure 32, which can include, e.g., a house, office building, garage, or mobile home. It will be appreciated that devices can also be integrated into a smart-home environment 30 that does not include an entire structure 32, such as an apartment, condominium, or office space. Further, the smart home environment can control and/or be coupled to devices outside of the actual structure 32. Indeed, several devices in the smart home environment need not physically be within the structure 32 at all. For example, a device controlling a pool heater or irrigation system can be located outside of the structure 32.

The depicted structure 32 includes a plurality of rooms 38, separated at least partly from each other via walls 40. The walls 40 can include interior walls or exterior walls. Each room can further include a floor 42 and a ceiling 44. Devices can be mounted on, integrated with and/or supported by a wall 40, floor 42 or ceiling 44.

In some embodiments, the smart-home environment 30 of FIG. 2 includes a plurality of devices 10, including intelligent, multi-sensing, network-connected devices, that can integrate seamlessly with each other and/or with a central server or a cloud-computing system to provide any of a variety of useful smart-home objectives. The smart-home environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), and one or more intelligent, multi-sensing, network-connected entryway interface devices 52 (hereinafter referred to as "smart doorbells 52"). According to embodiments, the smart thermostat 46 may include a Nest® Learning Thermostat—1st Generation T100577 or Nest® Learning Thermostat—2nd Generation T200577 by Nest Labs, Inc., among others. The smart thermostat 46 detects ambient climate characteristics (e.g., temperature and/or humidity) and controls a HVAC system 48 accordingly.

The smart hazard detector 50 may detect the presence of a hazardous substance or a substance indicative of a hazardous substance (e.g., smoke, fire, or carbon monoxide). The smart hazard detector 50 may include a Nest® Protect that may include sensors 12 such as smoke sensors, carbon monoxide sensors, and the like. As such, the hazard detector 50 may determine when smoke, fire, or carbon monoxide may be present within the building.

The smart doorbell 52 may detect a person's approach to or departure from a location (e.g., an outer door), control doorbell functionality, announce a person's approach or departure via audio or visual means, or control settings on a security system (e.g., to activate or deactivate the security system when occupants go and come). The smart doorbell 52 may interact with other devices 10 based on whether someone has approached or entered the smart-home environment 30.

In some embodiments, the smart-home environment 30 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control a power and/or dim state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some embodiments, the device 10 within the smart-home environment 30 may further includes a plurality of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 58 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-home environment 30 can further include a variety of partially communicating legacy appliances 70, such as infrared ("IR") controlled wall air conditioners or other IR-controlled devices, which can be controlled by IR signals provided by the smart hazard detectors 50 or the smart wall switches 54.

According to embodiments, the smart thermostats 46, the smart hazard detectors 50, the smart doorbells 52, the smart wall switches 54, the smart wall plugs 56, and other devices of the smart-home environment 30 are modular and can be incorporated into older and new houses. For example, the devices 10 are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors 12, processors 28, user interfaces 14, the power supply 16, the network interface 18, and other functional components of the devices described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a back room or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 30 may also include communication with devices outside of the physical home but within a proximate geographical range of the home. For example, the smart-home environment 30 may include a pool heater monitor 34 that communicates a current pool temperature to other devices within the smart-home environment 30 or receives commands for controlling the pool temperature. Similarly, the smart-home environment 30 may include an irrigation monitor 36 that communicates information regarding irrigation systems within the smart-home environment 30 and/or receives control information for controlling such irrigation systems. According to embodiments, an algorithm is provided for considering the geographic location of the smart-home environment 30, such as based on the zip code or geographic coordinates of the home. The geographic information is then used to obtain data helpful for determining optimal times for watering, such data may include sun location information, temperature, dewpoint, soil type of the land on which the home is located, etc.

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device (e.g., a smartphone) 66. A web page or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 30 using a network-connected computer or portable electronic device 66. In some examples, some or all of the occupants (e.g., individuals who live in the home) can register their device 66 with the smart-home environment 30. Such registration can be made at a central server to authenticate the occupant and/or the device as being associated with the home and to give permission to the occupant to use the device to control the smart devices in the home. An occupant can use their registered device 66 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 66, the smart-home environment 30 makes inferences about which individuals live in the home and are therefore occupants and which devices 66 are associated with those individuals. As such, the smart-home environment "learns" who is an occupant and permits the devices 66 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 30. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" for the thermostat, especially at night while the home is dark and others are sleeping. Further, the guest may not want to go through the hassle of downloading the necessary application to their device for remotely controlling the thermostat. In fact, the guest may not have the home owner's login credentials, etc., and therefore cannot remotely control the thermostat via such an application. Accordingly, according to embodiments of the invention, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 66. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques described in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat 46 and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 34, 36, 46, 50, 52, 54, 56, and 58 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 60. The smart devices can further communicate with each other via a connection to a network, such as the Internet 62. Through the Internet 62, the smart devices can communicate with a central server or a cloud-computing system 64. The central server or cloud-computing system 64 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 64 to devices (e.g., when available, when purchased, or at routine intervals).

According to embodiments, the smart devices combine to create a mesh network of spokesman and low-power nodes in the smart-home environment 30, where some of the smart devices are "spokesman" nodes and others are "low-powered" nodes. Some of the smart devices in the smart-home environment 30 are battery powered, while others have a regular and reliable power source, such as by connecting to wiring (e.g., to 120V line voltage wires) behind the walls 40 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 30 as well as with the central server or cloud-computing system 64. On the other hand, the devices that are battery powered are referred to as "low-power" nodes. These nodes tend to be smaller than spokesman nodes and can only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices in the smart-home environment 30, such as the spokesman nodes, cannot send information to these low-power nodes.

As described, the smart devices serve as low-power and spokesman nodes to create a mesh network in the smart-home environment 30. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 30. The spokesman nodes in the smart-home environment 30 are able to "drop down" to low-powered communication protocols to receive these messages, translate the messages to other communication protocols, and send the translated messages to other spokesman nodes and/or the central server or cloud-computing system 64. Thus, the low-powered nodes using low-power communication protocols are able to send messages across the entire smart-home environment 30 as well as over the Internet 62 to the central server or cloud-computing system 64. According to embodiments, the mesh network enables the central server or cloud-computing system 64 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 64 can communicate controls to the low-powered nodes. For example, a user can use the portable electronic device (e.g., a smartphone) 66 to send commands over the Internet 62 to the central server or cloud-computing system 64, which then relays the commands to the spokesman nodes in the smart-home environment 30. The spokesman nodes drop down to a low-power protocol to communicate the commands to the low-power nodes throughout the smart-home environment, as well as to other spokesman nodes that did not receive the commands directly from the central server or cloud-computing system 64.

An example of a low-power node is a smart night light 65. In addition to housing a light source, the smart night light 65 houses an occupancy sensor, such as an ultrasonic or passive IR sensor, and an ambient light sensor, such as a photoresistor or a single-pixel sensor that measures light in the room. In some embodiments, the smart night light 65 is configured to activate the light source when its ambient light sensor detects that the room is dark and when its occupancy sensor detects that someone is in the room. In other embodiments, the smart night light 65 is simply configured to activate the light source when its ambient light sensor detects that the room is dark. Further, according to embodiments, the smart night light 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 30 as well as over the Internet 62 to the central server or cloud-computing system 64.

Other examples of low-powered nodes include battery-operated versions of the smart hazard detectors 50. These smart hazard detectors 50 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 50 can send messages that correspond to each of the respective sensors to the other devices and the central server or cloud-computing system 64, such as by using the mesh network as described above.

Examples of spokesman nodes include smart thermostats 46, smart doorbells 52, smart wall switches 54, and smart wall plugs 56. These devices 46, 52, 54, and 56 are often located near and connected to a reliable power source, and therefore can include more power-consuming components, such as one or more communication chips capable of bidirectional communication in any variety of protocols.

In some embodiments, these low-powered and spokesman nodes (e.g., devices 46, 50, 52, 54, 56, 58, and 65) can function as "tripwires" for an alarm system in the smart-home environment. For example, in the event a perpetrator circumvents detection by alarm sensors located at windows, doors, and other entry points of the smart-home environment 30, the alarm could be triggered upon receiving an occupancy, motion, heat, sound, etc. message from one or more of the low-powered and spokesman nodes in the mesh network. For example, upon receiving a message from a smart night light 65 indicating the presence of a person, the central server or cloud-computing system 64 or some other device could trigger an alarm, provided the alarm is armed at the time of detection. Thus, the alarm system could be enhanced by various low-powered and spokesman nodes located throughout the smart-home environment 30. In this example, a user could enhance the security of the smart-home environment 30 by buying and installing extra smart nightlights 65. However, in a scenario where the perpetrator uses a radio transceiver to jam the wireless network, the devices 10 may be incapable of communicating with each other. Therefore, as discussed in detail below, the present techniques provide network communication jamming attack detection and notification solutions to such a problem.

In some embodiments, the mesh network can be used to automatically turn on and off lights as a person transitions from room to room. For example, the low-powered and spokesman nodes detect the person's movement through the smart-home environment and communicate corresponding messages through the mesh network. Using the messages that indicate which rooms are occupied, the central server or cloud-computing system 64 or some other device activates and deactivates the smart wall switches 54 to automatically provide light as the person moves from room to room in the smart-home environment 30. Further, users may provide pre-configuration information that indicates which smart wall plugs 56 provide power to lamps and other light sources, such as the smart night light 65. Alternatively, this mapping of light sources to wall plugs 56 can be done automatically (e.g., the smart wall plugs 56 detect when a light source is plugged into it, and it sends a corresponding message to the central server or cloud-computing system 64). Using this mapping information in combination with messages that indicate which rooms are occupied, the central server or cloud-computing system 64 or some other device activates and deactivates the smart wall plugs 56 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 30. For example, for each room in the house, the user provides a map of the best exit route. It should be appreciated that instead of a user providing this information, the central server or cloud-computing system 64 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 50 detects smoke and activates an alarm), the central server or cloud-computing system 64 or some other device uses occupancy information obtained from the low-powered and spokesman nodes to determine which rooms are occupied and then turns on lights (e.g., nightlights 65, wall switches 54, wall plugs 56 that power lamps, etc.) along the exit routes from the occupied rooms so as to provide emergency exit lighting.

Further included and illustrated in the smart-home environment 30 of FIG. 2 are service robots 69 each configured to carry out, in an autonomous manner, any of a variety of household tasks. For some embodiments, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 69 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 69 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 69 is configured to move itself into the immediate presence (e.g., within five feet) of a particular occupant who has settled into a particular location in the home (e.g. in the dining room to eat their breakfast and read the news). The localized-thermostat service robot 69 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 69 proceeds to move and park itself next to the couch and keep that particular immediate space at a comfortable temperature.

Technologies by which the localized-thermostat service robot 69 (and/or the larger smart-home system of FIG. 2) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 69 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 69 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 69, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 69 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 69 can be advised by other smart-home sensors that the temperature and humidity levels are rising in the kitchen, which is nearby to the occupant's current dining room location, and responsive to this advisory the hazard detector service robot 69 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 69 having respective dedicated ones of such functionalities, by a single service robot 69 having an integration of two or more different ones of such functionalities, and/or any combinations thereof (including the ability for a single service robot 69 to have both "away" and "human facing" functionalities) without departing from the scope of the present teachings. Electrical power can be provided by virtue of rechargeable batteries or other rechargeable methods, such as an out-of-the-way docking station to which the service robots 69 will automatically dock and recharge its batteries (if needed) during periods of inactivity. Preferably, each service robot 69 includes wireless communication components that facilitate data communications with one or more of the other wirelessly communicating smart-home sensors of FIG. 2 and/or with one or more other service robots 69 (e.g., using Wi-Fi, Zigbee, Z-Wave, 6LoWPAN, etc.), and one or more of the smart-home devices 10 can be in communication with a remote server over the Internet. Alternatively or in conjunction therewith, each service robot 69 can be configured to communicate directly with a remote server by virtue of cellular telephone communications, satellite communications, 3G/4G network data communications, or other direct communication method.

Provided according to some embodiments are systems and methods relating to the integration of the service robot(s) 69 with home security sensors and related functionalities of the smart home system. The embodiments are particularly applicable and advantageous when applied for those service robots 69 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 2) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 2. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 64 are used to provide a personal "smart alarm clock" for individual occupants of the home. For example, user-occupants can communicate with the central server or cloud-computing system 64 via their mobile devices 66 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 30 that happens to be closest to the occupant when the occupant falls asleep will be the device that transmits messages regarding when the occupant stopped moving, from which the central server or cloud-computing system 64 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 46 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 46 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 64 are used to detect or monitor the progress of Alzheimer's Disease. For example, the unique signatures of the occupants are used to track the individual occupants' movement throughout the smart-home environment 30. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 64 analyze the person's migration data collected by the mesh network of the smart-home environment to identify such patterns.

Figure 3:
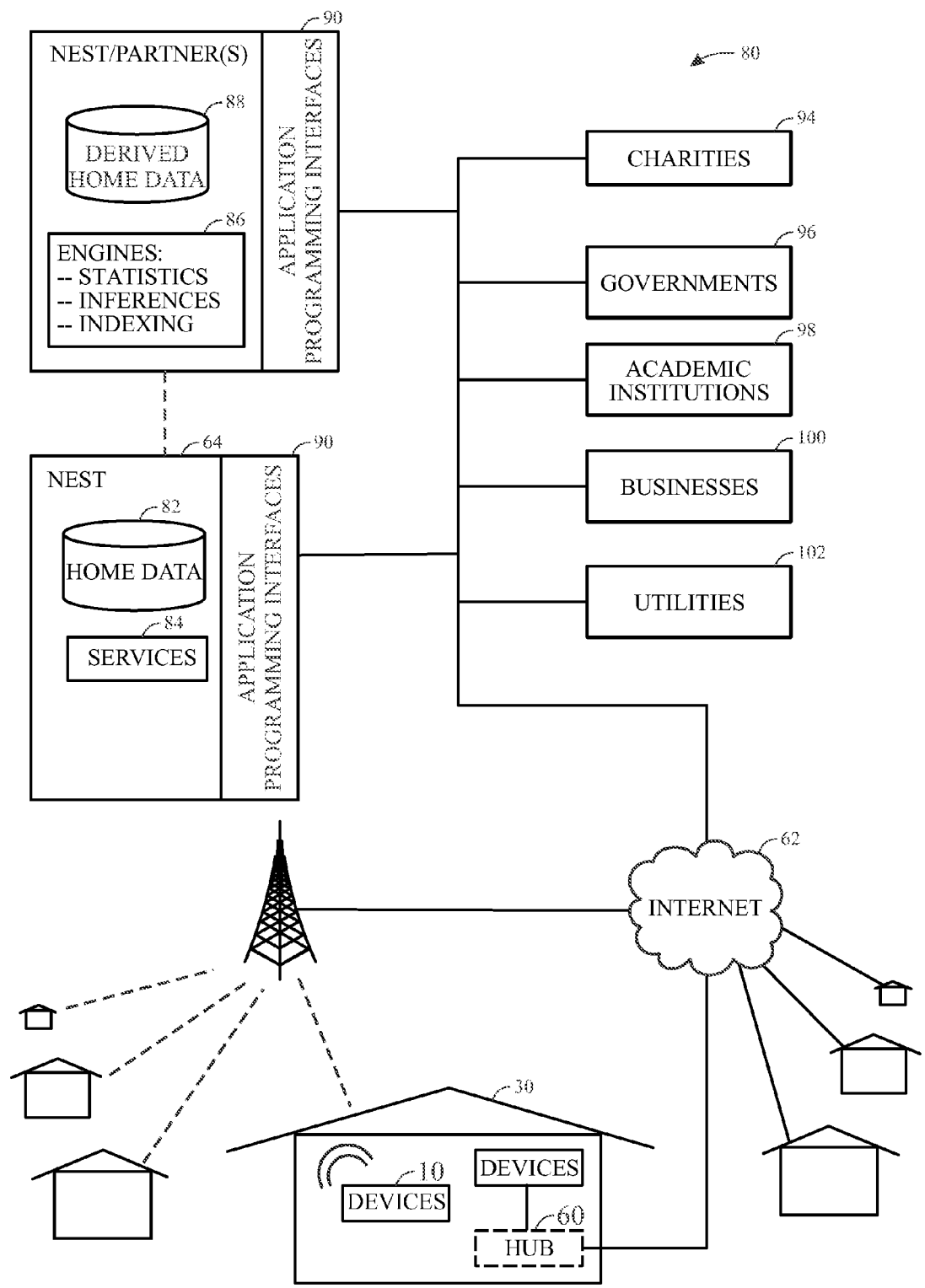
FIG. 3 is a block diagram illustrating a manner of controlling and/or accessing the smart home environment using services over the internet, in accordance with an embodiment.

In addition, FIG. 3 illustrates an embodiment of an extensible devices and services platform 80 that can be concentrated at a single server or distributed among several different computing entities without limitation with respect to the smart-home environment 30. The extensible devices and services platform 80 may include a processing engine 86, which may include engines that receive data from devices of smart-home environments (e.g., via the Internet or a hubbed network), to index the data, to analyze the data and/or to generate statistics based on the analysis or as part of the analysis. The analyzed data can be stored as derived home data 88.

Results of the analysis or statistics can thereafter be transmitted back to the device that provided home data used to derive the results, to other devices, to a server providing a web page to a user of the device, or to other non-device entities. For example, use statistics, use statistics relative to use of other devices, use patterns, and/or statistics summarizing sensor readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device usage across a population of devices and send the statistics to device users, service providers or other entities (e.g., that have requested or may have provided monetary compensation for the statistics).

According to some embodiments, the home data 82, the derived home data 88, and/or another data can be used to create "automated neighborhood safety networks." For example, in the event the central server or cloud-computing architecture 64 receives data indicating that a particular home has been broken into, is experiencing a fire, or some other type of emergency event, an alarm is sent to other smart homes in the "neighborhood." In some instances, the central server or cloud-computing architecture 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 64 makes inferences about water usage in the home and provides related services. For example, the central server or cloud-computing architecture 64 can run programs/algorithms that recognize what water sounds like and when it is running in the home. According to one embodiment, to map the various water sources of the home, upon detecting running water, the central server or cloud-computing architecture 64 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 64 to determine the "signature" or "fingerprint" of each water source in the home. This is sometimes referred to herein as "audio fingerprinting water usage."

In one illustrative example, the central server or cloud-computing architecture 64 creates a signature for the toilet in the master bathroom, and whenever that toilet is flushed, the central server or cloud-computing architecture 64 will know that the water usage at that time is associated with that toilet. Thus, the central server or cloud-computing architecture 64 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 64 makes inferences about pest-detection in the home and provides related services. For example, the central server or cloud-computing architecture 64 can run programs/algorithms that recognize what certain pests sound like, how they move, and/or the vibration they create, individually and/or collectively. According to one embodiment, the central server or cloud-computing architecture 64 can determine the "signatures" of particular types of pests.

For example, in the event the central server or cloud-computing architecture 64 detects sounds that may be associated with pests, it notifies the occupants of such sounds and suggests hiring a pest control company. If it is confirmed that pests are indeed present, the occupants input to the central server or cloud-computing architecture 64 confirms that its detection was correct, along with details regarding the identified pests, such as name, type, description, location, quantity, etc. This enables the central server or cloud-computing architecture 64 to "tune" itself for better detection and create "signatures" or "fingerprints" for specific types of pests. For example, the central server or cloud-computing architecture 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 64 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 100 (e.g., providing device warranties or service to related equipment, targeting advertisements based on home data), utility companies 102, and other third parties. The APIs 90 are coupled to and permit third party systems to communicate with the central server or the cloud-computing system 64, including the services 84, the processing engine 86, the home data 82, and the derived home data 88. For example, the APIs 90 allow applications executed by the third parties to initiate specific data processing tasks that are executed by the central server or the cloud-computing system 64, as well as to receive dynamic updates to the home data 82 and the derived home data 88.

For example, third parties can develop programs and/or applications, such as web or mobile apps that integrate with the central server or the cloud-computing system 64 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third party applications make inferences from the home data 82 and the derived home data 88, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 4:
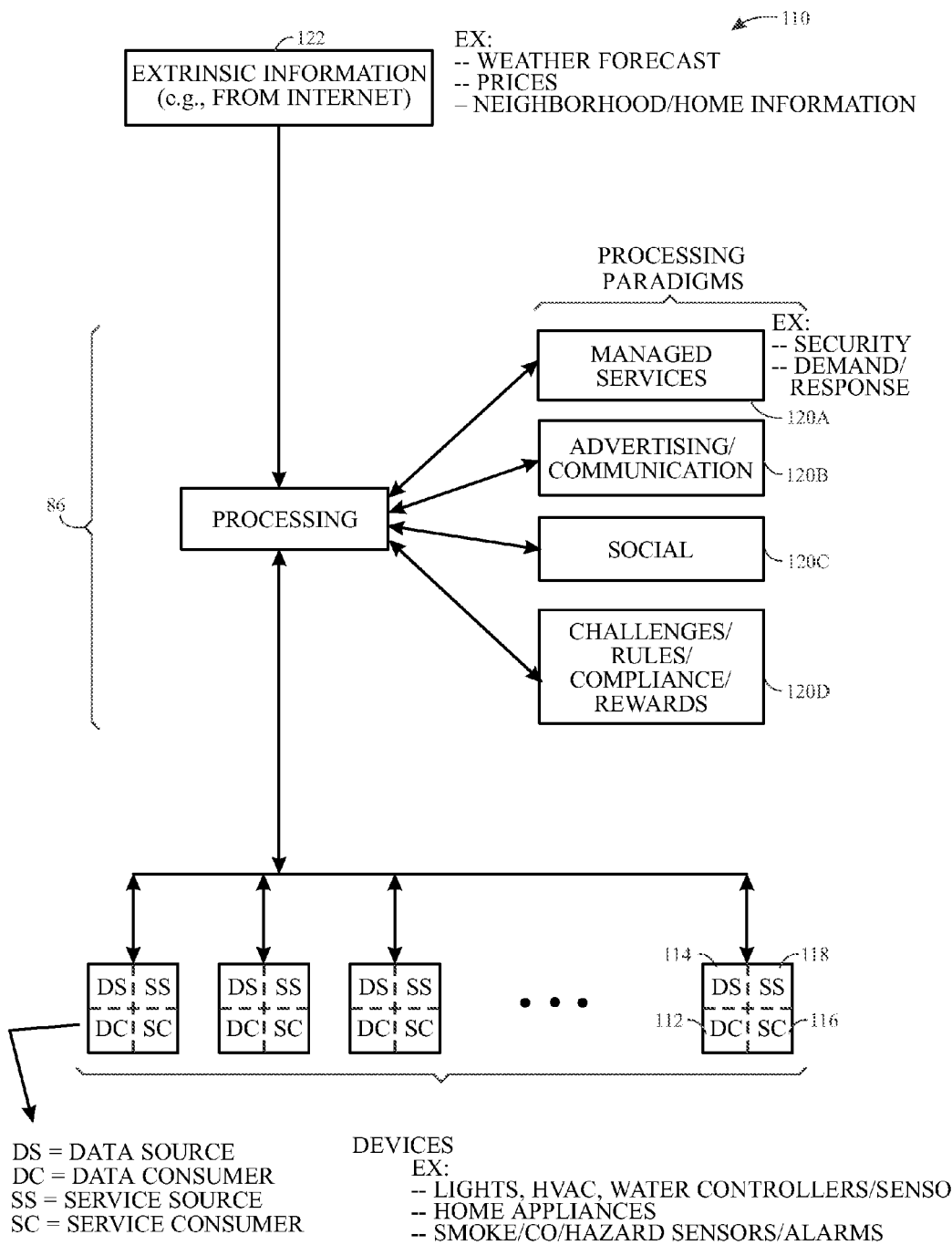
FIG. 4 is a block diagram of processing paradigms that may be used to control devices of the smart home environment, in accordance with an embodiment.

To further illustrate, FIG. 4 describes an abstracted functional view 110 of the extensible devices and services platform 80 of FIG. 3, with particular reference to the processing engine 86 as well as devices, such as those of the smart-home environment 30 of FIG. 2. Even though devices situated in smart-home environments will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices to achieve their local and immediate objectives, the extensible devices and services platform 80 can also be configured to harness the large amount of data that is flowing out of these devices. In addition to enhancing or optimizing the actual operation of the devices themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 86 as including a number of paradigms 120. Processing engine 86 can include a managed services paradigm 120*a* that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 86 can further include an advertising/communication paradigm 120*b* that estimates characteristics (e.g., demographic information), desires and/or products of interest of a user based on device usage. Services, promotions, products or upgrades can then be offered or automatically provided to the user. Processing engine 86 can further include a social paradigm 120*c* that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 46 to reduce their power bills.

The processing engine 86 can include a challenges/rules/compliance/rewards paradigm 120*d* that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-home environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 86 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

As previously discussed, the described extensible devices and services platform 80 may enable communicating emergency information between smart-home environments 30 that are linked and/or to the proper authorities. For example, when a burglar breaks into a smart-home environment 30, a home security system may trip and sound an alarm and/or send emergency notifications to the neighbors, the police, the security company, and the like. However, in instances where the break in is preceded by a jamming attack on the wireless network, the notifications may not be sent out if their transmission is dependent upon the wireless network. Thus, another means to communicate with external parties may be desired. As such, the techniques disclosed herein solve this problem by detecting the jamming attack and sending emergency notifications via side channels that are not dependent upon the wireless network.

API

Although programs, applications, and/or application services may be used to communicate requests or commands to the smart home devices 10, in some embodiments these may not be sent directly to the smart home devices 10. The following figures illustrate smart device communication and/or control via an application accessing an API.

Figure 5:
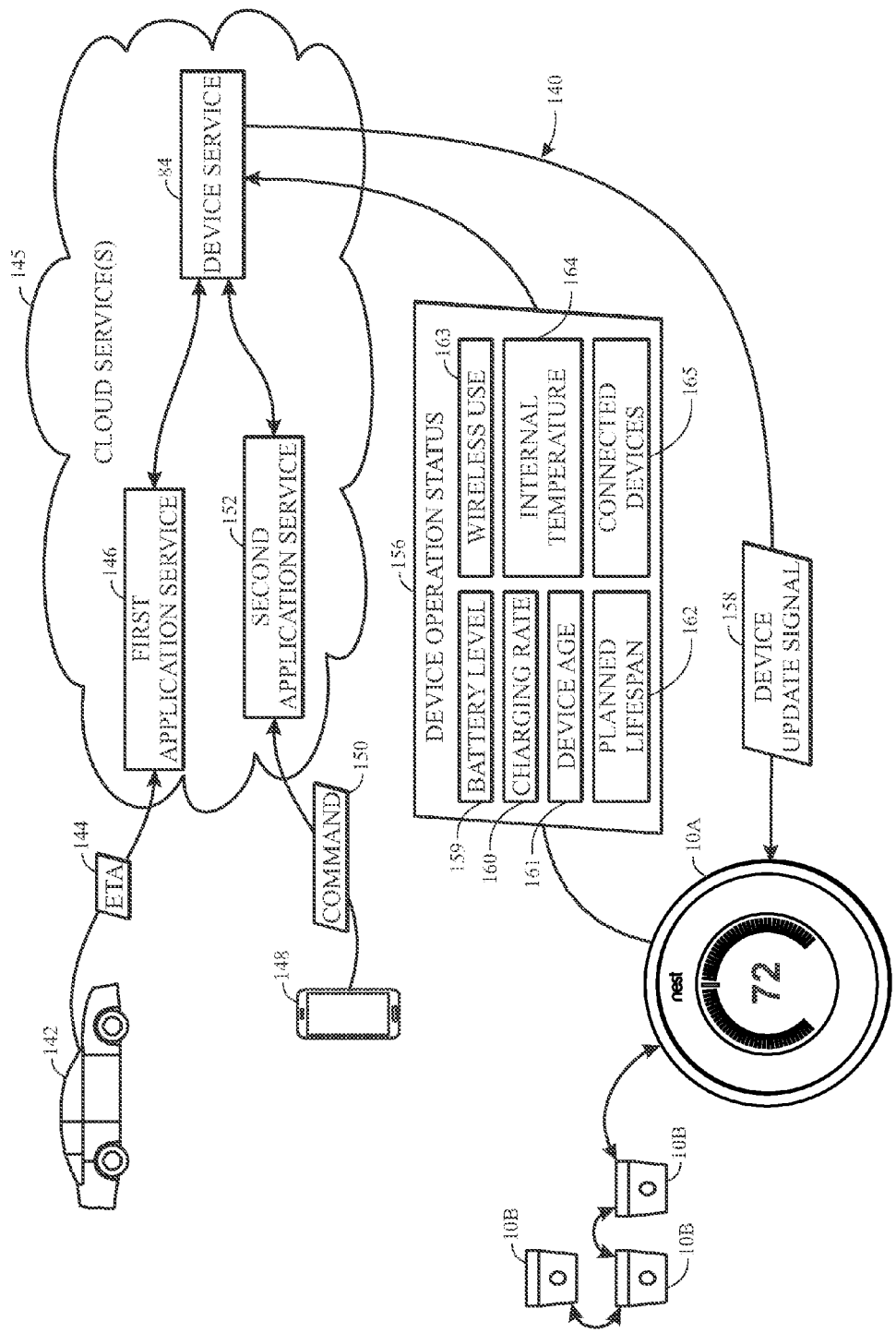
FIG. 5 is a block diagram of a system that provides access to smart home devices, in accordance with an embodiment.

For example, FIG. 5 illustrates a system 140 where an API may be used to access and/or control one or more smart devices. In the illustrated example, a person may desire to access a number of smart home devices 10, such as a first smart home device (e.g. thermostat 10A) and second smart home devices (e.g., Smoke and/or CO detector 10B). In the example of FIG. 5, the first smart home device 10A is an example of a smart thermostat, such as the Nest® Learning Thermostat by Nest Labs, Inc. (a company of Google Inc.), and the second smart home devices 10B are examples of smart hazard detectors, such as the Nest® Protect by Nest Labs, Inc. Two application programs are shown accessing the smart home devices 10A and/or 10B through the device service 84. Although FIG. 5 illustrates accessing the smart home devices 10A and/or 10B using two separate application programs, it should be appreciated that any suitable number of application programs may be used to access the smart home devices 10A and/or 10B.

In the example of FIG. 5, a first application 142 sends a first device request message 144 targeted to a smart home device 10 (e.g., the smart home device 10A) into cloud service(s) 145 and, more specifically, to a first application service 146. A second application 148 may be used to issue a second device request message 150 targeted to a smart home device 10 (e.g., the smart home device 10A) to a second application service 152 also among the cloud service(s) 145. In the example shown, the first application 142 is a navigation application that sends estimated-time-of-arrival (ETA) information in the device request messages 144. By sending a number of ETA messages as the device request messages 144, the first application 142 may be used to cause the smart home devices 10A and/or 10B to be prepared when a person arrives home. Thus, as an example, the first application 142 may send occasional device request messages 144 indicating the ETA to the first application service 146, which may forward this information to the device service 84 (e.g., via an API, as discussed above). The device service 84 may hold the device request messages 144 from the first application 142 until an appropriate time. In the illustrated example, the second application 148 may be a third party home-automation application that may be running on a portable electronic device, such as a personal mobile device. The second application 148 may generate device request messages 150, such as commands to control or request information from the smart home devices 10A and/or 10B. The second application service 152 may interface with the device service 84 by way of an API, as mentioned above.

Although the first application service 146, the second application service 152, and the device service 84 are illustrated in FIG. 5 as cloud service(s) 145, it may appreciated that some or all of these services may run on electronic devices that are not remote cloud-computer systems accessible by way of the Internet. Indeed, in some examples, the device service 84 may not be on a network that is remote from the smart home devices 10A and/or 10B, but rather may be running on an electronic device in the same local area network as the smart home devices 10A and/or 10B. For example, the device service 84 may, additionally or alternatively, run on a local server computer and/or a local wireless router on the same local area network as the smart home devices 10A and/or 10B. Moreover, some applications may communicate directly with the device service 84 (e.g., via the API) without first communicating with an application service such as the first application service 146 or the second application service 152.

Regardless of the number of applications that may issue device request messages (e.g., 144 or 150) to the device service 84, the device service 84 may not merely forward these messages to the smart home devices 10A and/or 10B that the device request messages are targeted too. Rather, the device service 84 may serve as the point of contact that application programs may use to access the smart home devices 10A and/or 10B. The device service 84 then may communicate information and/or commands provided by the applications to the smart home devices 10A and/or 10B, enabling coordination between the applications and the devices 10A and/or 10B.

In some embodiments, to enable additional functionalities in the applications (e.g., first application 142 and/or second application 148), the smart home devices 10A and/or 10B may occasionally transmit device operation status parameters 156 or other data based on the device operation status parameters 156 through the device service 84 and the proper application service (e.g., first application service 146 and/or second application service 152) to the proper applications (e.g., first application 142 and/or second application 148).

The device operation status parameters 156 may represent any suitable characteristics of the operation status of the smart home devices 10A and/or 10B that may affect the proper functioning of the smart home devices 10A and/or 10B. Thus, the device operation status parameters 156 may include, for example: a battery level 159 indicative of an amount of charge remaining in a battery of the smart home device; a charging rate 160 indicative of a current rate that the battery of the smart home device is charging; a current device age 161 indicative of a period of use since initial install, a period of use since manufacture, a period of use since original sale, etc.; a planned lifespan 162 indicative of an expected useful operational duration of the smart home device; an amount of recent wireless use 163 (selected within a timespan recent enough to substantially affect an internal temperature of the smart home device 10); a direct measurement of an internal device temperature 164; and/or device operation status parameters for connected devices 165. The operational status parameters for connected devices 165 may represent any suitable operational parameters that may describe the smart home devices 10 (e.g., smart home device 10A) through which the device service 84 may use to connect to a target smart home device 10 (e.g., one of the smart home devices 10B). For example, regarding the operational status parameters for connected devices 165, if the target smart home device 10 is the last smart home device 10B through three smart home devices 10 in three communication "hops", the device operation status parameters 156 associated with these three intervening smart home devices 10 may be included.

The various specific device operation status parameters 156 shown in FIG. 5 are provided by way of example. As such, the device operation status parameters 156 shown in FIG. 5 should not be understood to be exhaustive, but merely representative of possible operational parameters that may be considered for API-accessing applications. For example, additional device operation status parameters may include current state of the device (e.g., sleeping, awake, Wifi active/inactive, executing a demand-response algorithm, executing a time-to-temperature algorithm, etc.).

The smart thermostat 10A and/or detector 10B may include a basic set of identifying information, such as: a user-defined device name, physical location in the structure, locale, software version and containing structure. The data model also exposes thermostat capabilities, such as whether the HVAC system can heat or cool, or has a fan. Further, the thermostat 10A may include three states related to presence: home, away or auto-away. In some embodiments, the API 90 may not expose the thermostat state, but may depend on this state when using thermostat mode to set target temperature. Thermostat 10A mode may have three "on" states (heat, cool, heat-cool) and one "off" state. The most common may be "on" (home). In this mode the thermostat 10A will try to keep the structure at a target temperature. A thermostat 10A can also be in away mode, which is entered when no motion is sensed in the house or when the user explicitly sets the structure to away. In this mode, it will activate the HVAC system if the temperature moves outside the defined "away" temperature range. The thermostat 10A may also be set to "off". In this mode it will only activate the HVAC system if the temperature moves outside a defined safety temperature range.

In some embodiments, target temperature, the desired temperature, typically set by the user may be modified using the API 90. From the API 90, applications can write the target temperature as part of a larger process.

For example, the applications may use the device operation status parameters 156 or data to affect subsequent interactions (e.g., via messages 144 or 150) that are transmitted to the smart home devices 10A and/or 10B. The device operation status parameters 156 may correspond only to a target smart home device 10 (e.g., the smart home device 10A), or may correspond to other smart home devices 10 that are in the vicinity of the target smart home device 10 (e.g., the smart home device 10A and the smart home devices 10B). In one example, when the target smart home device 10 for the device request messages 144 and/or 150 are the smart home device 10A, the device operation status parameters 156 may correspond substantially only to the smart home device 10A. In another example, when the target smart home device 10 is one of the smart home devices 10B, which is accessible by way of the smart home device 10A, the device operation status parameters 156 may contain operational parameter information about both the smart home device 10A and the smart home device 10B.

The second application 148 may include voice actions. For example, a user input to the second application 148 may be an audible cue to "Set [brand(e.g.'nest')|thermostat|temperature] to [nn] degrees." The second application 148 may convert this into messages that ultimately become commands to transition the desired temperature of the thermostat 10A.

Further, an audible queue might be to "Turn on the heat." In such a scenario, the commands provided to the thermostat 10A would set the thermostat one degree Celsius above the current ambient temperature. If the thermostat 10A is in range mode, both the low and high points are raised one degree Celsius.

Additionally, an audible queue might be to "Turn on the [air conditioning|cooling|a.c.]." In such a scenario, the commands provided to the thermostat 10A would set the thermostat one degree Celsius lower the current ambient temperature. If the thermostat 10A is in range mode, both the low and high points are lowered one degree Celsius.

In some embodiments, an audible queue might be to "set [brand(e.g.'nest')|thermostat] to away." In such a scenario, the commands provided to the thermostat 10A would change the mode of the thermostat 10A to "AWAY." When the audible queue is "set [brand(e.g.'nest')|thermostat] to home," the commands provided to the thermostat 10A would change the mode of the thermostat 10A to "HOME."

i. Architecture

Figure 6:
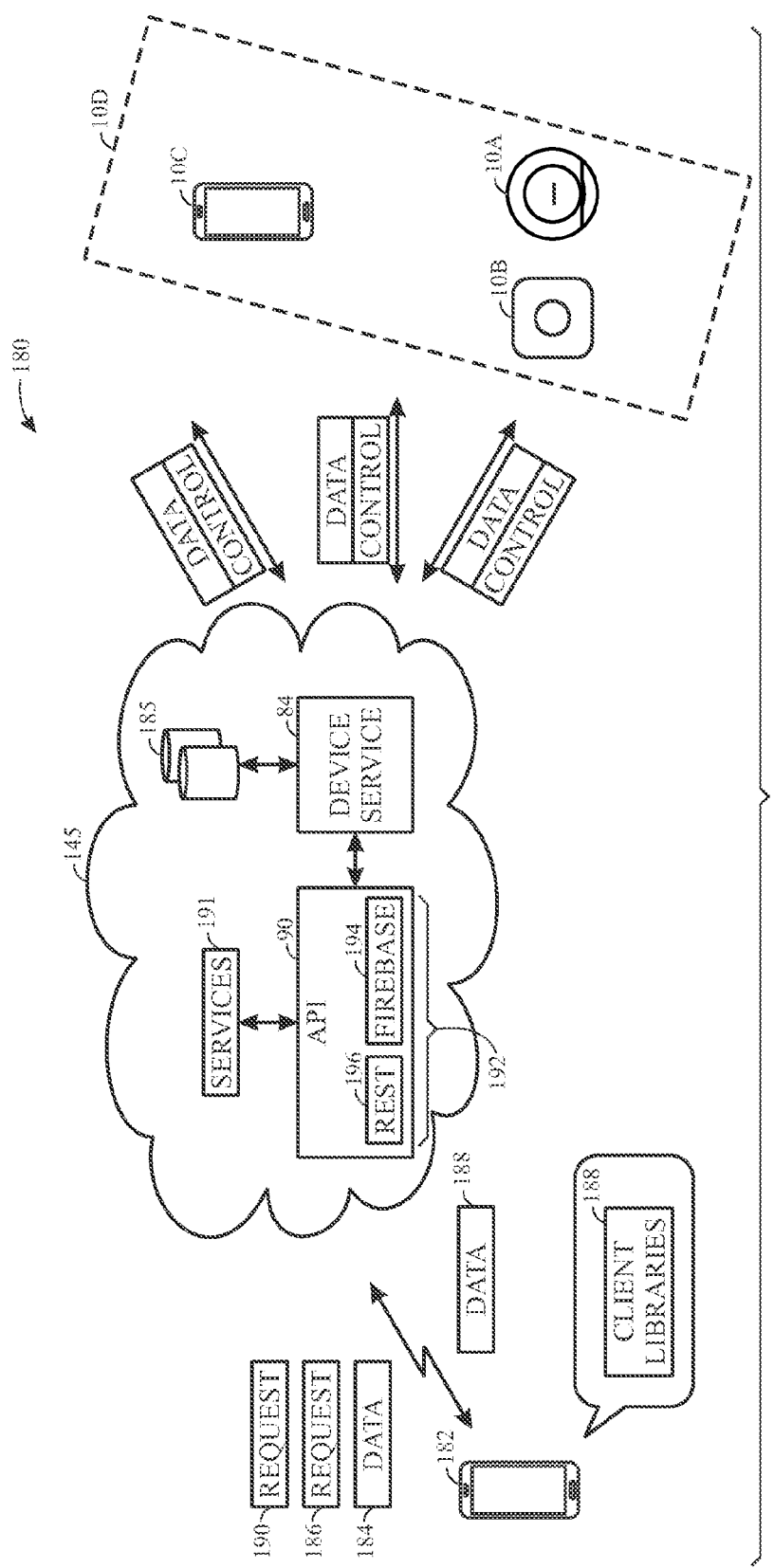
FIG. 6 is a block diagram of a system 180 that uses an API 90 to access one or more device services 84 to request data from, control, and/or store data that may be useful to the smart devices, in accordance with an embodiment.

FIG. 6 illustrates a system 180 that uses an API 90 to access one or more device services 84 to request data from, control, and/or store data that may be useful to the smart devices (e.g., thermostat 10A, smoke and/or CO detector 10B, and/or other device 10C). As discussed above, the system 180 may be useful to enable one or more clients 182 (e.g., third-party client and/or a principle client of the device service 84) to: provide data 184 for use in the device services 84 (e.g., to a data store (e.g., data warehouse 185), to storage of one or more of the smart devices, and/or to a data model of the device service 84), provide a request 186 to control one or more of the smart devices via the device service 84, and/or to receive data 188 from one or more of the smart devices via the device service 84 (e.g., via providing a subscription and/or particular data query request 190), upon authorization from an authorization server (e.g., an additional service provided by services 191). As used herein, the term "client," "application programming interface (API) client," and "client application" may be used interchangeably and may refer to an integration point for the API 90 and/or device service 84. Further, it should be noted, as used herein, the terms "client device," "third party device," and "API client device" may be used interchangeably and refer to an electronic device interfacing with the integration point (e.g., client or API client).

In embodiments where a smart thermostat 10A is present, the API 90 and/or device services 84 may be used to: view a current temperature, view and/or set a target temperature, set a fan timer, view and/or set temperature modes (e.g., "heating" and/or "cooling"), view humidity data, and/or view online status and/or last connection information. In embodiments where a smoke and/or CO detector 10B is present, the API 90 and/or device services 84 may be used to view CO and/or smoke status, view battery health of the detector 10B, view last manual test status and/or a timestamp for the last manual test, and/or view online status and/or last connection information. Further, in embodiments where a structure 10D (e.g., a smart home environment containing smart devices) is associated with the device service 84, the API 90 and/or device services 84 may be used to: view a list of devices in the structure 10D, view energy event status (e.g., whether the structure 10D is under a preferable energy utilization period as defined by an energy utility program (e.g., Rush Hour Rewards by Nest®)), view and/or set an away state of the structure 10D, view a postal or zip code of the structure 10D, and/or set an estimated time of arrival to the structure 10. Many other data points may be accessed and/or written to the devices via the API 90 and/or device services 84.

To perform these functions, the client 182 may connect to the API 90. In one embodiment, the API 90 may include one or more hosts 192 that may receive and/or process the data 184 and/or the requests 186 and/or 190 in near real-time and/or real-time. The hosts 192 may include a Firebase host and/or one or more Representation State Transfer (REST) hosts 196 (e.g. periodic REST and/or REST streaming transactions).

Firebase organizes data as one large JSON document. Using this scheme, the device service 84 can listen for updates (e.g., insertions, deletions, modifications) on the trees of data that the client 182 has access to and/or is subscribed to, in order to synchronize these updates between the clients 182 and/or the devices (e.g., 10A-10C) and/or structures 10D.

Each data element is addressable by a Uniform Resource Locator (URL). Each data element location can store strings, numbers, Boolean values and/or parent/child objects or arrays. Using the API 90, a user's client can sync data from locations at multiple levels in the hierarchy. For example, an entire structure, including all devices, a single device in a structure, a group of data values (e.g., current and ambient temperatures), and/or a single data value (e.g., battery health state). As mentioned above, these data locations may be accessed by creating a client 182 application, using the client libraries 198 and/or using streaming and/or traditional REST communications.

A variety of access controls mechanisms are possible. As will be discussed in more detail below, in some embodiments, a custom login feature may be used to enable the device service 84 provider to utilize customized authentication payloads to authorize access to the APIs 90 and/or device services 84.

To provide data 184 and/or requests 186 and/or 190 to the host 192 in a manner that the API 90 may understand, an application of the client 182 may be constructed to provide this data 184 and/or requests 186 and/or 190. Upon authentication of access rights (which will be discussed in more detail below), the application may utilize REST and/or client libraries (e.g., Firebase client libraries 198) to subscribe to data values via the API 90. When a subscribed data value changes, the new data values are updated in real time and stored as a standard JSON document. The client 182 may then update and/or trigger an action based upon the subscribed data. Further, when the client 182 wishes to write data to the shared JSON document, the client 182 may provide the request via REST and/or Firebase. Accordingly, as mentioned above, the client 182 may generate and provide the data 184 and/or requests 186 and/or 190 as well as receive data 188.

The requests 186 and/or 190 and/or the data 184 are passed from the API 90 to the device service 84. The device service 84 maintains a data model of all relevant structures 10D as well as the relevant smart devices (e.g., thermostats 10A, detectors 10B, and/or devices 10C) associated with each of the structures 10D. The data model is generated and updated in a subscription-based approach. For example, as new structures 10D and/or smart devices (e.g., thermostats 10A, detectors 10B, and/or devices 10C) are activated, a subscription may be registered between the smart devices (e.g. 10A-10C) and/or the structure 10D and the device service 84. Rather than require continual polling for new and/or updated data, which may result in excessive heating and/or battery consumption of the smart devices, the subscription enables new and/or updated data provided to the device service 84 (e.g., via the API 90) to be provided in near-real time, upon changes to the data model maintained by the device service 84.

Figure 7:
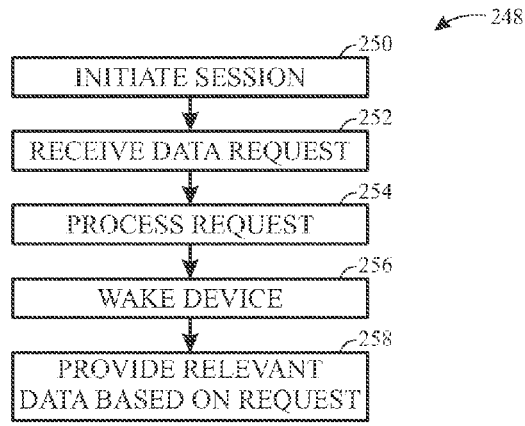
FIG. 7 illustrates a process for providing data requests via the subscription-based device service, in accordance with an embodiment.

FIG. 7 illustrates an embodiment of a process 248 for providing data requests via the subscription-based device service 84. First, a session between the data service 84 and one or more subscribing devices (e.g. devices 10A-10C) and/or structures 10D is created (block 250). The session may be established for a predetermined period (e.g., 1 hour, 1 day, 1 week, etc.) and may be closed at any time by either the subscribing device and/or the device service 84.

Next, when an interaction with the system 180 occurs, a data request is received by the device service 84 (block 252). In one embodiment, the data request may include a request to retrieve particular smart device information and/or a request to set particular smart device information. The request may be provided, in some embodiments, via the API 90, based upon communications from a client 182.

Upon receiving the request, the device service may process the request (block 254). For example, the device service 84 may update its maintained data model based upon the request. In some embodiments, the JavaScript Object Notation (JSON) data format may be used to maintain the device service 84's data model. One or more translation modules may translate non-JSON formatted data (e.g., tag-length-field (TLV) formatted data) into the JSON data format. Further details and examples of subscription services and translation into a JSON data format and processing received data are described in U.S. Ser. No. 61/627,996, filed Oct. 21, 2011, entitled "User friendly, network connected learning thermostat and related systems and methods" and in U.S. Ser. No. 14/508,884, filed Oct. 7, 2014, entitled "Systems and Methods for Updating Data Across Multiple Network Architectures," which are both incorporated by reference herein in their entirety for all purposes.

Next, the device service 84 may wake any subscribers of the request (e.g., smart devices 10A-10C and/or structures 10D associated with the request) (block 256). In one embodiment, the devices (e.g., thermostats 10A, detectors 10B, and/or devices 10C) and/or structures 10D may be equipped with wake-on-LAN (WOL) functionality that enables a device to sleep until particular data packets are received at the WOL equipped device. Upon receiving these particular packets, the devices may wake, and receive data that is provided based upon the received request (block 258). In some embodiments, packet filtering may be implemented on the devices, such that only particular data packets will wake the devices, helping to ensure that the devices are only awoken when relevant data is received at the device 10A-

10C and/or the structure 10D. Further, buffering may be used to ensure that erroneous data is not used to wake the devices and/or structure. For example, if the client 182 sends a request to write a new target temperature to a thermostat 10A that is one degree above the current target temperature, but then immediately sends another request that cancels the prior request (e.g., reduces the target temperature down one degree), the requests may be cancelled out without waking the thermostat 10A (assuming both requests are received by the device service 84 in a buffer window prior to the thermostat 10A wake). In some embodiments, the buffer window may be 2-3 seconds.

Figure 8:
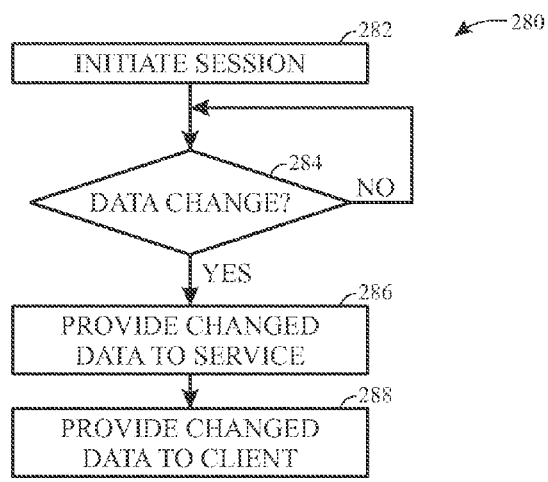
FIG. 8 illustrates a process for providing data from smart devices and/or structures to a client, in accordance with an embodiment.

As mentioned above, data 188 may also be provided to the client 182 from the smart devices (e.g., thermostat 10A, detector 10B, and/or device 10C) and/or structures 10D. For example, the client 182 may display and/or trigger actions based upon received data from the smart devices and/or structures 10D. FIG. 8 illustrates a process 280 for providing data from smart devices and/or structures to a client 182. As with the process 248 of FIG. 7, an http session is established between the device service 84 and smart devices (e.g., thermostats 10A, detectors 10B, and/or devices 10C) and/or structures 10D (block 280). Upon detecting a change of relevant data in the smart devices and/or structures 10D (decision block 284), the changed data is provided to the device service 84 (block 286). The device service 84 then updates the data model and provides the updates to the client 182 (block 288). The client 182 is then able to display the updated data and/or trigger other actions based upon the updated data.

In one example, a client may be created to interact with a thermostat 10A (e.g., using the client libraries 198). The client may be set up to monitor two values: current temperature and target temperature. To obtain changes to these two values, the client establishes a subscription to the thermostat object in a structure 10D. Then, when the temperature of the thermostat 10A is adjusted, the target temperature changes and the device service 84 updates the data model (e.g., JSON device and/or structure representation), which may be synchronized with the client 182 in near-real time. The client 182 may listen for changes and display a new target temperature and/or update the current temperature as it changes at the thermostat 10A.

ii. Authorization and Permissions

The API 90 and device service 84 may provide information to clients that may be used to build a better home experience. However, that information is ultimately owned by the user of the smart devices (e.g., thermostats 10A, detectors 10B, and/or devices 10C) and can only be shared with clients when the user explicitly allows it. Certain permissions may enable a client to access resources in a shared data model. As such, an authorization process may be used to enable the user to grant permissions to clients requesting to view and/or modify data associated with the user's smart devices (e.g., thermostats 10A, detectors 10B, and/or devices 10C) in the data model using the authorization server 191. The authorization process may use an open protocol framework (e.g., OAuth 2.0) to allow secure authorization of third party applications to obtain limited access to an HTTP service.

The authorization server 191 may provide functionality for managing the authorization code and access token granting processes, which will be described in more detail below. There may be an authorization process for web-based and PIN-based authorization. If a redirect universal resource identifier (URI) was entered when the client was registered, then a web-based authorization code may be in the redirected URI as a code query parameter. If a redirect URI was not entered when the client was registered, then a PIN-based authorization code may be displayed in a web page. PIN based authorization is generally used for devices with no web user interface, and that have an alphanumeric keypad interface.

The permissions may vary based on who the client is, the type of data being requested, the type of access being requested, and so forth. Indeed, in some embodiments, there may be various scopes, or groups of predefined permissions to certain data elements, that are assigned to the clients. Access to resources may be tied to a session (an issued access token). The end user may be asked to approve granting a series of scopes as part of the session initiation process. If the user approves the scopes, the permissions associated with the scopes at the time of issue are tied to the session for the lifetime of the session, as discussed in detail below. Also, in some embodiments, the disclosed techniques provide functionality to enable the client to insert their own data into the data model using the device service 84 (e.g., via the API 90), retrieve their own data from data model using the device service 84 (e.g., via the API 90), or to allow the client to authorize another third party to modify or view the client's data in the data model using the device service 84 (e.g., via the API 90).

Figure 9:
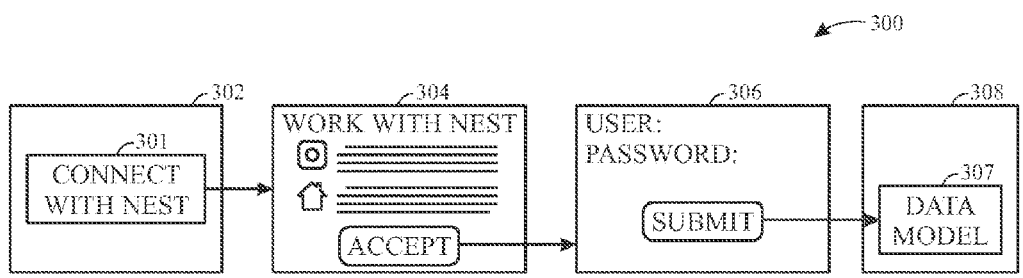
FIG. 9 illustrates a flow diagram of a process for a user to authorize a client to access user data in the data model via the device service, in accordance with an embodiment.

FIG. 9 illustrates a flow diagram of a process 300 for a user to authorize a client to access user data in the data model via the device service 84, in accordance with an embodiment. To interact with the user's smart devices (e.g., thermostats 10A, detectors 10B, and/or devices 10C) by manipulating data or viewing data in the data model, the user must first agree to let the client access user device data. The authorization process may begin with a link 301 to connect to the device service 84 on a client site/app 302 that the user may select. In response, a resource access permission page 304 and a login page 306 may be displayed that asks the user to grant access to the client and/or sign in if not already signed into an authorization server.

The resource access permission page 304, which is described in detail below, may display the permission and one or more justifications for the permission entered when the client was registered in the data model. If the user accepts the permission requested for the client, an authorization code may be returned from the authorization server to the user, which passes the authorization code to the client, and the client exchanges the authorization code and a client secret for an access token. The client may then make API calls to the device service 84 including the access token to retrieve and/or input data into the data model. For example, the client may request to see the current temperature and/or the target temperature using an API call and the access token which provides thermostat read permissions. As a result, the current temperature and/or the target temperature may be returned by the device service 84 and displayed on the client site/app 308. As should be appreciated, any data for which the client is granted permissions may be accessed in the data model 307 and used as desired on the client site/app 308. The user may revoke access at any time, which will inhibit the client from making any further requests for the user's smart devices' (e.g., thermostats 10A, detectors 10B, and/or devices 10C) data.

Figure 10:
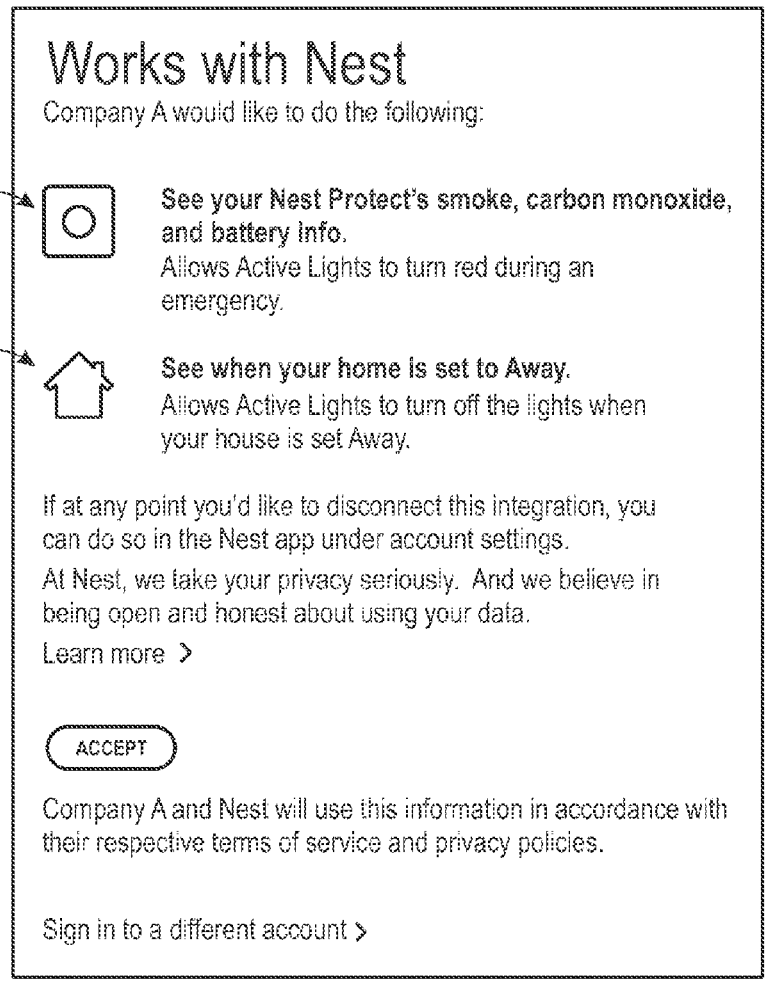
FIG. 10 illustrates the resource access permission page of FIG. 9, in accordance with an embodiment.

FIG. 10 illustrates the resource access permission page 304 of FIG. 9, in accordance with an embodiment. As discussed above, this page 304 asks the user to grant access to the client. In particular, the resource access permission page 304 displays the permissions and justifications for the permissions when the client was registered in the data model. The justification explains what the client will do with the requested data and how it will benefit the user. Justifications should include the client name, the action(s) the client can take, and the triggering event. For example, a sample template to write justifications include the following:

"Allows [client name] to [take action] [because/when . . . ]"

In some embodiments, the justifications may have a minimum word length (any suitable number, such as 5, 10, 15, 20, etc.), and contain less than or equal to a maximum number of characters (any suitable number, such as 140, 150, 160, etc.). The user may see the justification in the resource access permission page 304 and in a permissions view within a smart device (e.g., thermostats 10A, detectors 10B, and/or devices 10C) site/app.

For example, in the illustrated embodiment, the resource access permission page 304 indicates that Company A would like to see data about the detector 10B related to smoke, carbon monoxide, and battery info, and by doing so will allow certain lights to turn red during an emergency (310). Additionally, the page 304 indicates that Company A would like to see when the user's home is set to away, which allows certain lights to turn off when the house is set to away (312). The page 304 also notifies the user that the integration may be disconnected at any time to terminate the client from using the data.

Figure 11:
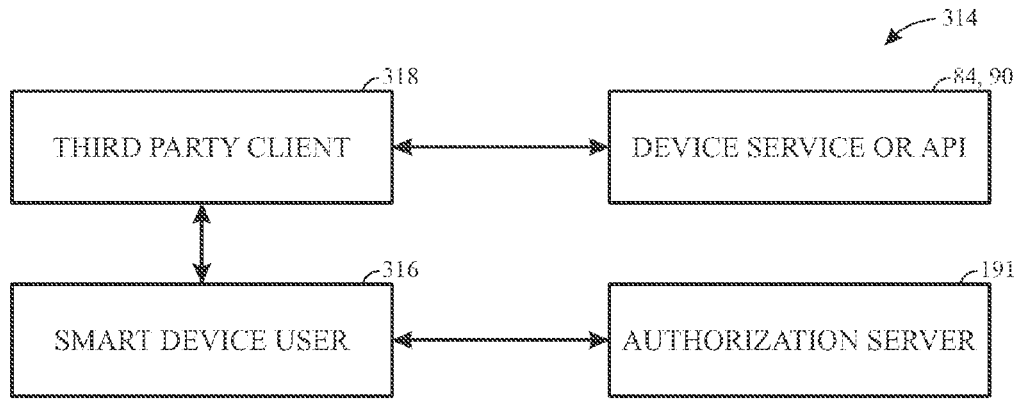
FIG. 11 illustrates a block diagram of a system for authorizing clients to use a user's smart device data via the web, in accordance with an embodiment.
Figure 12:
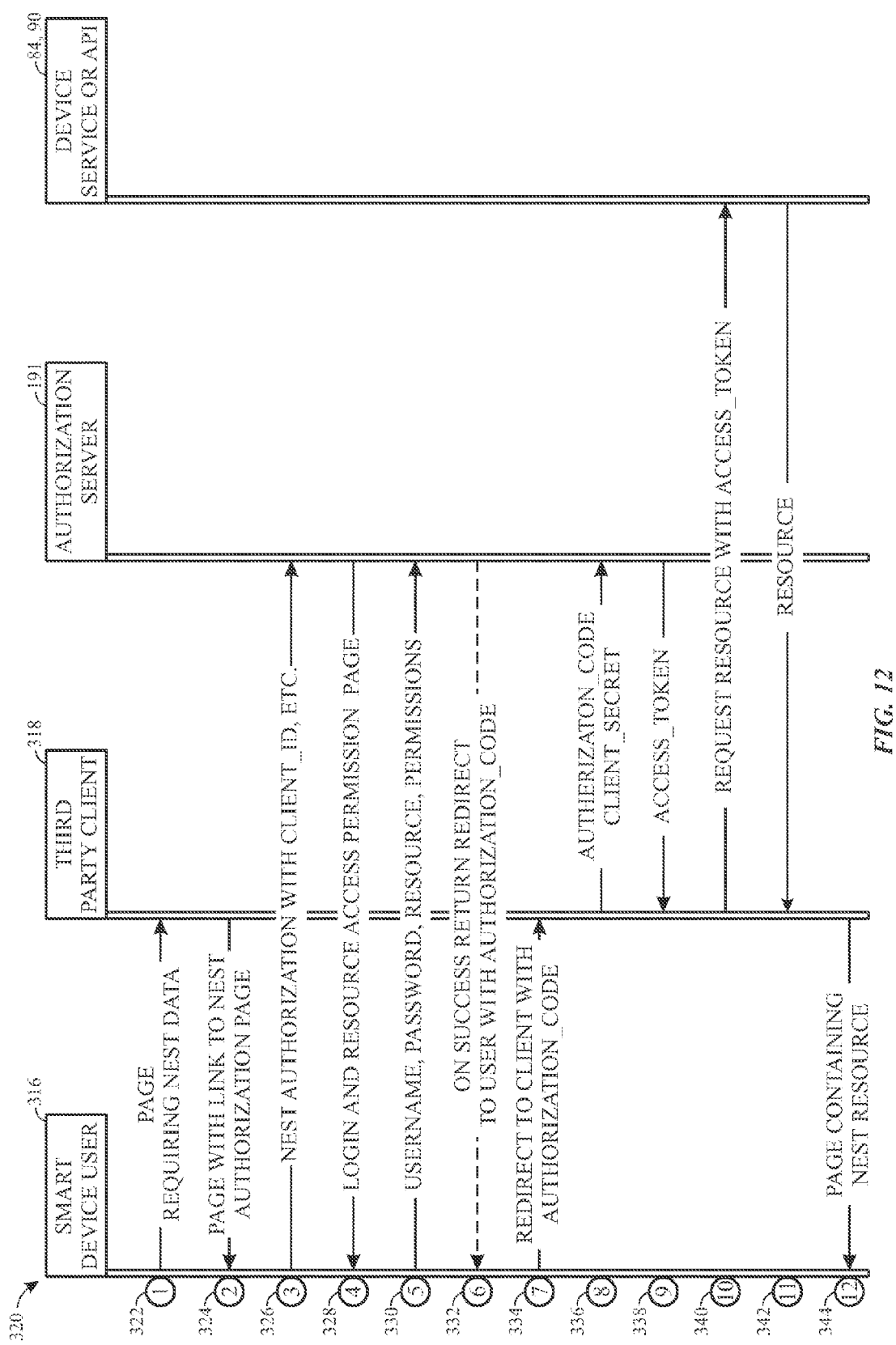
FIG. 12 illustrates a sequence diagram for authorizing clients to use a user's smart device data using the system of FIG. 11 via the web, in accordance with an embodiment.

FIG. 11 illustrates a block diagram of a system 314 for authorizing clients to interact with a user's smart device (e.g., thermostats 10A, detectors 10B, and/or devices 10C) data and/or operation via the web (e.g., server to server resource requests), in accordance with an embodiment. FIG. 12 illustrates a sequence diagram 320 for authorizing clients to use a user's smart device data using the system 314 of FIG. 11 via the web. As illustrated, the sequence diagram 320 depicts twelve events occurring in a sequential order. For clarity, both FIGS. 11 and 12 will be described together.

The system 314 may include a smart device user 316, a third party client 318, an authorization server 191, and the device service 84 and/or API 90. It should be noted that, in some embodiments, the device service 84 and/or the API 90 may receive the requests for resources from the client 318 and validate the access token provided by the client 318. It should also be noted that, in some embodiments, the authorization server 191 may provide functionality including querying client information and a list of scopes that the user granted to the client. As described in detail below, the scopes may group together one or more permissions for a specific functionality (e.g., viewing thermostat data, setting HVAC, etc.). The authorization server 191 may also authenticate the user 316 and fetch the user ID, validate the user's consent to grant the client's requested scopes, handle redirects, and receive requests for the authorization code and the access token. In some embodiments, the authorization server 191 may handle the requests via HTTP REST GET calls with query parameter format.

Additionally, the authorization server 191 may include one or more servers that provide varying functionalities. For example, an authorization server that is not exposed to the public may provide functionality for managing the authorization codes, access tokens, client secret, scopes, and permissions, whereas a publicly exposed authorization server may provide functionality for higher level functions of the authorization code and access token granting process, such as querying client information and list of scopes requested for a client, authenticate user and fetch user ID, validate user's consent to grant client's requested scopes, handle redirects, and receive requests to provide access tokens for authorization codes.

The user 316, which may be a customer/owner of resources requested, may be using a web browser in the illustrated embodiment. Event 1 322 of the sequence diagram 320 includes the user 316 sending a request to the client 318 webpage/app that incorporates data from the data model. In response, event 2 324 shows a page being returned to the user with a webpage containing a link to the authorization page. The link to the authorization page may include the following information: response type ("code"), client ID (ID is provided to the client 318 when registered), state (a value passed from the client 318 to authorization server 191 and may be used to protect against cross-site request forgery attacks). Event 3 326 may include the user 316 clicking the authorization link, thereby sending a GET request to the authorization server 191. The authorization server 191 responds with the resource access permission page 304 and the interstitial login page 306 if the user 316 is not already logged in, as depicted in event 4 328.

Then, as indicated by event 5 330, the user 316 submits a username, password, and resource permissions to the authorization server 191. If the login is successful, the authorization server 191 responds with a redirect to redirect uniform resource identifier (URI) to the user 316, as indicated by event 6 332. The redirect URI may contain the following parameters: code (an authorization code used to obtain an access token), a state (the same value passed to the authorization server 191 earlier, which the client 318 should validate has not changed upon receipt). The authorization code may be a short string of alphanumeric characters with different length requirements based on whether the authorization is web-based (e.g., 14, 16, 18 characters) or PIN (6, 8, 10 characters). Also, the authorization code may be subject to expiring if not used within a certain period of time based on whether the authorization is web-based (e.g., 5, 10, 15 minutes) or PIN (e.g., 24, 48, 72 hours). Further, the authorization server 191 may create an authorization entry in the authorization tree for the user and the client that is granted permission in the assigned scopes. In some embodiments, once the permission is granted, data synchronization between the API 90 and the data service 84 may begin.

In event 7 334, the user's web browser redirects to the client 318 with the authorization code. Upon receiving the request from the user 316 containing the authorization code, the client 318 may send a POST request to the authorization server 191 containing the following parameters in event 8 336: grant type ("authorization code"), code (the authorization code returned by the authorization server 191), client ID (the ID issued when the client was registered), and a client secret (a secret issued to the client 318 when registered).

As indicated by event 9 338, the authorization server 191 responds with an access token. The response may be an object in the JavaScript Object Notation (JSON) data format: \{"access_token":"some-random-string", "expires_at": "time-expires ISO8601 format"\}. In some embodiments, the access token may not expire for an extended period of time (e.g., 10, 15, 20 years). Also, the access tokens may be long unique strings.

Then, as indicated by event 10 340, the client 318 requests the needed resource from the device service 84 using the API 90. The API 90 request may include the following parameter added: access token (the access token returned in the call to the authorization server 191). That is, in some embodiments, the API client or API client device may send one or more requests including the access token to retrieve, access, view, subscribe, or modify data elements of a data model representative of one or more smart environments. The access token may be associated with at least the API client or API client device and one or more scopes granted to the API client or API client device. As previously discussed, the one or more scopes may provide one or more access rights to one or more of the data elements of the data model defined by a hierarchical position of the data elements in the data model represented by a respective path to the data elements. It should be noted that the sending of the request including the access token may be implemented as computer instructions stored one or more tangible non-transitory computer-readable medias and executed by the API client or the API client device.

Sending the one or more requests with the access token enables downstream services (e.g., device service 84) to the API client 318 or API client device to use the access token to identify the one or more scopes granted to the API client or API client device. The device service 84 may process the request in accordance with the granted scopes to the associated access token and API client 318 or API client device. The device service 84 responds with the requested resource in event 11 342 and the client 318 includes the resource into a page included in a response to the user 316, as indicated by event 12 344. It should be appreciated that the client 318 may continue to make requests from the device service 84 to access or modify data in the data model based on the permissions that were granted for as long as the access token is valid. In some embodiments, the device service 84 responds with a data object including data objects from the data model (e.g., a metadata data object, a devices data object, a structures data object) based on the request and scopes associated with the access token. Further, in some embodiments the client 318 may perform a function in addition to displaying the returned data in a page, such as controlling a setting on the API client device based on the data, executing a control action on the API client device based on the data, and the like.

Figure 13:
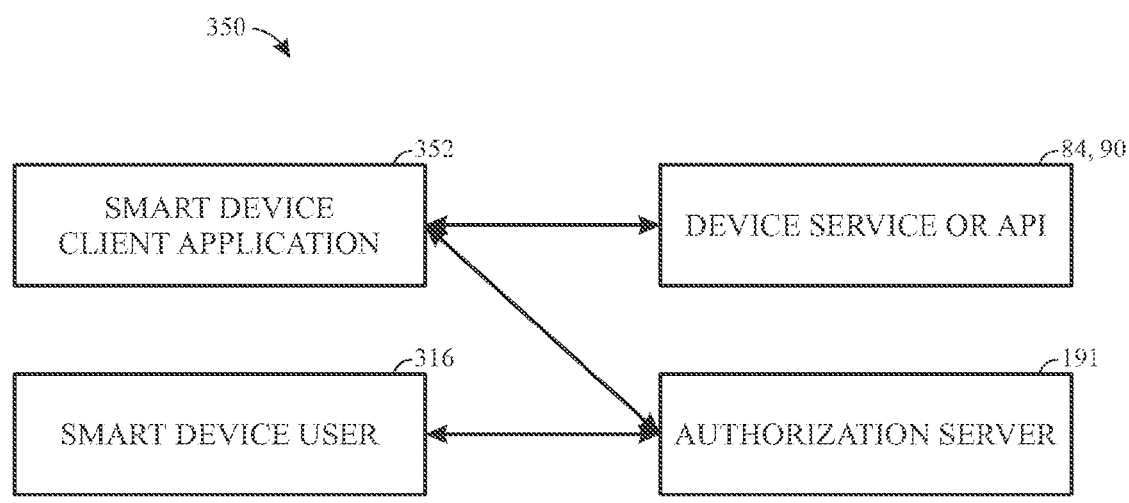
FIG. 13 illustrates a block diagram of a system for authorizing clients to use a user's smart device data via a PIN when the devices do not have a web UI, in accordance with an embodiment.
Figure 14:
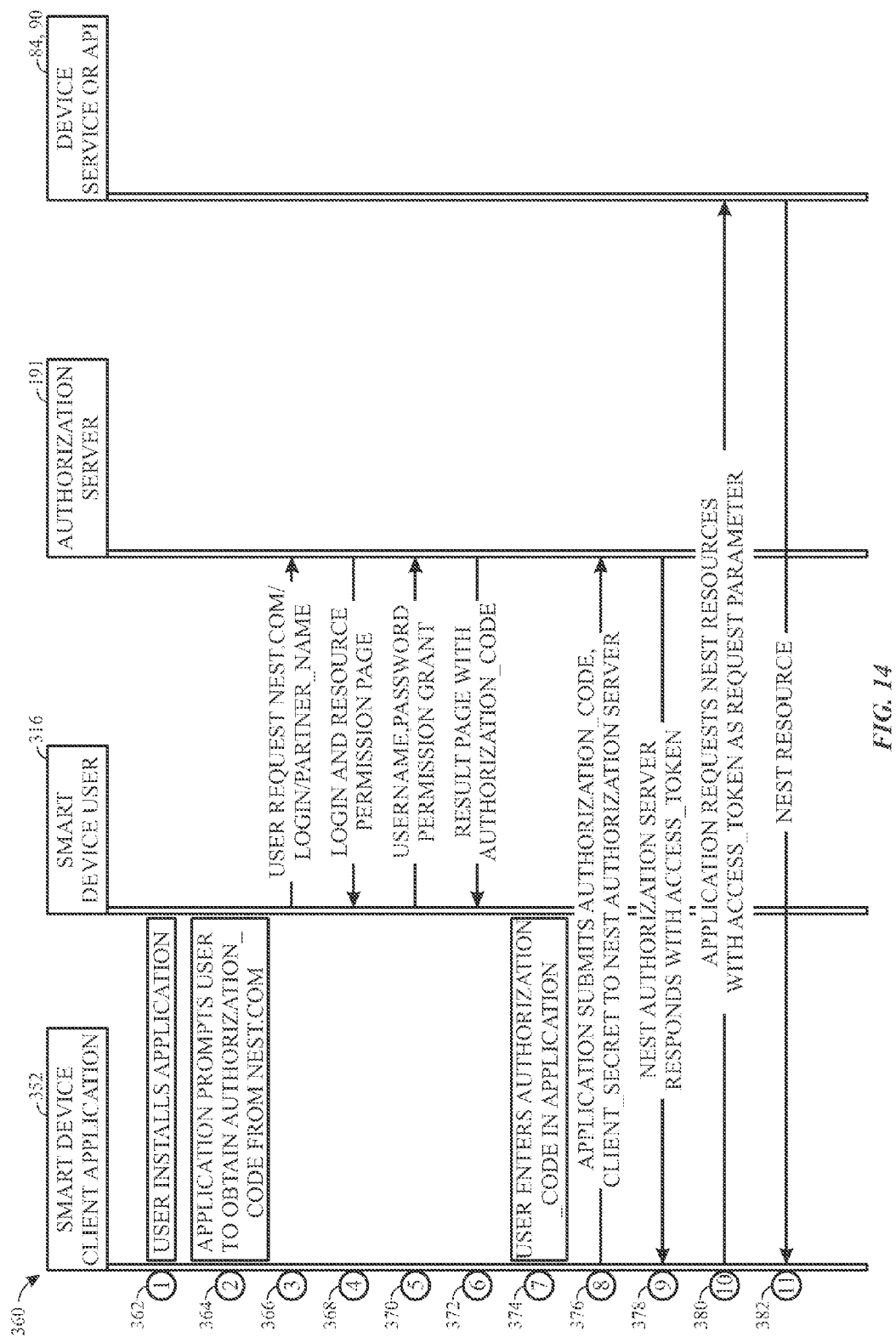
FIG. 14 illustrates a sequence diagram for authorizing clients to use a user's smart device data using the system of FIG. 13 via the PIN, in accordance with an embodiment.

FIG. 13 illustrates a block diagram of a system 350 for authorizing clients to use a user's smart device (e.g., thermostats 10A, detectors 10B, and/or devices 10C) data via a PIN when the devices do not have a web UI, in accordance with an embodiment. FIG. 14 illustrates a sequence diagram 360 for authorizing clients to use a user's smart device data using the system 350 of FIG. 13 via the PIN. For clarity, both FIGS. 13 and 14 will be described at the same time.

The system 350 may include a smart device client application 352, the smart device user 316, the authorization server 191, and the device service 84 and/or API 90. It should be noted that, in some embodiments, the device service 84 and/or the API 90 may receive the requests for resources from the client application 352 and validate the access token provided by the client application 352. Additionally, the authorization server 191 may include one or more servers that provide varying functionalities. For example, an authorization server that is not exposed to the public may provide functionality for managing the authorization codes, access tokens, client secret, scopes, and permissions, whereas a publicly exposed authorization server may provide functionality for higher level functions of the authorization code and access token granting process, such as querying client information and list of scopes requested for a client, authenticate user and fetch user ID, validate user's consent to grant client's requested scopes, handle redirects, and receive requests to provide access tokens for authorizations codes.

The sequence of events may begin with the user 316 installing the client application 352 that requires access to resources in the data model, as indicated by event 1 362 in the sequence diagram 360. In event 2 364, the client application 352 instructs the user to use a link to the authorization server 191 including the client's name. The user 316 may use a web browser to enter the link and request the page to the authorization server 191 including the client's name (event 3 366). The authorization server 191 responds with the resource access permission page 304 and the interstitial login page 306 if the user 316 is not already logged in, as depicted in event 4 368. The user 316 then submits approval or denial of the resource access permissions for the client and/or enters a username and password if login is required to the authorization server 191 (event 5 370). In event 6 372, the authorization server 191 responds with a result page that contains a user readable authorization code (personal identification number (PIN)).

The user may copy the PIN from the web browser and manually enter the PIN into the client application 352 (event 7 374). After the user enters the PIN, the client application 352 submits the PIN and a client secret (provided when the client was registered) to the authorization server 191, as depicted in event 8 376. Upon receipt of the PIN, the authorization server 191 responds to the client application 352 with an access token (event 9 378). The client application 352 can now make resource requests from the data model via the device service 84 providing the access token as a request parameter to the API 90 and/or the device service 84 (event 10 380). The device service 84 and/or the API 90 may analyze the access token and return the requested resources from the data model based on the permissions granted to the client application 352 (event 11 382).

In some embodiments, the client 318 or the client application 352 may have their access revoked by the user at any time. For example, the user may access a "settings" screen and revoke the permissions granted to the client. The authorization server 191 may generate and send an access token revocation message that deletes the access token assigned to the client 318 or the client application 352. The deletion may be detected and, if the client 318 or the client application 352 that had their access deleted was the last authorized client, then data synchronization between the API 90 and the data service 84 may be stopped. Further, any sessions that were authenticated with the deleted access token may be disconnected.

In some embodiments, multi-user integration (MUI) may enable the client 318 or client application 352 to open a single connection (HTTPS) and read data from multiple users. Each connection may be responsible for the portion of the users using a particular host. Using the single connection may improve efficiency between server-to-server integrations by reducing the overall number of connections. In one example, REST streaming may be used by clients making a call to a multiuser endpoint with a list of access tokens. In some embodiments, the response may include all data for each access token, including all structures and all devices, and metadata. The client may examine the response data to map the access tokens to the corresponding users and/or filter the data values for the information the client desires. To enable the client to map the access tokens, a metadata section may be included in each response that includes the access token associated with the data and the user.

If the client desires to modify the list of access tokens, the connection may be closed, the list updated, and the multi-user call may be made by the client again to reestablish the connection. In some embodiments, when data for users associated with additional access tokens is desired, the client may close the connection and add the add the additional access tokens to the list to send in another request to the multiuser endpoint. As long as the list does not exceed a threshold number of access tokens, the connection will be established and data will be returned for all of the access tokens in the list. That is, in some embodiments, the connection may not be established if more than a threshold number of access tokens are provided. It should be noted, that single-client integrations (e.g., mobile apps) may typically open a new connection for each access token and may not use MUI. To make a MUI call, the client 318 or client application 352 may use a specific endpoint (e.g., https://developer-api.nest.com/multiplex) to make a REST streaming call, or the like, and include a list of access tokens in the request. For example, the request URL may be entered as follows:

https://developer-api.nest.com/multiplex?auth=LIST_OF_ACCESS_TOKENS

The list_of_access_tokens URL parameter may be of type list and be a comma-separated list with a configured maximum number of access tokens. The authorization server 191 may validate the list against the access tokens associated with the client 318 or the client application 352. In some embodiments, as mentioned above, the response may include all data values in an all objects so the client 318 or the client application 352 may filter the fields of interest and map the access tokens to the corresponding users (e.g., by identifying the access tokens provided in a metadata section of the response and mapping them to the users). Additionally or alternatively, there may be more than one response and each response may be particular for a single access token that was sent in the list of access tokens with the request. The metadata section including the access token provides a mechanism to identify which access token with which the data and/or user is associated.

In one embodiment of multi-user integration, a method for authorizing access for an application programming interface (API) client or API client device to data of one or more data models of one or more smart devices may include retrieving a number of access tokens from an authorization server. The method may also include providing, via a single connection, the plurality of access tokens in a request made by the API client or the API client device to the API. The plurality of access tokens are used to verify access rights of the API client or the API client device to read data for a plurality of users associated with the one or more data models of the one or more smart devices. The method may be implemented as computer instructions on a tangible, non-transitory computer-readable media and executed by the API client or API client device.

As mentioned above, there may be one or more scopes that include specific permissions associated with certain functionality that may be granted to application programming interface (API) clients and/or client applications. A scope may refer to a collection of permissions. Scopes are a unit of permission defining the ability to access or modify the user's data. Scopes may be identified by a unique name (e.g., 64 characters) and an ID number, as discussed below. Scopes enable identifying elements in the data model by permissions to which the client 318 has access. The elements may be located in the data model based on unique paths that the client 318 is granted access (e.g., read, write, read and write) via the scope granted. That is, there may be a one to one correspondence between a path in the data model and the element to which the client 318 has access. Thus, a scope may include providing various access rights to a bundle of paths to elements in the data model.

The scopes that are assigned and granted to the client 318 or the client application 352 may be tied to the session (access token) for the life of the session. In some embodiments, the API 90 may validate that the access token is signed by a client secret issued by the authorization server 191. After validation, the API 90 may allow access to the resources in the data model according to the granted scopes associated with the access token using the device service 84. In some embodiments, rules may be set up that allow access to the resources if certain conditions are met. The table below shows one such rule.

| Sample Rule |
|---|
| "users" : {<br>  "$user" : {<br>    ".read": "auth.for_user == $user",<br>  }<br>} |

The above rule indicates that the authenticated user can read the users/<user> element if the "for_user" field of the access token is <user>. Using this technique, rights information may be stored and used to limit third party access to the elements for which the third party has granted permissions. Moreover, updates (insertions, deletions, modification) on the rights tree may be detected and any needed changes may be made to synchronize various servers included in the system. An authorization tree may contain an object for each user who has granted any client 318 or client application 352 access. Within the user object there may be sub-objects for every client that has been granted access. Each client object contains information on rights granted to that client. The below table includes an example of an authorization tree.

| Authorization Tree |
|---|
| {<br>  auth:<br>    {<br>    55156: //user ID<br>      {<br>      1234: //client ID<br>        {<br>        scopes: ["thermostat read"],<br>        granted_at ...<br>        etc...<br>        }<br>      5678: //client ID<br>        {<br>        scopes: ["thermostat read/write", "smoke + CO read"],<br>        granted_at ...<br>        }<br>      }<br>    }<br>} |

As displayed in the table, the user with ID 55156 granted scopes to two clients, client ID "1234" and client ID "5678". The scope granted to client ID "1234" includes only the thermostat read scope and the client ID "5678" includes both the "thermostat read/write" scope and the "smoke+CO read" scope. The various scopes and permissions bundled into each scope are discussed in detail below.

The permissions are designed and organized into scopes based on the types of data each client 318 might need. For example, for clients 318 that only check in and get status updates, a developer may only select a "read" permission for data elements, and, as a result, only choose a scope including read permissions to the associated element paths. However, if the client 318 is designed to set device values or status, the developer may choose a "read/write" permission for those elements and choose a scope including read/write permissions to the associated element paths. The scopes including the permissions that are selected for a particular client should match the client's features. As the client's features expand, the client 318 may need new permissions. In some embodiments, a new client version may be created with a scope that includes the newly required permissions and that client version may be offered to the users 316. It should be understood that if the client 318 is authorized the assigned scope, then the client may receive all of the permissions defined for that scope. Also, if multiple scopes are authorized for a client 318, then the client may receive a superset of all permissions combined contained in those scopes. Below is a table of some general scopes and the permissions that each scope includes, according to an embodiment.

| Scopes and Permissions |
|---|
| Scope: Thermostat read<br>Grants read permission to most of the Thermostat and Structure data values |
| Scope: Thermostat read/write<br>Grants read permission to all of the Thermostat data values<br>Grants write permission to these Thermostat data values:<br>fan_timer_active, all target_temperature_x fields and hvac_mode<br>Grants read permission to most of the Structure data values |
| Scope: Smoke + CO read<br>Grants read permission to all the Smoke + CO Alarm data values and most of the<br>Structure data values |
| Scope: Away read<br>Grants read permission to most of the Structure data values |
| Scope: Away read/write<br>Grants read permission to most of the Structure data values<br>Grants read/write permission for away |
| Scope: ETA write<br>Grants read permission to most of the Structure data values<br>Grants write permission to eta |
| Scope: Postal code read<br>Grants read permission for postal_code |

| Scopes and Permissions |
|---|
| Scope: Product data read/write<br>Grants read permissions for all of the Company data values<br>Grants read/write permissions to software version<br>and all of the resource use data values |

To illustrate, if a developer is registering a client 318 that listens to (e.g., reads) the ambient temperature, target temperature and the away state of the home, then the developer would choose the "thermostat read" scope, which provides only read access to those data elements. Conversely, a client 318 that needs to actively modify target temperature, heat/cool mode or fan timer should be assigned the "thermostat read/write" scope, which would provide write access to those data elements, and retain read access to the other thermostat and structure data elements. Another client 318 might track smoke and CO state, so the "smoke+CO alarm read" scope may be chosen to provide read permissions to those data elements. Still another client 318 could focus solely on the home, and take action when the user 316 arrives home, or after the user leaves the home. In such a case, the "away read/write and ETA write" scope may be chosen.

The below tables illustrate the various scopes for element paths in the data model for smart devices, such as thermostats 10A and detectors 10B, and a structure in more detail. The names of the scopes are across the top row of the table, the second row includes the scope ID, the third row includes a version number of the scope, and the leftmost column includes the field/data element paths. In some embodiments, a permission field in the data model may store all the permissions included for the selected scope(s). When the user 316 approves the requested scope for the client 318, an authorization session may be created and the string including all permissions for the client 318 may be copied into a row where authorization session information resides including the access token. The approved scopes for the client may be stored as part of a login string in the data model where the access token is stored. The access token is reused each time the client requests data from the data service 84. It should be noted, that in some embodiments, every scope has at least read permissions to an access_token and client_version element included in a "Metadata" object of the data model.

| Thermostat Read Scope | | | |
|---|---|---|---|
| Name | | Thermostat read | Thermostat read |
| Fields | ID | 10 | 19 |
| | Version | 1 | 2 |
| /devices/thermostats/device_id/device_id | | READ | READ |
| /devices/thermostats/device_id/local | | READ | READ |
| /devices/thermostats/device_id/software_version | | READ | READ |
| /devices/thermostats/device_id/structure_id | | READ | READ |
| /devices/thermostats/device_id/name | | READ | READ |
| /devices/thermostats/device_id/name_long | | READ | READ |
| /devices/thermostats/device_id/last_connection | | READ | READ |
| /devices/thermostats/device_id/is_online | | READ | READ |
| /devices/thermostats/device_id/can_cool | | READ | READ |
| /devices/thermostats/device_id/can_heat | | READ | READ |
| /devices/thermostats/device_id/is_using_emergency_heat | | | |
| /devices/thermostats/device_id/has_fan | | READ | READ |
| /devices/thermostats/device_id/fan_timer_active | | READ | READ |
| /devices/thermostats/device_id/fan_timer_timeout | | READ | READ |
| /devices/thermostats/device_id/has_leaf | | READ | READ |
| /devices/thermostats/device_id/temperature_scale | | READ | READ |
| /devices/thermostats/device_id/target_temperature_f | | READ | READ |
| /devices/thermostats/device_id/target_temperature_c | | READ | READ |

| Thermostat Read Scope | | |
|---|---|---|
| Name | Thermostat read | Thermostat read |
| /devices/thermostats/device_id/target_temperature_high_f | READ | READ |
| /devices/thermostats/device_id/target_temperature_high_c | READ | READ |
| /devices/thermostats/device_id/target_temperature_low_f | READ | READ |
| /devices/thermostats/device_id/target_temperature_low_c | READ | READ |
| /devices/thermostats/device_id/away_temperature_high_f | READ | READ |
| /devices/thermostats/device_id/away_temperature_high_c | READ | READ |
| /devices/thermostats/device_id/away_temperature_low_f | READ | READ |
| /devices/thermostats/device_id/away_temperature_low_c | READ | READ |
| /devices/thermostats/device_id/hvac_mode | READ | READ |
| /devices/thermostats/device_id/ambient_temperature_f | READ | READ |
| /devices/thermostats/device_id/ambient_temperature_c | READ | READ |
| /devices/thermostats/device_id/humidity | | READ |
| /structures/structure_id/structure_id | READ | READ |
| /structures/structure_id/thermostats | READ | READ |
| /structures/structure_id/smoke_co_alarms | READ | READ |
| /structures/structure_id/away | READ | READ |
| /structures/structure_id/name | READ | READ |
| /structures/structure_id/country_code | READ | READ |
| /structures/structure_id/postal_code | | |
| /structures/structure_id/peak_period_start_time | READ | READ |
| /structures/structure_id/peak_period_end_time | READ | READ |
| /structures/structure_id/time_zone | READ | READ |
| /structures/structure_id/eta | | |
| /structures/structure_id/data_upload | | |

As described above and shown in the Thermostat Read Scope table, the thermostat read scope grants read permission to most of the thermostat and structure data values in the data model. Version 1 of the thermostat read scope does not provide read access to the humidity data values because the element may have been added to the data model after version 1 was created. As depicted, version 2 of the thermostat read scope grants read permission to the humidity data path in addition to all of the other elements included in version 1.

| Thermostat Read/Write Scope | | | |
|---|---|---|---|
| Name | | Thermostat read/write | Thermostat read/write |
| Fields | ID | 11 | 20 |
| | Version | 1 | 2 |
| /devices/thermostats/device_id/device_id | | READ | READ |
| /devices/thermostats/device_id/local | | READ | READ |
| /devices/thermostats/device_id/software_version | | READ | READ |
| /devices/thermostats/device_id/structure_id | | READ | READ |
| /devices/thermostats/device_id/name | | READ | READ |
| /devices/thermostats/device_id/name_long | | READ | READ |
| /devices/thermostats/device_id/last_connection | | READ | READ |
| /devices/thermostats/device_id/is_online | | READ | READ |
| /devices/thermostats/device_id/can_cool | | READ | READ |
| /devices/thermostats/device_id/can_heat | | READ | READ |
| /devices/thermostats/device_id/is_using_emergency_heat | | READ | READ |
| /devices/thermostats/device_id/has_fan | | READ | READ |
| /devices/thermostats/device_id/fan_timer_active | | READ WRITE | READ WRITE |
| /devices/thermostats/device_id/fan_timer_timeout | | READ | READ |
| /devices/thermostats/device_id/has_leaf | | READ | READ |
| /devices/thermostats/device_id/temperature_scale | | READ | READ |
| /devices/thermostats/device_id/target_temperature_f | | READ WRITE | READ WRITE |
| /devices/thermostats/device_id/target_temperature_c | | READ WRITE | READ WRITE |
| /devices/thermostats/device_id/target_temperature_high_f | | READ WRITE | READ WRITE |
| /devices/thermostats/device_id/target_temperature_high_c | | READ WRITE | READ WRITE |
| /devices/thermostats/device_id/target_temperature_low_f | | READ WRITE | READ WRITE |
| /devices/thermostats/device_id/target_temperature_low_c | | READ WRITE | READ WRITE |
| /devices/thermostats/device_id/away_temperature_high_f | | READ | READ |
| /devices/thermostats/device_id/away_temperature_high_c | | READ | READ |
| /devices/thermostats/device_id/away_temperature_low_f | | READ | READ |

-continued

Thermostat Read/Write Scope

| Name | Thermostat read/write | Thermostat read/write |
|---|---|---|
| /devices/thermostats/device_id/away_temperature_low_c | READ | READ |
| /devices/thermostats/device_id/hvac_mode | READ WRITE | READ WRITE |
| /devices/thermostats/device_id/ambient_temperature_f | READ | READ |
| /devices/thermostats/device_id/ambient_temperature_c | READ | READ |
| /devices/thermostats/device_id/humidity | | READ |
| /structures/structure_id/structure_id | READ | READ |
| /structures/structure_id/thermostats | READ | READ |
| /structures/structure_id/smoke_co_alarms | READ | READ |
| /structures/structure_id/away | READ | READ |
| /structures/structure_id/name | READ | READ |
| /structures/structure_id/country_code | READ | READ |
| /structures/structure_id/postal_code | | |
| /structures/structure_id/peak_period_start_time | READ | READ |
| /structures/structure_id/peak_period_end_time | READ | READ |
| /structures/structure_id/time_zone | READ | READ |
| /structures/structure_id/eta | | |
| /structures/structure_id/data_upload | | |

As described above and shown in the Themostat Read/Write Scope table, the thermostat read/write scope grants read permission to all of the thermostat data values, grants write permission to fan_timer_active, all target_temperature_x fields and hvac_mode data elements, and grants read permission to most of the structure data values. It should be noted that, in some embodiments, certain authorization rules may ensure that when data is written (e.g., modified) by a third party, the modified data includes a field (e.g., "touched_by") that is set equal to a reserved value indicating that a third party made a change and/or a modified at date/time that is set to date/time the data was modified. In this way, third party activity with resources in the data model may be logged and monitored.

The smoke+CO read scope grants read permission to all the smoke+CO alarm data values and most of the structure data values, as show in the table above. The smoke+CO read scope version 2 includes the same permissions for all of the data values included in version 1 but adds additional read permission to the is_manual_test_active data element and the last_manual_test_time data element. The name data value may be displayed in user interface labels, while the name_long may be used in long form text. Device_id may be a string that uniquely represents this device. When a device is connected to multiple clients, each developer may see a different device_id for that device. In embodiments where the same developer has installed multiple clients for the device, the developer may see the same device_id. The

Smoke + CO Read Scope

| Name | | Smoke + CO read | Smoke + CO read |
|---|---|---|---|
| Fields | ID | 12 | 21 |
| | Version | 1 | 2 |
| /devices/smoke_co_alarms/device_id/device_id | | READ | READ |
| /devices/smoke_co_alarms/device_id/locale | | READ | READ |
| /devices/smoke_co_alarms/device_id/software_version | | READ | READ |
| /devices/smoke_co_alarms/device_id structure_id | | READ | READ |
| /devices/smoke_co_alarms/device_id/name | | READ | READ |
| /devices/smoke_co_alarms/device_id/name_long | | READ | READ |
| /devices/smoke_co_alarms/device_id/last_connection | | READ | READ |
| /devices/smoke_co_alarms/device_id/is_online | | READ | READ |
| /devices/smoke_co_alarms/device_id/battery_health | | READ | READ |
| /devices/smoke__alarms/device_id/co_alarm_state | | READ | READ |
| /devices/smoke_co_alarms/device_id/smoke_alarm_state | | READ | READ |
| /devices/smoke_co_alarms/device_id/ui_color_state | | READ | READ |
| /devices/smoke_co_alarms/device_id/is_manual_test_active | | | READ |
| /devices/smoke_co_alarms/device_id/last_manual_test_time | | | READ |
| /structures/structure_id/structure_id | | READ | READ |
| /structures/structure_id/thermostats | | READ | READ |
| /structures/structure_id/smoke_co_alarms | | READ | READ |
| /structures/structure_id/away | | READ | READ |
| /structures/structure_id/name | | READ | READ |
| /structures/structure_id/country_code | | READ | READ |
| /structures/structure_id/postal_code | | | |
| /structures/structure_id/peak_period_start_time | | | |
| /structures/structure_id/peak_period_end_time | | | |
| /structures/structure_id/time_zone | | READ | READ |
| /structures/structure_id/eta | | | |
| /structures/structure_id/data_upload | | | | locale data value may include the language and country code assigned to the device. Software_version may include a string that represents the firmware currently installed on the device. Structure_id may include a string that uniquely represents this structure (the structure that the device is paired with). Last_connection may include the timestamp of the last successful connection to the data service 84. Is_online may include the online status that is determined by using the last connection time and an expected reconnection window that is device specific. Battery_health may include a string that states whether the battery is OK or whether it needs to be replaced.

Co_alarm_state may include values that increase in severity. For example, when the CO levels are rising, the co_alarm_state may show "warning" and when the user should exit the home, the co_alarm_state may show "emergency." Smoke alarm state may include values that increase in severity. For example, when the smoke levels are rising, the smoke_alarm_state may show "warning" and when the user should exit the home, the smoke_alarm_state may show "emergency." The is_manual_test_active data value is normally "false" but may be "true" when a smoke or CO test is started. Last_manual_test_time may include the timestamp of the last successful manual smoke or CO test. The ui_color_state data value may be derived from is_online, battery_health, co_alarm_state, and smoke_alarm_state. The ui_color_state may mirror the color that is displayed on an app and/or the device.

| Away Read Scope | | |
|---|---|---|
| Name | | Away read |
| Fields | ID | 14 |
| | Version | 1 |
| /structures/structure_id/structure_id | | READ |
| /structures/structure_id/thermostats | | READ |
| /structures/structure_id/smoke_co_alarms | | READ |
| /structures/structure_id/away | | READ |
| /structures/structure_id/name | | READ |
| /structures/structure_id/country_code | | READ |
| /structures/structure_id/postal_code | | |
| /structures/structure_id/peak_period_start_time | | |
| /structures/structure_id/peak_period_end_time | | |
| /structures/structure_id/time_zone | | READ |
| /structures/structure_id/eta | | |
| /structures/structure_id/data_upload | | |

As described above and shown in the Away Read Scope table, the away read scope grants read permission to most of the structure data values. For example, version 1 of the away read scope grants read permission to /structures/structure_id/structure_id, /structures/structure_id/thermostats, /structures/structure_id/smoke_co_alarms, /structures/structure_id/away, /structures/structure_id/name, /structures/structure_id/country_code, and /structures/structure_id/time_zone. Version 1 of the away read scope does not provide read or write permission to the following data elements: /structures/structure_id/postal_code, /structures/structure_id/peak_period_start_time, /structures/structure_id/peak_period_end_time, /structures/structure_id/eta, or /structures/structure_id/data_upload. It should be noted that the away field may indicate whether the structure is occupied and may include three states: home (someone is in the house, either because the smart device determines that someone is in the house based on motion sensor data or the user has explicitly set the structure to home via an application, the client, or ETA), away (the user has explicitly set the structure to away), auto-away (the smart device has determined that no one is in the structure).

| Away Read/Write Scope | | |
|---|---|---|
| Name | | Away read/write |
| Fields | ID | 15 |
| | Version | 1 |
| /structures/structure_id/structure_id | | READ |
| /structures/structure_id/thermostats | | READ |
| /structures/structure_id/smoke_co_alarms | | READ |
| /structures/structure_id/away | | READ WRITE |
| /structures/structure_id/name | | READ |
| /structures/structure_id/country_code | | READ |
| /structures/structure_id/postal_code | | |
| /structures/structure_id/peak_period_start_time | | |
| /structures/structure_id/peak_period_end_time | | |
| /structures/structure_id/time_zone | | READ |
| /structures/structure_id/eta | | |
| /structures/structure_id/data_upload | | |

As described above and shown in the Away Read/Write Scope table, the away read/write scope grants read permission to most of the structure data values (e.g., the same data values that read permissions are granted in the away read scope) and grants read/write permission for the away data value.

| ETA Write Scope | | |
|---|---|---|
| Name | | ETA write |
| Fields | ID | 17 |
| | Version | 1 |
| /structures/structure_id/structure_id | | READ |
| /structures/structure_id/thermostats | | READ |
| /structures/structure_id/smoke_co_alarms | | READ |
| /structures/structure_id/away | | |
| /structures/structure_id/name | | READ |
| /structures/structure_id/country_code | | READ |
| /structures/structure_id/postal_code | | |
| /structures/structure_id/peak_period_start_time | | |
| /structures/structure_id/peak_period_end_time | | |
| /structures/structure_id/time_zone | | READ |
| /structures/structure_id/eta | | WRITE |
| /structures/structure_id/data_upload | | |

As described above and shown in the ETA Write Scope table, the ETA write scope grants read permission to most of the structure data values and grants write permission to the eta data value. For example, version 1 of the ETA write scope grants read permission to /structures/structure_id/structure_id, /structures/structure_id/thermostats, /structures/structure_id/smoke_co_alarms, /structures/structure_id/name, /structures/structure_id/country_code, and /structures/structure_id/time_zone. Version 1 of the away read scope does not provide read or write permission to the following data elements: /structures/structure_id/away, /structures/structure_id/postal_code, /structures/structure_id/peak_period_start_time, /structures/structure_id/peak_period_end_time, /structures/structure_id/eta, or /structures/structure_id/data_upload. It should be noted that ETA is an object, set on a structure and only write access is allowed. The ETA field should be used to provide information on when the smart thermostat 46 should prepare the temperature of a house for people arriving.

| Postal Code Read Scope | | |
| --- | --- | --- |
| Name | | Postal code read |
| Fields | ID | 22 |
| | Version | 1 |
| | /structures/structure_id/postal_code | READ |

As described above and shown in the Postal Code Read Scope table, the postal code read scope grants read permission to the postal code data value.

| Product Data Read/Write Scope | | |
| --- | --- | --- |
| Name | | Product data read/write |
| Fields | ID | 23 |
| | Version | 1 |
| | /devices/$company/$product_type/product_id/identification/device_id | READ |
| | /devices/$company/$product_type/product_id/identification/serial_number | READ |
| | /devices/$company/$product_type/product_id/location/structure_id | READ |
| | /devices/$company/$product_type/product_id/software/version | READ/WRITE |
| | /devices/$company/$product_type/product_id/resource_use/electricity/value | READ/WRITE |
| | /devices/$company/$product_type/product_id/resource_use/electricity/measurement_reset_time | READ/WRITE |
| | /devices/$company/$product_type/product_id/resource_use/electricity/measurement_time | READ/WRITE |
| | /devices/$company/$product_type/product_id/resource_use/gas/value | READ/WRITE |
| | /devices/$company/$product_type/product_id/resource_use/gas/measurement_reset_time | READ/WRITE |
| | /devices/$company/$product_type/product_id/resource_use/gas/measurement_time | READ/WRITE |
| | /devices/$company/$product_type/product_id/resource_use/water/value | READ/WRITE |
| | /devices/$company/$product_type/product_id/resource_use/water/measurement_reset_time | READ/WRITE |
| | /devices/$company/$product_type/product_id/resource_use/water/measurement_time | READ/WRITE |
| | /structures/structure_id/devices/$company/$product_type | READ |

As described above and shown in the Product Data Read/Write Scope table, the product data read/write scope grants read permission to some of the company and structures data values and grants read/write permission to most of the company data values. For example, version 1 of the product data read/write scope grants read permission to /devices/company/product_type/product_id/identification/device_id, /devices/$company/$product_type/product_id/identification/serial_number, /devices/company/product_type/product_id/location/structure_id, and /structures/structure_id/devices/$company/$product_type. Further, the product data read/write scope provides read/write permissions to /devices/$company/$product_type/product_id/software/version, /devices/$company/$product_type/product_id/resource_use/electricity/value, /devices/$company/$product_type/product_id/resource_use/electricity/measurement_reset_time, /devices/$company/$product_type/product_id/resource_use/electricity/measurement_time, /devices/$company/$product_type/product_id/resource_use/gas/value, /devices/$company/$product_type/product_id/resource_use/gas/measurement_reset_time /devices/$company/$product_type/product_id/resource_use/gas/measurement_time, /devices/$company/$product_type/product_id/resource_use/water/value, and /devices/$company/$product_type/product_id/resource_use/water/measurement_reset_time.

To assign scopes to clients 318 and/or client applications 352, a developer may first need to register the client 318 and/client application 352 in the data model. Developers may need a developer account to be eligible to create clients. Developer accounts may be created by users and the users may only be allowed one developer account. When initially created, the developer account may have low provisioning limits. Provisioning limits define how many clients a developer may have associated with it, and how many unique users a client may have. Each client may have its own user limit. User limits may be defined as soft and hard. Soft limits may be exposed to the developer and hard limits may be enforced programmatically. In some embodiments, a client active flag may (e.g., Boolean) may be set that indicates if the client is active. If the client active flag is false, no new sessions may be authorized and no access tokens can be validated. Also, a developer active flag (e.g., Boolean) may indicate if the developer is active. If the developer active flag is false, no new clients may be created, but existing clients may continue to work, including initiating new sessions.

The authorization server 191 may collect various statistics during operation. For example, the authorization server 191 may collect statistics related to authorizations, created access tokens requests, successful created access tokens requests, failed created access tokens requests, access token validation requests, successful access token validation requests, failed access token validation requests, access tokens by user requests, deleted access tokens requests, successful deleted access tokens requests, failed deleted access tokens requests, created client secrets requests, retrieved client secret requests, successful retrieved client secret requests, failed retrieved client secret requests, deleted client secret requests, successful deleted client secret requests, failed deleted client secret requests, and/or reserved client sessions.

When creating a client, the developer may select the scopes that the client may need based on their intended use of the data and functionality. It should be noted that the term client may refer to a developer created integration point which defines the set of scopes an end user will be asked to grant the developer. It should also be noted that the term vendor may refer to an organization that produces third party devices (e.g., an electronic device produced by a manufacturer that does not host the data model) in a service or data streams. The data model may include two tables to store vendor data (vendors table) and associations with developers (vendor developer association table). The vendors table may contain the following fields at a minimum: unique ID (a UUID), data path name, and created at timestamp. The UUID is assigned when the vendor record is created. The UUID value may not be changed after creation. The data path name may include a unique string, with no spaces, that may be used to identify the vendor's section of the data model. The data path name is not intended to be exposed to end users. The value of the data path name may not be changed after it is created. The created at timestamp may include the timestamp of when the vendor was created.

The vendor developer association table may map the vendors to the developers that created the vendors in the data model. The vendor developer association table may include at least three columns: vendor ID, developer ID, and created at timestamp. The vendor ID may include the ID of the vendor, which may be a foreign key to the vendors table. The developer ID may include the ID of the developer, which may be a foreign key to the developers table. The created at timestamp may include the timestamp of when the vendor developer association was created. In some embodiments, there may be a one to one relationship between a developer and a vendor. That is, there may be a programmatic restriction that only allows one developer to have one vendor.

APIs may be used to manage the vendors and the vendor developer associations. For example, functionality provided by the APIs may include creating a vendor, associating a vendor with a developer (associating a vendor with a developer may add the developer's user to the vendor user group), and disassociating a vendor from a developer (disassociating a vendor from a developer may inhibit new clients being created with the vendor data scopes but may not remove vendor data scopes and permissions from existing clients and authorization sessions).

In some embodiments, an assignable permission may be used by the scopes. An assignable permission may include an attribute placeholder in certain element data paths that will be replaced with the vendor data path names when clients 318 are created by the developer. For example, a general definition of an assignable permission may include /$vendor/* and /structures/*/$vendor/clients/*. The assignable permission after being assigned to a client for a vendor named "Company A" may include /companya/* and /structures/*/companya/clients/*. If a scope is assignable, a replacement may be run on all placeholders when the scope is added to the client 318. In some embodiments, scopes with assignable attributes may be restricted to developers who are in the vendor user group.

The assignable permissions and associated vendors may enable a developer to have a vendor associated with it and the string to access the data element. The assignable permission allows a vendor to provide its specific data into the data model and to read that data as desired using their vendor specific data path. As such, the data model may include a section with vendor's device id and data specific to the client to be entered into the model. The assignable permission offers selective visibility into the data model based on vendor. Each device added gets a new device id and permissions levels to allow access to certain data. Each vendor may only be allowed to see data specific to each respective vendor. To enable a client to enter and read data related to their devices into the data model, a vendor record may be created in the vendors table and a record may be created that associates the vendor to the developer in the vendor developer association table. The vendor can then register specific devices (the vendor has a device of a device type to associate with a structure, so a record is created for that device in a user's structure in the data model) and use device services 84 to access the data model including the vendor specific data (using data path name with the vendor's name inserted via the assignable permissions). In some embodiments, a first vendor specific information in the data model may be accessed by one or more other vendors if the first vendor authorizes the one or more other vendors.

In some embodiments, a client 318 may be locked with the scopes that are provided by the developer when creating the client 318. If new elements are added to the data model and included in different versions of certain scopes, a new client may be created and assigned the scopes including the new elements. In some embodiments, updatable client scopes may be used to version the client. If it is desirable to change the scope information for a client, a different version of the client including the desired scopes may be selected. For example, version 1 of the client may be assigned scope with ID "10" and version 2 of the client may be assigned scopes with IDs "10" and "20". A message may appear in an end user app that indicates a developer has updated their client and would like to have access to the following permissions. If the user 316 approves, then the permissions for version 2 are copied into the permissions list for the authorization session and included in the string including the access token without having to go through a back and forth process between the device service 84 and/or API 90 and the client 318. The process may include one click by the user to change an existing session for a client 318 to modify the allowed scopes.

In some embodiments, various database tables may be used to manage vendors, developers, clients, access tokens, and the like. The tables may be designed in a relational manner. That is, some of the tables may share elements that are the same to match the elements and pull all of the information related to those particular elements. For example, a client table may include a client ID and a user table may include a user ID. An access token table may include an access token ID data element and the client ID and the user ID data elements. In doing so, the access token table shows which client ID's and user ID's are associated with which access token ID's. Similarly, an authorization code table may include an authorization code ID data element and both the user ID and the client ID. In doing so, the authorization code table shows which client ID's and user ID's are associated with which authorization code ID's. In addition, a scopes table may be used to maintain a scope ID and the permissions included in the scopes. When the user approves a scope for a client, the scope ID that is approved and the access token ID that correlates to the client may be stored in an access token and scopes table, and so forth.

In some embodiments, the authorization server 191 may include one or more servers that provide different functionality. For example, one server may not be exposed to the public and include low level functions for managing authorization codes, access tokens, client secrets, scopes and permissions, while a second server may be exposed to the public and include functions for higher level logic of the authorization code and access token granting process (query client information and list of scopes assigned, authenticate user and fetch user ID, validate user's consent to grant client's requested scopes, handle redirects, receive request for authorization code and access token in a GET REST web service call with query parameter format).

The internally-facing server (e.g., the server that is not publicly exposed) may include multiple API URLs that provide various functionalities. For example, the functionalities may include creating new authorization codes, creating new access tokens, validating access tokens, deleting access tokens, creating new client secrets, retrieving client ID, deleting client secrets, and the like. The requests and responses may be in the form of JSON.

In some embodiments, an API URL to retrieve an authorization code may be used. A request to the API URL may include the user ID, client ID, PIN request, permissions, and/or associated scope IDs. The response may return a status, the authorization code, expires at date/time, and/or the scope IDs.

In some embodiments, an API URL to retrieve an access token may be used. A request to the API URL may include the client ID, client secret, and/or authorization code. The response may return a status, the access token, and/or expires_at date/time.

In some embodiments, an API URL to validate an access token may be used. A request to the API URL may include the access token, which may be a long unique string. In some embodiments, the access token may include a leading letter, "c", a dot ".", and a long random string where the characters are all URL compatible (e.g., c.hpNS6bLYNOqYzhAyAIR200dzR6asdfswerASDFAFS324235). The response may return a status, the user ID, the client ID, the user token, permissions, and the scope IDs if the access token is valid.

In some embodiments, an API URL to delete an access token may be used. If the deletion is successful, a response may include the access token, expires at date/time, created at date/time, ID, and client ID. If the deletion fails, the response may include a status indicating the same.

In some embodiments, an API URL to create a client secret and/or replace an existing client secret for a client ID may be used. A response may include the client ID and the client secret that is created.

In some embodiments, an API URL to get the client secret may be used. A response may include the client secret that is requested.

In some embodiments, an API URL to get a client ID and a client secret may be used. A response may include the client ID and the client secret that is requested.

In some embodiments, an API URL to delete a client secret may be used. If a deletion request is successful, the response may include a status indicating that the deletion was successful. If the deletion request failed, then the response may include a status indicating that the deletion failed.

The publicly exposed server used by the authorization server 191 may also provide various functionality, such as validating an access token, getting an authorization code, revoking access to a user's data for a client, removing authorizations for all user's clients, getting all clients for a user, getting a specific client or a user with sessions, getting all clients, checking if a client exists, getting a client ID, updating a client, deleting a client, creating a client, setting the active state on a client, setting the users limit on a client, getting the status of a client's users limit, getting developer information, updating a developer, creating a new developer account, setting the active state on a developer, setting the clients limit on a developer, setting the support flags on a developer, updating a justification for a scope, getting all clients for a developer, getting client for a specific developer, getting all client categories, getting all scopes, getting all restrictions on a scope, adding a restriction to a scope, removing a restriction from a scope, obtaining an access token using an authorization code, populating target structure with a fake device (thermostat), and/or deleting a session. The functionalities may be included in various API URLs, as generally described below.

In some embodiments, an API URL that validates an access token may be used. A request to the API URL may include the access token. If the access token is not valid, only a valid field may be returned indicating that the access token is not valid. If the access token is valid, then the valid field, user ID, client ID, company name, client name, user token, permissions, session ID, and/or scope IDs may be returned.

In some embodiments, an API URL to get an authorization code may be used. A request may include a client ID. If successful, the response may include a status and the authorization code, expires at date/time, and scope IDs.

In some embodiments, an API URL to revoke access to user's data for a client may be used. A request to the API URL may include an access token associated with a client and user. If revocation is successful, the response may include a status and a message indicating that the session has been deleted. If revocation is unsuccessful, an error response may be returned and include a reason for the error, such as the session was not found or was unable to be deleted.

In some embodiments, an API URL to remove authorizations for all user's clients may be used. A request to the API URL may include an access token. If removal is successful, the response may include a status and a message indicating that the session has been deleted. If removal is unsuccessful, an error response may be returned and include a message indicating that the session was unable to be deleted.

In some embodiments, an API URL to get all clients for a user (including sessions) may be used. A request to the API URL may include an access token associated with the clients and the user. A response may include an ID, name, company name, description, redirect URI, scopes (ID, justification, name, version), targeted number users, intended usage, active, active, users limit, visibility IDs, category IDs, sessions, modified at date/time, created at date/time, and so forth.

In some embodiments, an API URL to get a specific client for a user with sessions may be used. A request may include an access token associated with the client and the user. A response may include information related to the client, such as an ID, name, company name, description, redirect URI, scopes (ID, justification, name, version), targeted number users, intended usage, active, active, users limit, visibility IDs, category IDs, sessions, modified at date/time, created at date/time, and so forth.

In some embodiments, an API URL to get all clients may be used. A response may include client information, such as ID, name, company name, description, redirect URI, support URL, scopes (ID, justification, name, version), targeted number users, intended usage, active, active, users limit, visibility IDs, category IDs, sessions, modified at date/time, created at date/time, and so forth.

In some embodiments, an API URL to check if a client exists may be used. A request may include an access token and parameters including a name (e.g., URL encoded name to check). A response may include a status, name, in use field, and so forth.

In some embodiments, an API URL to update a client may be used. A request may include an access token and fields related to the client to update, such as name, description, redirect URI, support URL, targeted number users, and/or intended usage. It should be noted that all fields may be optional and only the fields included in the request may be updated. The response may include a status and all fields related to the client, such as ID, name, company name, description, redirect URI, support URL, scopes (ID, justification, name, version), targeted number users, intended usage, active, users limit, visibility IDs, category IDs, developer IDs, modified at date/time, created at date/time, and so forth.

In some embodiments, an API URL to delete a client may be used. A request may include an access token associated with the client to delete. A response may include a status indicative of whether the deletion request was successful. In some embodiments, a client may be deleted if it has fewer than a threshold number of users (e.g., 25, 30, 35) to which it is associated. For example, in some embodiments, the owner may delete clients that have less than 25 users.

In some embodiments, an API URL to create a client may be used. A request may include an access token and fields including developer ID, name, description, redirect URI, support URL, targeted number users, intended usage, scopes (ID, justification), and/or category IDs. In some embodiments, the name may be unique. A response may include a status and fields including ID, name, company name, description, redirect URI, support URL, scopes (ID, justification, name, version), targeted number users, intended usage, active, visibility IDs, category IDs, developer ID, secret, modified at time/date, and/or created at time/date. An error response may be returned in several instances, including when there is no developer account, the provisioning limit is exceeded, the user does not own the developer account, the developer is not active, there is a duplicate client name, the requestor is unauthorized, and/or the requestor is not a staff user.

In some embodiments, an API URL to set active state on a client may be used. A request may include an access token and an active state. A response may include a status and the active state.

In some embodiments, an API URL to set the users limit on a client may be used. A request may include an access token and a soft and a hard number of users limit. A response may include a status and the soft and hard limits.

In some embodiments, an API URL to get the status of a client's user limit may be used. A request may include an access token. A response may include a status, user limit, user count, and/or status OK (e.g., set to "true" if the users limit is not exceeded and set to "false" if over users limit).

In some embodiments, an API URL to get developer information may be used. A request may include an access token. A response may include a status and developer information, such as ID, user ID associated with the developer, active state, client limit, address information, name, phone, company name, company URL, industry, company size, support (commercial and paid), modified at time/date, and/or created at time/date.

In some embodiments, an API URL to update a developer may be used. A request may include an access token and developer information to update, such as phone, company name, address information, company URL, industry, and/or company size. It should be noted that, in some embodiments, all fields in the body of the request may be optional and only the submitted fields may be updated. A response may include a status and the developer's information, such as ID, user ID, active, client limit, address information, name, phone, company name, company URL, industry, company size, support (commercial and paid), modified at time/date, and/or created at time/date.

In some embodiments, an API URL to create a developer account may be used. A request may include an access token and developer information, such as user ID, name, phone, company name, address information (e.g., first street information, second street information, city, state, postal code, country), company URL, industry, and/or company size. A response may include a status and the developer's information, such as ID, user ID, active, client limit, address information (e.g., first street information, second street information, city, state, postal code, country), name, phone, company name, company URL, industry, company size, support (commercial and paid), modified at time/date, and/or created at time/date.

In some embodiments, an API URL to set the active state on a developer may be used. A request may include an access token and active state of a developer. A response may include a status and the active state of the developer.

In some embodiments, an API URL to update a scope's justification may be used. A request may include an access token, scope ID, and updated justification. The response may include a status, scope ID, and updated justification.

In some embodiments, an API URL to get all clients for a developer may be used. A request may include an access token. A response may include client information, such as client ID, name, company name, description, redirect URI, support URL, scopes (ID, justification, name, version), targeted number users, intended usage, active, users limit, visibility IDs, category IDs, secret, modified at date/time, and/or created at date/time.

In some embodiments, an API URL to get all client for a specific developer may be used. A request may include an access token. A response may include a status and client information, such as client ID, name, company name, description, redirect URI, support URL, scopes (ID, justification, name, version), targeted number users, intended usage, active, users limit, visibility IDs, category IDs, developer ID, secret, modified at date/time, and/or created at date/time.

In some embodiments, an API URL to get all client categories may be used. A response may include a status, client category ID, and name for the client category.

In some embodiments, an API URL to get all scopes may be used. A response may include a status, scope ID, scope name, and version of the scopes.

In some embodiments, an API URL to get all restrictions on a scope may be used. Restrictions may limit a scope to particular data elements, clients, users, and so forth. A response returned by this API URL may include a status and names of user groups restricting the scope.

In some embodiments, an API URL to add a restriction to a scope may be used. A request may include the restriction to be added to the scope and scope ID. A response may include a status and a message field indicating that the scope restriction has been added.

In some embodiments, an API URL to delete a restriction to a scope may be used. A request may include the restriction to be deleted and scope ID. A response may include a status and a message field indicating that the scope restriction has been deleted.

| Server to Server Call from Client to Authorization Server to Obtain an Access Token from an Authorization Code API URL |
|---|

```
POST
/oauth2/access_token?code=STRING&client_id=STRING&client_secret=STRING
&grant_type=authorization_code
Request:
    • url parameters:
        o  code : the authorization_code provided in the call to /oauth2/authorize.
        o  client_id : id of the client (application) requesting access to a user's
data.
        o  client_secret : secret key provided by Nest to client. This is also
           sometimes called a "application key".
        o  grant_type : may be authorization_code
Response:
    • status: 200
    • content type : application/json
    • body :
           {
           "access_ token":"STRING",
           "expires_in":LONG // number of seconds until token expires
           }
Error Response:
    • Missing parameter:
        o  status: 400
        o  contenttype: application/json
        o  body: {"error":"missing_paramenter", "error_description":"missing
           required parameters: PARM_NAME"}
    • Authorization code not found:
        o  status: 400
        o  contenttype: application/json
        o  body: {"error":"oauth2_error", "error_description":"authorization code
           not found"}
    • Authorization code expired:
        o  status: 400
        o  contenttype: application/json
        o  body: {"error":"oauth2_error", "error_description":"authorization code
           expired"}
    • Client secret not found:
        o  status: 400
        o  contenttype: application/json
        o  body: {"error":"oauth2_error", "error_description":"client secret not
           found"}
    • Client is not active:
        o  status: 403
        o  contenttype: application/json
        o  body: {"error":"client_not_active", "error_description":"client is not
           active"}
    • redirect_uri parameter present:
        o  status: 400
        o  contenttype: application/json
        o  body:    {"error":"input_error","error_description":"redirect_uri not
           allowed"}
```

The server to server call from a client to the authorization server 191 to obtain an access token from an authorization code API URL displayed above includes the contents of a sample JSON request and response. As displayed, the request may include an URL parameters including the authorization code provided in the call to /oauth2/authorize, the client ID requesting access to a user's data, the client secret key provided by the authorization server 191 to the client, and the grant type. The response may include a status, content type, and a body including fields related to the access token, and the expires in number of seconds until the token expires. An error may occur in several scenarios including when a parameter is missing, an authorization code is not found, an authorization code expired, a client secret not found, a client is not active and a redirect URI parameter is present. If any of the above errors occurs, an error response may include a status including a different status ID for the error, content type, and a body including a message indicating which error occurred.

In some embodiments, an API URL to populate a target structure with a fake device (e.g., thermostat, smoke detector) to test a client's access and/or usage of the data model may be used. A response may include a status and an empty message body for the sub-elements of the fake device.

In some embodiments, an API URL to delete a session (invalidate the access token) may be used. A request to delete the session, which invalidates the access token, may include the access token to be invalidated. A response may include a status.

iii. Data Model

As discussed above, clients 182 communicate with the structures 10D and devices (e.g. 10A-10C) via a shared data model (e.g., a shared JSON document) stored and/or accessible by the device service 84. For example, application programming interface (API) clients or API client devices may send one or more requests to the API 90 or device service 84 to retrieve, access, view, subscribe, or modify data in the data model representative of one or more smart environments. Sending the requests may be implemented by the API client or API client device as computer instructions stored on one or more tangible, non-transitory computer-readable media and executed by a processor. Data in the data model may be organized hierarchically. At the top level of the hierarchy are metadata, devices, and structures. Specific device types are modeled under the devices object, such as thermostats and/or hazard detectors (e.g., smoke and CO alarms). In some embodiments, the metadata data object, the devices data object, and the structures data object may be peers relative to one another (e.g., at the same relative level to one another) in the hierarchy. In addition, the data model may be a single unified instance that is scalable for additional devices (e.g., thermostats, hazard detectors, and/or party devices), companies, and/or structures. For example, below is an example of a hierarchically structured data model, in accordance with an embodiment.

Data Model with Metadata, Devices, and Structures

```
{
  "metadata": {
    "access_token": "c.FmDPkzyzaQe..." ,
    "client_version": 1
  },
  "devices": {
    "thermostats": {
      "peyiJNo0IldT2YlIVtYaGQ": {
        "device_id": "peyiJNo0IldT2YlIVtYaGQ" ,
        "locale": "en-US" ,
        "software_version": "4.0" ,
        "structure_id": "VqFabWH21nwVyd4RWgJgNb292wa7hG_dUwo2i2SG7j3-BOLY0BA4sw" ,
        "name": "Hallway (upstairs)" ,
        "name_long": "Hallway Thermostat (upstairs)" ,
        "last_connection": "2015-10-31T23:59:59.000Z" ,
        "is_online": true ,
        "can_cool": true ,
        "can_heat": true ,
        "is_using_emergency_heat": true ,
        "has_fan": true ,
        "fan_timer_active": true ,
        "fan_timer_timeout": "2015-10-31T23:59:59.000Z" ,
        "has_leaf": true ,
        "temperature_scale": "C" ,
        "target_temperature_f": 72 ,
        "target_temperature_c": 21.5 ,
        "target_temperature_high_f": 72 ,
        "target_temperature_high_c": 21.5 ,
        "target_temperature_low_f": 64 ,
        "target_temperature_low_c": 17.5 ,
        "away_temperature_high_f": 72 ,
        "away_temperature_high_c": 21.5 ,
        "away_temperature_low_f": 64 ,
        "away_temperature_low_c": 17.5 ,
        "hvac_mode": "heat" ,
        "ambient_temperature_f": 72 ,
        "ambient_temperature_c": 21.5 ,
        "humidity": 40
      }
    },
    "smoke_co_alarms": {
      "RTMTKxsQTCxzVcsySOHPxKoF4OyCifrs": {
        "device_id": "RTMTKxsQTCxzVcsySOHPxKoF4OyCifrs" ,
        "locale": "en-US" ,
        "software_version": "1.01" ,
        "structure_id": "VqFabWH21nwVyd4RWgJgNb292wa7hG_dUwo2i2SG7j3-BOLY0BA4sw" ,
        "name": "Hallway (upstairs)" ,
        "name_long": "Hallway Protect (upstairs)" ,
        "last_connection": "2015-10-31T23:59:59.000Z" ,
        "is_online": true ,
        "battery_health": "ok" ,
        "co_alarm_state": "ok" ,
        "smoke_alarm_state": "ok" ,
        "is_manual_test_active": true ,
        "last_manual_test_time": "2015-10-31T23:59:59.000Z" ,
        "ui_color_state": "gray"
      }
    },
    "$company": {
      "$product_type": {
        "CPMEMSnC48JlSAHjQIp-aHI72IjLYHK_ul_c54UFb8CmPXNj4ixLbg" : {
          "identification": {
            "device_id": "CPMEMSnC48JlSAHjQIp-kHI72IjLYHK_ul_c54UFb8CmPXNj4ixLbg" ,
            "serial_number": "1L090B50230"
          },
```

| Data Model with Metadata, Devices, and Structures |
|---|
| ```
    "location": {
        "structure_id": "VqFabWH21nwVyd4RWgJgNb292wa7hG_dUwo2i2SG7j3-BOLY0BA4sw"
    },
    "software": {
      "version": "1.0"
    },
    "resource_use": {
      "electricity": {
        "value": 42.789 ,
        "measurement_reset_time": "2015-01-01T01:01:01.000Z" ,
        "measurement_time": "2015-01-01T01:02:35.000Z"
      },
      "gas": {
        "value": 0.345234545 ,
        "measurement_reset_time": "2015-01-01T01:01:01.000Z" ,
        "measurement_time": "2015-01-01T01:02:35.000Z"
      },
      "water": {
        "value": 10000.3 ,
        "measurement_reset_time": "2015-01-01T01:01:01.000Z" ,
        "measurement_time": "2015-01-01T01:02:35.000Z"
      }
     }
    }
   }
  }
 },
 "structures": {
   "VqFabWH21nwVyd4RWgJgNb292wa7hG_dUwo2i2SG7j3-BOLY0BA4sw" : {
     "structure_id": "VqFabWH21nwVyd4RWgJgNb292wa7hG_dUwo2i2SG7j3-BOLY0BA4sw" ,
     "thermostats": [ "peyiJNo0IldT2YlIVtYaGQ" , ... ] ,
     "smoke_co_alarms": [ "RTMTKxsQTCxzVcsySOHPxKoF4OyCifrs" , ... ] ,
     "devices": {
        "$company": {
           "$product_type": [ "CPMEMSnC48JlSAHjQIp-aHI72IjLYHK_ul_c54UFb8CmPXNj4ixLbg" , ... ]
        }
     },
     "away": "home" ,
     "name": "Home" ,
     "country_code": "US" ,
     "postal_code": "94304" ,
     "peak_period_start_time": "2015-10-31T23:59:59.000Z" ,
     "peak_period_end_time": "2015-10-31T23:59:59.000Z" ,
     "time_zone": "America/Los_Angeles" ,
     "eta": {
       "trip_id": "myTripHome1024" ,
       "estimated_arrival_window_begin": "2015-10-31T22:42:59.000Z" ,
       "estimated_arrival_window_end": "2015-10-31T23:59:59.000Z"
     }
   }
  }
 }
}
``` |

As illustrated, metadata may be added to the data model. The metadata object includes additional information that is provided when making a call to the API (e.g., via REST and/or Firebase). The access token element acts as an authorization element that is used to provide proof that a user has authorized the client 182 to make API calls on their behalf. The access token element is also used to identify which user to which the data is associated with when receiving responses from a MUI call, as described above. The client version is an indication of the last user-authorized version of a client 182 and is associated with the access token.

Further, specific device types are modeled under the "devices" object. For example, in the current example, a thermostat 10A and detector 10B are modeled. It should be noted that other devices types may be modeled, such as cameras, security alarms, and the like. Additionally, a "company" object may be modeled under the "devices" object, as explained in detail below. Further, a structure is modeled. A structure represents a physical building. Structures 10D contain devices (e.g. 10A-10C) as well as information for the building as a whole. For example, in one embodiment, an estimated time of arrival to the structure 10D and/or an "away" mode indicating that no one is currently occupying the structure may be maintained at the data model. Each of the devices and/or structures has an associated unique identifier, which enables the API calls to be accurately routed to the proper device object.

In some embodiments, the data model may be hierarchically constructed in a manner where the structures are at a higher level and devices are at a sub-level of a corresponding structure that the devices are associated with. Users of the system 180 may each have their own structure and/or device objects in the data model, which may be identified by an associated user identifier. Below is an example of a data model structure, where structures and devices are associated with a user.

---
Example Data Model 1
---
```
{
  "auth": {
    "505": {
      "myapp": "antoken" //antoken is a customized token payload
    }
  },
  "users": {
    "505": { //505 is a unique user identifier
      "structures": { //structures object
        "f3d0c560-03f2-11e1-98a4-1231381aa376": { //structures
          unique identifier
          "country_code": "US",
          "name": "home",
          "away": false,
          "location": "Sunnyvale, CA",
          "postal_code": "94087",
          "away_setter": 1
          "devices": { // device associated with the structure
            "01AA01AB431100RF": { //device unique identifier
              "temperature_scale": "F",
              "country_code": "US",
              "current_temperature": 21.5,
              "name": "Senior Zirconia",
              "fan_mode": "auto",
              "device_locale": "en_US",
              "target_temperature_type": "heat",
              "can_cool": false,
              "postal_code": "94087",
              "current_humidity": 52,
              "can_heat": true,
              "last_connection": 1355181256000,
              "has_fan": false,
              "target_temperature": 20,
              "online": false
            }
          }
        }
      }
    }
  }
}
```

As illustrated, in the above embodiment, structure f3d0c560-03f2-11e1-98a4-1231381aa376 is implemented as a sub-level of the user 505, indicating that the structure is associated with this user. Any number of structures may be implemented and/or associated with a particular user. Further, one structure may be associated with many users. Further, the device 01AA01AB431100RF is implemented as a sub-level of structure object f3d0c560-03f2-11e1-98a4-1231381aa376, indicating that this device is a device of that structure. Any number of devices may be implemented and/or associated with a particular structure.

In an alternative embodiment, a topology of associations between devices and structures may be provided in the data model, as illustrated in the following Example Data Model 2:

---
Example Data Model 2
---
```
{
  "users" : {
    "505": {
      "structures": {
        "s1": { },
        "s2": { }
      }
```

---
Example Data Model 2
---
```
      "devices": {
        "d1": { }
        "d2": { }
      }
    }
    "topology": {
      "structures": {
        "s1": ["d1", "d2"],
        "s2": ["d3"]
      },
      "properties": {
      },
      "wings": {
      },
      "floors": {
      }
    }
  }
}
```

In Example Data Model 2, two structures s1 and s2 are associated with user 505. Further, devices d1 and d2 are associated with the user 505. The topology section associates the devices d1 and d2 with the structure s1 and associates a third device d3 that is not associated with the user 505 to the structure s2.

Honing in on the device objects, the devices (e.g., 10A-10C) may share a common base set of information such as a user-supplied name, software version and online status. Additionally, the data model may include information specific to a particular device type. For example, smoke and/or CO detectors 10B may build upon the common base set of information, adding alarm states. Further, thermostats 10A may add upon the common base set of information to add data that may enable control of HVAC systems and data regarding an observed climate of thermostat 10A. Below is an example of thermostat 10A and detector 10B objects of the data model.

---
Devices Data Model Objects
---
```
{
  "devices" : {
    "thermostats": {
      "peyiJNo0IldT2YlIVtYaGQ": {
        "device_id": "peyiJNo0IldT2YlIVtYaGQ" ,
        "locale": "en-US" ,
        "software_version": "4.0" ,
        "structure_id":
"VqFabWH21nwVyd4RWgJgNb292wa7hG_dUwo2i2SG7j3-BOLY0BA4sw" ,
        "name": "Hallway (upstairs)" ,
        "name_long": "Hallway Thermostat (upstairs)" ,
        "last_connection": "2014-10-31T23:59:59.000Z" ,
        "is_online": true ,
        "can_cool": true ,
        "can_heat": true ,
        "is_using_emergency_heat": true ,
        "has_fan": true ,
        "fan_timer_active": true ,
        "fan_timer_timeout": "2014-10-31T23:59:59.000Z" ,
        "has_leaf": true ,
        "temperature_scale": "C" ,
        "target_temperature_f": 72 ,
        "target_temperature_c": 21.5 ,
        "target_temperature_high_f": 72 ,
        "target_temperature_high_c": 21.5 ,
        "target_temperature_low_f": 64 ,
        "target_temperature_low_c": 17.5 ,
        "away_temperature_high_f": 72 ,
        "away_temperature_high_c": 21.5 ,
        "away_temperature_low_f": 64 ,
        "away_temperature_low_c": 17.5 ,
```

Devices Data Model Objects

```
            "hvac_mode": "heat" ,
            "ambient_temperature_f": 72 ,
            "ambient_temperature_c": 21.5 ,
            "humidity": 40
        }
    },
    "smoke_co_alarms": {
      "RTMTKxsQTCxzVcsySOHPxKoF4OyCifrs": {
            "device_id":
            "RTMTKxsQTCxzVcsySOHPxKoF4OyCifrs" ,
            "locale": "en-US" ,
            "software_version": "1.01" ,
            "structure_id":
"VqFabWH21nwVyd4RWgJgNb292wa7hG_dUwo2i2SG7j3-
BOLY0BA4sw" ,
            "name": "Hallway (upstairs)" ,
            "name_long": "Hallway Protect (upstairs)" ,
            "last_connection": "2014-10-31T23:59:59.000Z" ,
            "is_online": true ,
            "battery_health": "ok" ,
            "co_alarm_state": "ok" ,
            "smoke_alarm_state": "ok" ,
            "is_manual_test_active": true ,
            "last_manual_test_time": "2014-10-31T23:59:59.000Z" ,
            "ui_color_state": "gray"
        }
    }
    "$company": {
        "$product_type": {
          "CPMEMSnC48JlSAHjQIp-aHI72IjLYHK_ul_
c54UFb8CmPXNj4ixLbg": {
            "identification": {
                "device_id": "CPMEMSnC48JlSAHjQIp-
kHI72IjLYHK_ul_c54UFb8CmPXNj4ixLbg" ,
                "serial_number": "1L090B50230"
            },
            "location": {
                "structure_id":
"VqFabWH21nwVyd4RWgJgNb292wa7hG_dUwo2i2SG7j3-
BOLY0BA4sw"
            },
            "software": {
                "version": "1.0"
            },
            "resource_use": {
                "electricity": {
                    "value": 42.789 ,
                    "measurement_reset_time":
                    "2015-01-01T01:01:01.000Z" ,
                    "measurement_time": "2015-01-01T01:02:35.000Z"
                },
                "gas": {
                    "value": 0.345234545 ,
                    "measurement_reset_time":
                    "2015-01-01T01:01:01.000Z" ,
                    "measurement_time": "2015-01-01T01:02:35.000Z"
                },
                "water": {
                    "value": 10000.3 ,
                    "measurement_reset_time":
                    "2015-01-01T01:01:01.000Z" ,
                    "measurement_time": "2015-01-01T01:02:35.000Z"
                }
            }
        }
    }
}
```

As illustrated, a device identifier (device_id:String) may be associated with the thermostat 10A and/or detector 10B. The device_id element holds the unique identifier of the particular device. Further, each device may include the following elements: a country and language preference (locale:String), a software version (software_version: String), an associated structure (structure_id:String), a name (name:String) (e.g., short name for use in user interface labels), a long name (name_long:String) (e.g., for a more descriptive name), a last connection timestamp (last_connection:String), and a device connection status (is_online: Boolean).

The thermostat may add additional elements. Some of the elements may allow for the use of varied temperature scales (e.g., Fahrenheit and/or Celsius). The thermostat-specific elements may include: an indication that the HVAC system has a cooling ability (can_cool:Boolean), an indication that the HVAC system has a heating ability (can_heat:Boolean), a heat pump system emergency heating status indicator (is using emergency heat:Boolean), an indication of an ability to control the fan separately from heating or cooling (has_fan:Boolean), an indication if the fan timer is engaged, which may be used with a fan timer timeout to turn on the fan for a user-specified preset duration (fan_timer_active: Boolean), a timestamp showing when the fan timer reaches 0 (fan_timer_timeoutString), an indicator to display an energy-saving temperature indication (has_leaf:Boolean), a temperature scale to use (e.g., Celsius or Fahrenheit (temperature_scale:String), a desired target Fahrenheit temperature (target_temperature_f:int), a desired target Celsius temperature (target_temperature_c:float), a maximum target temperature in Fahrenheit (target_temperature_high_f:int), a maximum target temperature in Celsius (target_temperature_high_c:float), a minimum target temperature in Fahrenheit (target_temperature_low_f:int), a minimum target temperature in Celsius (target_temperature_low_c:float), a maximum away temperature in Fahrenheit (away_temperature_high_f:int), a maximum away temperature in Celsius (away_temperature_high_c:float), a minimum away temperature in Fahrenheit (away_temperature_low_f:int), a minimum away temperature in Celsius (away_temperature_low_c:float), an HVAC mode indicating heating, cooling, and/or heating-cooling modes (hvac_mode:String), an ambient temperature measured at the thermostat 10A in whole degrees Fahrenheit (ambient_temperature_f:float), an ambient temperature measured at the thermostat 10A in half degrees Celsius (away_temperature_low_c:float).

The detectors 10B may include additional elements as well. These additional elements may include: an indication of battery life/health and/or an estimate of time to end of life of the detector 10B (battery_health:enum string), a carbon monoxide detection alarm state (co_alarm_state:enum string), a smoke detection alarm state (smoke_alarm_state: enum string), an indication of whether or not the manual smoke and carbon monoxide alarm test is active (is_manual_test_active:Boolean), a timestamp indicating the time of the last successful manual test (last_manual_test_time: string), and/or an indicator of a color representative of device status (e.g., gray for offline, green for OK, yellow for warning, and/or red for emergency) (ui_color_state:enum string). The indicator of the color representative of device status may be derived from: is_online, battery_health, co_alarm_state, and/or smoke_alarm_state.

The company ($company:string) may represent a variable provided when a client is created and provided the "product data read/write" scope. The company variable may identify the company (e.g., client) as an entity that can share product data with the API 90 and/or device service 84. As illustrated, the company variable may include an element for a product type variable ($product_type:string) that is provided when a client is created with the product data read/write" scope. The product type variable may define the type of product, device, or appliance manufactured by the company.

The product type variable may be an object or an array, depending on the storage location. The product type variable may include a product unique identifier. For each product unique identifier, there may be several additional elements. For example, each product unique identifier may include an element for: identification, location, software, and resource use (resource_use). The identification (identification) element may contain product identifiers. For example, the identification element may contain: a device identifier (device_id:string), which is a unique device identifier for the product; and a serial number (serial_number:string), which is a serial number of the product or device. The location element may include a unique identifier for the structure (structure_id:string). The software element may include the software version identifier for the product (version:string). The resource use element may include elements for electricity, gas, and/or water. The electricity, gas, and/or water elements may include resource use data values and measurement timestamps. For example, the environment and gas elements may include a number of joules (value:number) consumed in a time period, a timestamp that identifies the start of the measurement time period (measurement_reset_time:string), a timestamp that identifies the measurement time (the time when the resource use data was measured) (measurement_time:string). The water element may include a number of liters consumed in the time period, a timestamp that identifies the start of the measurement time period (measurement_reset_time:string), a timestamp that identifies the measurement time (the time when the resource use data was measured) (measurement_time:string). It should be noted that, the devices object may be scalable to include one or more company objects and each of the one or more company objects may be scalable to include one or more product (e.g., device) type objects.

Additionally, as mentioned above, structures may be represented as an object of the data model. Below is an example of a shared structure object and its associated data that may be read and/or written to.

---
Structures Data Model Object
---

```
{
    "structures": {
        "VqFabWH21nwVyd4RWgJgNb292wa7hG_dUwo2i2SG7j3-
BOLY0BA4sw": {
            "structure_id": "VqFabWH21nwVyd4RWgJgNb292wa7hG_
dUwo2i2SG7j3-BOLY0BA4sw" ,
            "thermostats": [ "peyiJNo0IldT2YlIVtYaGQ" , ... ] ,
            "smoke_ co_alarms":
            [ "RTMTKxsQTCxzVcsySOHPxKoF4OyCifrs" , ... ] ,
            "away": "home" ,
            "name": "Home" ,
            "country_code": "US" ,
            "postal_code": "94304" ,
            "peak_period_start_time": "2014-10-31T23:59:59.000Z" ,
            "peak_period_end_time": "2014-10-31T23:59:59.000Z" ,
            "time_zone": "America/Los_Angeles" ,
            "eta": {
                "trip_id": "myTripHome1024" ,
                "estimated_arrival_window_begin":
                "2014-10-31T22:42:59.000Z" ,
                "estimated_arrival_window_end":
                "2014-10-31T23:59:59.000Z"
            }
        }
    }
}
```

The structures object may include: a unique identifier: (structure_id:string), one or more lists of devices associated with the structure (e.g., an array of thermostats 10A (thermostats:array) and/or an array of detectors 10B (smoke_co_alarms:array) that contain the unique identifiers of the thermostats 10A and/or detectors 10B, respectively). Further, the structure may include one or more indications of characteristics and/or statuses of the structure. For example, the structure object may include: an indication of the structure state (e.g., "away" state when no occupants are in the structure) (away:string), a name associated with the structure (name:string), a country code associated with the structure (country_code:string), a postal code associated with the structure (postal code:string), a start time for an energy event (e.g. Rush Hour Rewards by Nest®) (peak_period_start_time:string), an end time for an energy event (e.g. Rush Hour Rewards by Nest®) (peak_period_end_time:string), a time zone associated with the structure (time_zone:string), estimated time of arrival to the structure (eta object that includes: a unique identifier for the estimated time of arrival instance (trip_id:string), a beginning time for an estimated arrival window (estimated_arrival_window_begin:string), and/or an ending time for an estimated arrival window (estimated_arrival_window_end:string). In instances where there is a particular estimated time of arrival rather than a window of arrival time, the beginning and end times may be set equal to the particular estimated time of arrival.

In the API 90, the concept of "Home" or "Away" is a powerful aspect that may affect the behaviors of certain smart device (e.g. thermostat 10A, detector 10B, and/or device 10C) features. For example, many energy savings and/or convenience features may be implemented using the "Home" or "Away" concept. For example, when integrated with other devices in the structure via the API 90, clients 182 can further manage user comfort and safety. For example, clients can: turn off the lights when the home goes into Away, send a notification if the house is Away and the garage door is open, play music when the house switches to Home, etc.

The indication of structure state (e.g. "away" mode) may include an indication for "home" when someone is occupying the structure, "away" when a user has explicitly set the structure to away, and/or "auto-away" when it has algorithmically been determined that no one is in the structure.

Users have the ability to manually activate Home/Away via smart device controls, web applications, etc., while the API 90 offers an additional access point via the clients 182. The API 90 provides the ability to directly set Home and Away, as well as listen for changes to these states. Further, a variety of signals within the structure may be used to detect human presence in a Home, and can set a sub-state of Away, called Auto-Away. If the device service 84 and/or the smart devices detect no presence for an extended period of time, they may automatically set the home to Auto-Away. Upon detection of human presence, the state of the structure may return to the Home state.

As mentioned above, depending on their access rights, clients 182 can read and/or write to the sections of the data model. Accordingly, subscribing to changes to the data model enables clients 182 to react in real time to changes made to the system 180. Thus, using the API 90, clients 182 may access smart device services 84 to control and/or provide data to one or more smart devices. For example, when a structure and/or thermostat is set to "away" mode, this status may be provided through the API 90 to the clients 182, which may then turn off one or more devices (e.g., smart lighting systems, etc.).

In some embodiments, the device service 84 responds with a data object including data objects from the data model (e.g., a metadata data object, a devices data object, a structures data object) based on the request and scopes associated with the access token. Further, in some embodiments the clients 182 may perform a function in addition to displaying the returned data in a page, such as controlling a setting on the API client device based on the data, executing a control action on the API client device based on the data, and the like.

iv. Third-Party Device Data Provisioning and Access

As previously discussed, vendors that do not have direct access to the device services 84 may wish to provide data to the device services 84 for many reasons. For example, vendor data may be useful for reporting by the device services 84 and/or may be used in conditional triggers to control one or more smart devices (e.g., thermostat 10A, detector 10B, and/or device 10C) and/or structures 10D that are under the influence of the device service 84. Further, this data may be accessible by other vendors, who may base control of these or other smart devices based in part upon the provided vendor data.

Further, the device service 84 provider may desire to expand a sensor network within the structure 10D and/or improve device (e.g., 10A-10C) and/or structure 10D reporting and/or control algorithms. Thus, it may be beneficial to take in such data from third-parties (e.g., those who do not have direct access to the device services 84). Accordingly, the API 90 may include support for data provision from these third-parties.

Specifically, the APIs 90 may support the reception of data streams of "events" and/or "time variant data." In one embodiment, the event data may be provided as a named value with a name, timestamp and other data that may be extensible. Event data may be provided upon occurrence of a particular event. For example, event data representative of motion detection may occur when one or more third-party sensors detect motion in the structure 10D.

Time variant data provision may relate to providing an account of data over varying time periods. For example, this data may provide a historical account of particular data values of a third-party sensor. Further details and examples of time variant profiles are described in U.S. Ser. No. 62/061,593, filed Oct. 8, 2014, entitled "Fabric Network," which is incorporated by reference herein in its entirety for all purposes. In some embodiments this may be supplemented with the current data values. For example, re-using the motion detection example discussed above, the time variant data provision may provide a historical account of motion detected by the third party sensor (e.g., motion detected at 5:00, no motion detected at 6:00, etc.).

Figure 15:
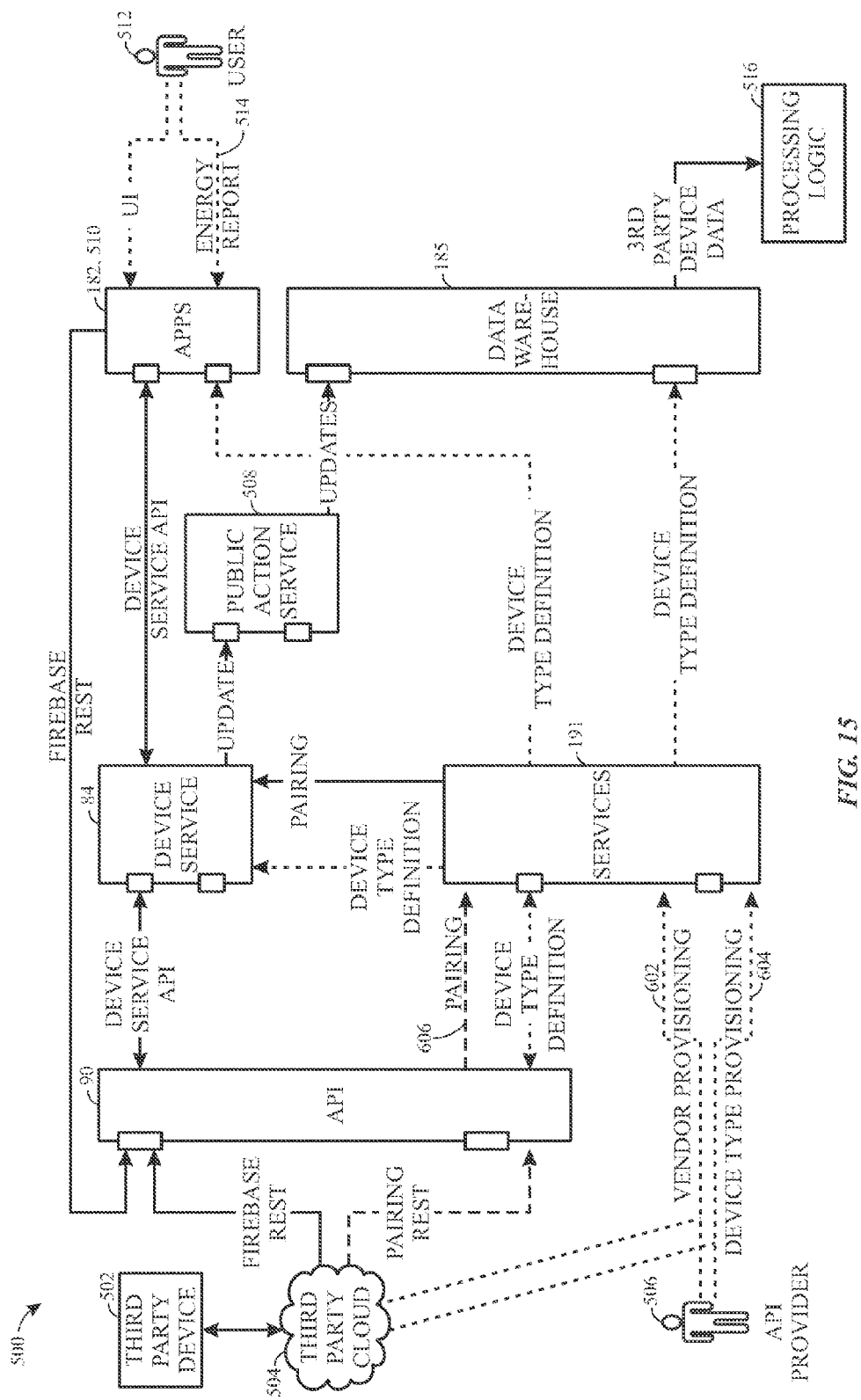
FIG. 15 is a schematic diagram, illustrating a system third-party vendor and device provisioning that enables consumption of third-party device data via the API, in accordance with an embodiment.
Figure 16:
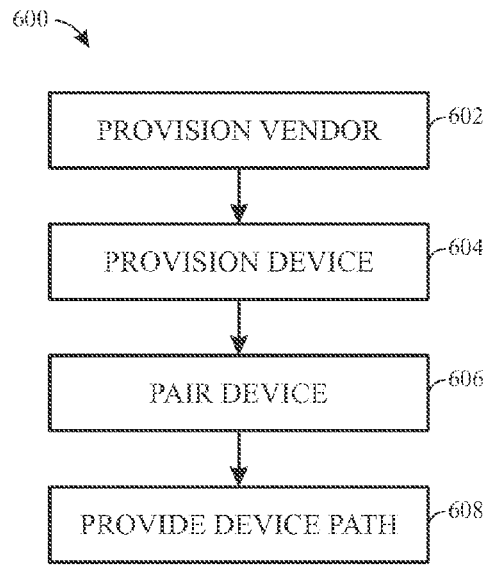
FIG. 16 is a flowchart, illustrating a process for provisioning third-party vendors and third-party devices, such that third-party device data may be consumed via the API, in accordance with an embodiment.
Figure 17:
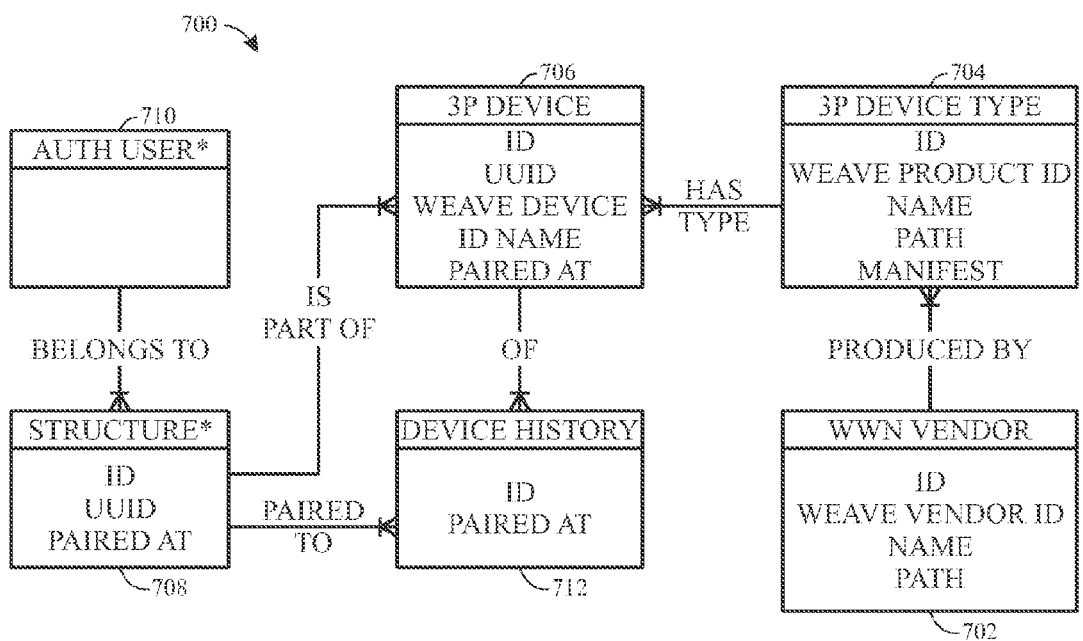
FIG. 17 is a relational diagram, illustrating a relationship of entities stored in the system when provisioning third-parties/third-party devices in the system, in accordance with an embodiment.

FIG. 15 is a schematic diagram, illustrating a third-party vendor and device provisioning system 500 that enables consumption of third-party device data via the API 90, in accordance with an embodiment. FIG. 16 is a flowchart, illustrating a process 600 for provisioning third-party vendors and third-party devices, such that third-party device data may be consumed via the API 90. FIG. 17 is a relational diagram, illustrating a relationship of entities stored in the system 500 when provisioning third-parties/third-party devices 502 in the system 500. For clarity, these FIGS. will be discussed together.

To consume data from a third-party and/or third-party device 502 (e.g., via data sent through a third-party cloud 504 to the API 90), the system 500 may be provided awareness information regarding the third-party (e.g., the "vendor") and/or the third-party devices. This information may be stored in the system 500, in a manner that enables the system 500 to identify and/or classify third-party data that is received. This awareness data (e.g., provisioning data) may be provided, for example, from the third-party and/or third-party device 904 and/or the API 90 provider 506. This provisioning data may be provided to the Services 191, which may include one or more provisioning modules (e.g., portions of machine-readable instructions, implemented on a processor) for provisioning a vendor (block 602) and/or for provisioning a device (block 604).

Vendor Provisioning

Vendors that wish to provide and/or retrieve data to and/or from the system 500 may be provisioned for such data provision and/or retrieval. By utilizing vendor provisioning, administrators of the system 500 may control particular vendors that may interact with the system 500. For example, a vendor may provide a request for interactivity rights with the system 500, which may be sent to the administrators of the system 500. Once the administrators verify that the vendor is legitimate and/or meets interactivity rights eligibility, the administrator may enable the vendor to provide vendor-specific information that may be used to facilitate interactivity with the system 500.

Vendor provisioning (block 602) may begin by submitting, via a provisioning process initiated by the third-party and/or third-party device 502 (e.g., via the third-party cloud 504) and/or by the API provider 506. In the provisioning process, the third-party and/or third-party device 502 and/or by the API provider 506 may provide (e.g., via a web service call) information to populate vendor-specific information (e.g., the vendor entity 702 of FIG. 17, which will be discussed in more detail below) to the services 191. The services 191 may maintain this vendor-specific information, which may be used to tie particular devices with the newly provisioned vendor. Thus, if a request for device provisioning (block 604, which will be described in more detail below) for "Device A" is provided by "Company B," portions of the vendor-specific device information for "Company B" may be tied to device type-specific information for "Device A." For example, as illustrated in FIG. 17, the Device Type Entity 704 has a "Produced By" relationship with the Vendor Entity 702.

Device Provisioning

To consume data from third-parties and/or third-party devices 502. The system 500 may be provided particular information regarding the devices 502. Specifically, a device manifest (e.g., the device manifest section illustrated in the Device Type Entity 704 of FIG. 17) is used to maintain compatibility information regarding the third-party devices 502. Information for the manifest may be provided via the third-party and/or third-party device 502, a third-party cloud 504, and/or the API provider 506 to the services 191. The services 191 may consume this information and create a device type definition for the device 502 being provisioned.

First, build-time profiles for expected third-party device types are defined. These build-time profiles provide a description of particular device capabilities and/or metadata regarding data provided by these devices. For example, profiles may provide data type information, data units, data constraints, etc. These profiles may closely resemble Weave profiles, which are described in more detail in U.S. patent application Ser. No. 13/926,335, filed Jun. 25, 2013, entitled "Efficient Communication for Devices of a Home Network", which is incorporated by reference in its entirety for all purposes. Weave is an application-layer protocol for communicating data. The profiles are defined as protobuf messages using field metadata annotations to describe manifest sections corresponding to a given profile and how the fragment of the data model JSON corresponding to a profile is validated.

A code snippet example of the profile defining protobuf definitions, in accordance with an embodiment, is provided at the end of the detailed description.

Once the profiles are defined, these profiles may be imported and used in subsequent device type manifests, which may be used to describe and/or translate received third-party device 502 data. In embodiments where a profile is compatible with Weave (or other application-layer protocol), an indicator of this compatibility may be provided in the profile (e.g., by providing the compatible Weave (or other application-layer protocol) profile identifier in the profile). Upon release of the profiles, new device type manifests may be created using the released profiles. The device type manifests are runtime artifacts represented by a serialized protocol message and provide device type definitions for the particular third-party device 502 being provisioned.

Below is an example of a third-party device manifest. In particular, the example third-party device manifest is for an Acme brand washer with revision 201410161.0b that provides energy and water resource usage in the supplied units. The device manifest enables the system 500 to understand data that is provided to it via this type of third-party device 502.

```
identification: <
    vendor_description: "Acme",
    product_description: "WSHR1138",
    revision: "201410161.0b",
>,
resource_use: <
    electricty: <
        measure_type: ENERGY
        units: <
        units: <
            base: KILOGRAM
        >
        units: <
            base: METER
            exponent: 2
        >
        units: <
            base: SECOND
            exponent: 2
        >
    >
    description: "Energy consumption in joules"
    source: "power sensor"
    >
    water: <
        measure_type: VOLUME
        units: <
            units: <
                base: METER
                exponent: 3
            >
            exponent: 3
        >
        description: "Water consumption in liters"
        source: "Flowmeter"
        >
    >
```

These device type definitions may be provided to the device service 84, the applications 182 and/or 510, and/or the data warehouse 185, where they may be used to interpret and/or translate data received from the third-party devices 502, as will be discussed in more detail below.

Device Pairing

Once the device type is defined, a device 502 of that type may be paired (block 606). Pairing of third-party devices 502 is essentially registering the device 502 with the system 500, which may aid in the system 500's understanding of data provided by the device 502.

The pairing process includes two basic steps. In one step, the pairing process collects information about the device 502, such as a location (e.g., structure) of the device, a serial number (or other unique identifier) of the device 502, etc. This information may be provided by a user attempting to pair the device 502 (e.g., via a graphical user interface prompt requesting the device-specific information). For example, a pairing request (e.g., a REST message) may be provided to the API 90 from the third-party and/or third-party device 502 and/or the third-party cloud 504. This pairing request may include the device-specific information. The API 90 may transform payload data provided in the pairing request into a format interpretable by the services 191 and may provide the transformed data to the services 191. For example, the API 90 may receive the request in an ISO 8601 format and translate data from the request into an alternative format expected by the services 191.

In a second step, the pairing process determines the device type of the device 502 and ties the device type to the device-specific payload data of the third-party device 502. To do this, the services 191 may retrieve an associated provisioned device type and form a relationship between the device-specific payload data and the associated device type. For example, as illustrated in FIG. 17, during the pairing process, the Device Type entity 704 may be tied to the Device entity 706 (e.g., a "Has Type" relationship). Further, the Device entity 706 may be tied to a particular structure (e.g., an "Is Part Of" relationship). Additionally, historical device pairing information may be stored (e.g., by the Device History entity 712).

Upon registration with the system 500, paired devices are then provided for subsequent distribution by the publication service 508 (e.g., via an update message), which may lead to publication to the data warehouse 185 (e.g., via a second update message).

Providing Device Data

Once the vendor is provisioned (block 602), the device is provisioned (block 604), and the device is paired (block 606), the system 500 is able to receive and interpret third-party and/or third party device 502 data. The third-party and/or third party device 502 and/or the third-party cloud 504 may provide data via a data provision message (e.g., a Firebase and/or REST message) to the API 90.

Upon receiving third-party data, the API 90 may translate the payload into a format interpretable by the device service 84. Upon receiving the translated payload, the device service 84 may retrieve the device type definition for the particular device 502. For example, when the device service 84 starts, it may load all available device type definitions from the services 191. If the device 502 is of a known device type (e.g., has an associated device type definition loaded in the device service 84), the associated device type definition may be used to subsequently translate and/or describe incoming data from the device 502 and/or cloud 504. Occasionally, the device 502 may be of an unknown device type (e.g., has no associated device type definition loaded in the device service 84). For example, a device type may be provisioned after the device service loads all available device type definitions. When the device type is unknown (e.g., has no associated device type definition loaded in the device service 84), the device service 84 may provide a request to the services 191 for a new device type definition associated with the device 502. Upon receiving this new device type definition from the services 191, the new device type definition may be used to translate and/or describe incoming data from the device 502 and/or cloud 504. This device type definition acquisition may occur during pairing of the third-party device 502 and/or as data is received from the third-party device 502 and/or cloud 504

For example, the associated device type definition may be used to describe incoming data from the third-party device 502 and/or third-party cloud 504. The device service 84 may propogate third-party payload data to the applications 182 and/or 510 and/or the publication service 508 (e.g., via a data update message), which may result in the payload data being stored in the data warehouse 185 (e.g., via a second update message). The device type definitions may be provided not only to the device service 84, but also the applications 182 and/or 510, and/or the data warehouse 185, which may enable the payload to be interpreted by each of these entities. For example, accumulated third-party payload data that is stored in the data warehouse 185 may be interpreted using the device type definition, such that an energy report 514 may be provided to the user 512. Further, any other processing logic 516 may use the device type definition to understand the third-party payload data.

Below is an example of a sample third-party device data that conforms to the device manifest example that is provided above. Specifically, the third-party device data represents washer data that provides energy and water usage. As illustrated below, the payload provides time-variant data related to a particular instance (or instances of use) for the washer with 123456789.

```
{
    "identification": {
        "serial_number": "123456789"
    },
    "resource_use": {
        "energy": {
            "value": 50.2,
            "measurement_reset_time": 946684800,
            "measurement_time": 1414794859
        },
        "water": {
            "value": 123.7,
            "measurement_reset_time": 946684800,
            "measurement_time": 1414794859
        }
    }
}
```

Data Entities

Moving now to a more-detailed discussion of data entities useful for third-party data submission, FIG. 17 is a relationship diagram 700, illustrating the relationship between third-party vendor and/or device entities stored in the system 500 to enable third-party data consumption and/or provision. Specifically, the vendor entity 702 represents a third-party entity that sends third-party device data. In some embodiments, access scopes may be based upon a vendor identity. For example, a vendor scope may correspond to an ability to read and write data under a vendor path in the data model. Multiple clients 184 may be associated with one vendor (e.g. third-party 502). The clients 184 may be associated with a vendor entity 702. Accordingly, exchanging an access token granted to a client 184 associated to a vender entity 702 (e.g., either directly or via a developer) may return permissions corresponding to that vendor entity 702. The vendor entity 702 may include a vendor path attribute, which may be unique across all vendor entities 702.

The 3P (third-party) Device type entity 704 represents a class of devices belonging to a single vendor that have the same information payload. Device types are immutable. Accordingly, once the device type metadata is obtained, it can be cached indefinitely. Device types can be versioned. For example, differing data pathways may be provided for device types with different version. Thus, in one embodiment, versioning may be handled, for example, by appending a version to common prefix, for example washer_v1 may relate to a first version of a dishwasher device type and washer_v2 may relate to a second version the dishwasher device type.

Using the vendor entity 702 and the 3P device type entity 704, third party devices may be provisioned (block 604). The 3P device type entity 704 includes a vendor identity attribute that identifies the vendor that the 3P device type entity 704 belongs to.

The 3P device type entity 704 includes a path attribute that may be used to access devices of a particular device type. The path attribute may be unique across all device types for a particular vendor entity 702. Accordingly, device types may be retrieved using a combination of the vendor 702 path with the 3P device type 704 path.

Further, the device type entity 704 contains a serialized device manifest field that describes device metadata and payload for the particular device type represented by the 3P device type entity 704.

The 3P (third-party) device entities 706 are created upon a first pairing of the device 502 (block 606) with the API 90 and/or device service 84. The device entity 706 represents an identifiable entity (e.g., a device) that produces data conforming to a given device type. For example, the device entity 706 might represent a particular dishwasher that conforms to the washer_v2 device type.

As discussed above, devices are associated with particular structure entities 708. The device entity 706 is paired with the structure entities 708, which is associated with a user entity 710. Further, a device history entity 712 (e.g., a data table) stores a history of pairings between the device entity 706 and the structure entity 708.

Pairing of the third-party device 502 may be triggered by providing a POST request to the API 90 at the path /devices/<vendor_path>/<device_type_path> with a post body containing the third-party device payload. Below is an example of such a post body.

POST request Body for Device Pairing

```
{
"identification": {
"serial_number": "abcdefgh",
...
},
"location": {
"structure_id":
"VqFabWH21nwVyd4RWgJgNb292wa7hG_dUwo2i2SG7j3BOLY0-BA4sw",
...
},
... // other profiles
}
```

As illustrated, the payload provided in the post body may include device-identifying information, such as a serial number (e.g., identification/serial_number) and/or a structure identifier (e.g., location/structure_id) of the structure associated with the device. The device-identifying information may be used to uniquely identify a device of a particular type for a particular vendor, while the structure identifier may indicate which structure the device should be paired to.

In some embodiments, these fields may be required in order to successfully pair with the API 90 and/or device service 84.

In the device services 84, each of the paired third-party devices 502 may be stored in a "Third-Party Device" portion of the data model (e.g., a specially designated portion of the data model for third-party devices 502). These devices 502 may be provisioned at runtime, thus enabling introduction of new third-party device pairings without requiring new service stack releases.

When pairing completes successfully, the services 191 may provide a newly-assigned internal identifier for this third-party device 502. The device service 84 may then insert this internal identifier into the original payload (e.g., the POST request body) and return the result. Below is an example of the payload with added internal identifier.

| Returned Payload after Pairing |
|---|
| {<br>"identification": {<br>"device_id": "peyiJNo0IldT2YlIVtYaGQ",<br>"serial_number": "abcdefgh",<br>...<br>},<br>"location": {<br>"structure_id":<br>"VqFabWH21nwVyd4RWgJgNb292wa7hG_dUwo2i2SG7j3BOLY0-BA4sw",<br>...<br>},<br>... // other profiles<br>} |

Accordingly, the system 500 may now use and/or store device information from the third-party devices 502. Thus, device data may then be provided to the device services (block 608) from these devices 502. Further, upon proper validation of a third-party and/or third-party device 502, a third-party application 182 and/or an application 510 of the API provider 506 may be used to provide this data to a user 512.

When devices 502 are no longer in use (or data is no longer provided to the system 500), they may be unpaired from the system 500. To do this, a DELETE request to the API 90 at the path /devices/<vendor>/<device_type>/<device_id>. In some embodiments, the internal device identifier is obfuscated during the pairing process. In such embodiments, the path point <device_id> may refer to the obfuscated device identifier. Based upon this DELETE request, the API 90 may request the services 191 to delete the identified device 502. When the services 191 complete the unpairing successfully, the services 191 return a success indication to the API 90, which returns a similar indication.

The discussion now turns to a more detailed look at how the system 500 consumes and/or presents third-party data. As mentioned above, access permissions to read and/or write to the data model may be defined using a path leading to devices and/or structures. To enable definition of permissions for specific vendors, the path may include an intermediate reference to the particular vendor. For example, the devices attribute may include a sub-attribute named "vendor" or "vendor_path" followed by the third-party vendor devices. Accordingly, the path to the third-party vendor devices may include a vendor field, allowing particular permissions to be provided for a particular third-party vendor.

The API 90 may receive a request to read and/or write data to the data model of the device service 84 and may then request authentication rights (e.g., from the services 191). Upon verifying the authentication rights, the API 90 may provide the vendor, device type, and/or device identifier path elements to construct a corresponding device service 84 read and/or write request that it provides to the device service 84.

The device service 84 may validate the received request. Upon validation, the request may be processed, resulting in the read and/or write to the data model.

v. Third-Party Insight Data Provision and Access

In some embodiments, a third-party vendor may desire to provide additional data to the system 500. For example, the vendor may wish to provide a stream of data relating to particular logs and/or metrics. To do this, the third-party may provide a stream descriptor, which describes the particular data that will be provided to the system 500. Then, the vendor may provide data in a format corresponding to the stream descriptor, noting the association with the stream descriptor.

Discussing first the stream descriptors, the stream descriptors provide a description of any stream data that a third-party wishes to post. Below is an example of stream descriptor for amp and watt measurements that may be provided via a subsequent data stream.

| Metric Stream Descriptor |
|---|
| {<br>"metric_stream_descriptor": {<br>    "version": 1 // version number<br>    "description": "energy measurements", // a human readable description of the stream<br>    "fields": [ // a list of fields in a stream<br>        {<br>        "description": "current", // a human readable description of the field<br>        "relative": true, // whether measurements are absolute or relative to the preceding sample<br>        "exponent": 1, // scaling (in base 10) for the measurement<br>        "logical_minimum": 0, // expected minimum for any sample. Need details on diff between this and physical<br>        "logical_maximum": 100, // expected maximum for any sample.<br>        "physical_minimum": 0,<br>        "physical_maximum": 1000, |

| Metric Stream Descriptor |
|---|
| ```
            "units": { // an object describing the units for samples in this field
                    "system": "si", // this or english
                    "description": "Amps", // human readable description
                    "unit_composition": [
                    {"quantity": "current", "exponent": 1
                    }
                    ]
            }
    },
    {
    "description": "Watts",
    "relative": true,
    "exponent": 1,
    "logical_minum": 0,
    "logical_maximum": 100,
    "physical_minimum": 0,
    "physical_maximum": 1000,
    "units": {
            "system": "si",
            "description": "watts",
            "unit_composition": [ // a more complicated example representing kg *
            m^2/s^3
                    {"quantity": "mass",
                    "exponent": 1
                    },
                    {"quantity": "length",
                    "exponent": 2
                    },
                    {"quantity": "time",
                    "exponent": -3
                    }
            ]
        }
    }
    ]
}
}
``` |

Additionally, state information regarding a device may be described and provided by a third-party vendor. Below is a state-based stream descriptor.

```
{
    "state_stream_descriptor": {
            "version": 1 // currently this should always be 1
            "description": "smoke detector states", // a human readable description of
            the stream
            "fields": [ // a list of fields in a stream
                    {
                            "description": "smoke", // a human readable description of
                            the field
                            "states": [
                                    {
                                    "name": "all clear",
                                    "description": "state when acceptable levels of
                                    smoke are detected"
                                    "value": 0
                                    },
                                    {
                                    "name": "heads up 1",
                                    "description": "first gentle alert on smoke"
                                    "value": 1
                                    },
                                    {
                                    "name": "heads up 2",
                                    "description": "more urgent alert"
                                    "value": 2
                                    },
                                    {
                                    "name": "heads up 3",
                                    "description": ""
                                    "value": 2
                                    }
                            ],
```

```
{
    "description": "co", // a human readable description
    of the field
    "states": [
        {
            "name": "all clear",
            "description": "state when acceptable levels of coare
            detected"
            "value": 0
        },
        {
            "name": "heads up 1",
            "description": "first gentle alert on co"
            "value": 1
        },
        {
            "name": "heads up 2",
            "description": "more urgent alert"
            "value": 2
        },
        {
            "name": "heads up 3",
            "description": ""
            "value": 2
        }
    ]
}
}
```

In creating the descriptors, the vendor may determine and indicate whether the descriptor is for public or private use. Public descriptors can be used by other developers, while private descriptors may only be used by the creating vendor. Accordingly, when the API 90 provider desires, it can create public descriptors for third-party vendors to use, especially when the API 90 provider has particular information it would like to collect from third-parties (e.g., energy usage, motion events, carbon-monoxide states, etc.).

Upon completion of the creation of the stream descriptors, the developers may provide the descriptor to the API 90, which may return a descriptor identifier. To post data, the third-party vendor may provide the data-stream in accordance with the format provided in the descriptor, along with the descriptor identity provided from the API 90. Below is an example of data posted via a described data stream.

```
{
    "stream": {
        "descriptor": {
            "developer": 1240985,
            "id": 1240958
        }
        "source": {
            "manufacturer": "Nest",
            "type": "D2A",
            "id": 1240958098,
            "qualifier": "the thermostat"
        }
        "data": [
            [12098650986098, 5.60986, 1.23498],
            [12098650986099, 5.60986, 1.23498],
            [12098650986100, 5.60986, 1.23498],
            [12098650986101, 5.60986, 1.23498],
            [12098650986102, 5.60986, 1.23498],
            [12098650986103, 5.60986, 1.23498],
            [12098650986104, 5.60986, 1.23498],
            [12098650986105, 5.60986, 1.23498]
        ]
    }
}
``` vi. Third-Party Activity Monitoring

As more third-parties utilize the API 90 to communicate with and/or control the system 180, it may become increasingly beneficial to monitor third-party activities.

Tracking API 90 activities may be desirable to determine a particular responsible party for data reads and/or writes of the device service 84 data model. The API 90 activity log may transparently capture both read and/or write operations that propagate from the API 90 on behalf of the clients 182 and/or the client 182 vendors.

Multiple levels of granularity may be used to track these data reads and/or writes. For example, activity logging logic (e.g., machine instructions implemented on a processor-based computer system) may track modifications and/or access to the data model at the devices level, the structure level, and/or an overall shared data level.

Below is an example of a JSON structure for an activity log. In some embodiments, the activity log data is provided based upon a particular account (e.g., at an account and/or user level).

| Activity Log JSON Example |
|---|
| Top Level |
| { |
|   "sessions" : [<SessionDetails>] |
| } |
| SessionDetails: |
| { |
|   "client_id": <number>, |
|   "session_id": <string>, |
|   "events": [<EventSpecification>] |
| } |
| EventSpecification: |
| { |
|   "action": "put"/"subscribe", |
|   "action_targets": [<ActionTarget>], |
|   "timestamp": <number: timestamp in ms, when modification took place>, |
| } |

Activity Log JSON Example

```
ActionTarget
{
    "bucket_name": <full bucket name>,
    "type": "merge/overwrite" (put only),
    "value": <json values that were put>, (put only)
    "oldvalue": <full object response json, pre-put> (put, overwrite only)
    "structure_name": <name field out of containing structure bucket>,
    "structure_id": <structure identifier>,
    "where_id": string (device/shared only, both put/subscribe),
    "where_name": <name from where bucket matching where_id>
    (device/shared only, both put/subscribe),
    "label": <string from shared bucket> (device/shared only, both
    put/subscribe)
}
```

In certain embodiments, the "sessions" element at the top level is an array maintained in sorted order by timestamp. When data from the activity log is to be read, the number of returned events may be reduced, by returning only events that have occurred within a certain time period (e.g., the last 5, 7, 10, 15 days, etc.). In some embodiments, this time period may be configured using a parameter (e.g., in the read call, etc.).

The "events" are an array of events (e.g., "put" and/or data "subscribe" events) that may be a combination of actions (e.g. "action_targets") and the time in which the actions happened. As illustrated in the example above, much event metadata may be captured. For example, "bucket_name" may represent a particular location where the event occurred. "Type" may refer to a particular event type (e.g., merge and/or overwrite for "put" activities). "Value" may refer to a new value that has been written via a "put" activity and "oldvalue" may refer to the data that existed prior to the "put". Structure information corresponding to the activity may also be stored (e.g., the structure name and/or identifier. Further, "where" information that describes a more granular location within the structure may be provided (e.g., a "where" identifiers and/or name).

The "SessionDetails" may include a client 182 identifier, a session identifier, and the events performed during the session. Accordingly, the activity logging logic may be used to obtain a particular client (e.g. "client_id") responsible for performing a particular action (e.g., a put and/or subscribe event).

In one embodiment, activity logs may be used by the API 90 vendor to determine when API 90 activities have caused changes to smart devices (e.g., thermostats 10A, detectors 10B, and/or other smart devices 10C). For example, when unexpected target temperature changes occur at a thermostat 10A, the activity logs may be used to discern if a third-party is responsible for the change.

Further, in some embodiments, one or more third-party vendors may be provided access to the activity logs. The activity logs may help the third-party vendors to understand how their client applications are effecting the environment 30. In some embodiments, the third-party vendors may access activity log entries for actions and/or events caused by all vendors. In alternative embodiments, the third-party vendors may have access to only the actions and/or events caused by that particular third-party vendor.

Below is a code snippet example of the profile defining protobuf definitions, in accordance with an embodiment.

```
Device definition
// Device message is a union of all supported profiles.
// Device manifest is an instance of this type.
message Device {
    // Required profiles.
    optional IdentificationProfile identification = 1 [ (field_metadata) = {
        api_required: TRUE
        manifest_required: true
    }];
    optional LocationProfile location = 2 [ (field_metadata) = {
        api_required: TRUE
        manifest_required: true
    }];
    optional SoftwareProfile software = 3 [ (field_metadata) = {
        api_required: TRUE
        manifest_required: true
    }];
    // Optional profiles.
    optional ResourceUseProfile resource_use = 256 [ (field_metadata) = {
        api_required: MANIFEST
    }];
}
Primary profiles definition
message IdentificationProfile {
    // some metadata (not provided) may annotate fields generated by public API
    optional string device_id = 1 [ (field_metadata) = {
    }];
    optional uint64 node_identifier = 2 [ (field_metadata) = {
        weave_tag_ kind: CORE
        weave_tag_number: 0x0001
        api_writable: TRUE
    }];
    optional string serial_number = 3 [ (field_metadata) = {
        weave_tag_ kind: CORE
        weave_tag_number: 0x0007
        api_required: TRUE
    }];
```

```
    optional uint32 vendor_id = 4 [ (field_metadata) = {
        weave_tag_kind: CORE
        weave_tag_number: 0x0002
        manifest_required: true
    }];
    optional string vendor_description = 5 [ (field_metadata) = {
        weave_tag_kind: CORE
        weave_tag_number: 0x0003
        manifest_writable: true
    }];
    optional uint32 product_id = 6 [ (field_metadata) = {
        weave_tag_kind: CORE
        weave_tag_number: 0x0004
        manifest_required: true
    }];
    optional string product_description = 7 [ (field_metadata) = {
        weave_tag_kind: CORE
        weave_tag_number: 0x0005
        manifest_writable: true
    }];
    optional string revision = 8 [ (field_metadata) = {
        weave_tag_kind: CORE
        weave_tag_number: 0x0006
        manifest_writable: true
    }];
}
message LocationProfile {
    optional string structure_id = 1 [ (field_metadata) = {
        weave_tag_kind: CORE
        weave_tag_number: 0x000A
        api_required: TRUE
        validation: {
            orderly: {
                prefix: "string"
                suffix: "/[af09]{8}[af09]{4 }[af09]{4 }[af09]{4}[af09]{12 }/"
            }
        }
    }];
}
message SoftwareProfile {
    optional string version = 1 [ (field_metadata) = {
        weave_tag_kind: CORE
        weave_tag_number: 0x000B
        api_required: TRUE
    }];
    optional int64 update_time = 2 [ (field_metadata )= {
        weave_tag_kind: CORE
        weave_tag_number: 0x000C
        api_writable: TRUE
    }];
    optional string description = 3 [ (field_metadata) = {
        weave_tag_kind: CORE
        weave_tag_number: 0x000D
        api_writable: TRUE
    }];
}
Resource use profile definition
message ResourceUseProfile {
    message ResourceUse {
        enum MeasureType {
            // removed for brevity
        }
        message Units {
            message Unit {
                enum BaseUnit {
                    // removed for brevity
                }
                optional BaseUnit base = 1 [ (field_metadata) = { weave_type: UINT_1
                    weave_tag_number: 0x16
                }];
```

```
                // Exponent applied to the base unit.
                // For example hertz would have an exponent value of -1.
                optional int32 exponent = 2 [ (field_metadata) = {
                    weave_type: SINT_1
                    weave_tag_number: 0x17
                }];
            }
            repeated Unit units = 1 [ (field_metadata) = {
                weave_tag_number: 0x15
            }];
            // SI prefix indicated decadic multiple or fraction of the unit
            // For example millimeters would have an exponent value of 3.
            optional int32 prefix_exponent = 2 [ (field_metadata) = {
                weave_type: SINT_1
                weave_tag_number: 0x17
            }];
            optional string description = 3 [ (field_metadata) = {
                weave_tag_number: 0x09
            }];
        }
        // Measure type
        required MeasureType measure_type = 1 [ (field_metadata) = {
            weave_type: UINT_2
            weave_tag_number: 0x06
        }];
        // Measure units
        optional Units units = 2 [ (field_metadata) = {
            weave_tag_number: 0x13
        }];
        // Resource description
        optional string description = 3 [ (field_metadata) = {
            weave_tag_number: 0x09
        }];
        // Data source, this field is intentionally left as a free form
        optional string source = 4;
        // Measured value
        optional double value = 5 [ (field_metadata) = {
            weave_tag_number: 0x1E
            api_required: true
        }];
        // When was the last reset of the measured value, seconds since UNIX Epoch
        optional uint64 measurement_reset_time = 6 [ (field_metadata) = {
            weave_tag_number: 0x1F
            api_required: true
        }];
        // Measurement time, seconds since UNIX epoch
        optional uint64 measurement_time = 7 [ (field_metadata) = {
            api_required: true
        }];
    };
    optional ResourceUse electricity = 1 [ (field_metadata) = {
        api_required: MANIFEST
    }];
    optional ResourceUse gas = 2 [ (field_metadata) = {
        api_required: MANIFEST
    }];
    optional ResourceUse water = 3 [ (field_metadata) = {
        api_required: MANIFEST
    }];
}
Metadata
// Field metadata
message FieldMetadata {
    // Weave types
    enum WeaveType {
        // (portions removed for brevity)
    }
    // Weave tags
    enum WeaveTagKind {
        ANONYMOUS = 0 [ (weave_tag_metadata) = {
            tag_control: 0x0
        }];
        CONTEXT = 1 [ (weave_tag_metadata) = {
            tag_control: 0x1
        }];
        CORE = 2 [ (weave_tag_metadata) = {
            tag_control: 0x2
            tag_control: 0x3
        }];
```

-continued

```
            FULLY_QUALIFIED = 4 [ (weave_tag_metadata) = {
                tag_control: 0x6
                tag_control: 0x7
            }];
        }
        enum ApiSemantics {
            // Field is not writable
            FALSE = 1;
            // Field is writable if present in manifest
            MANIFEST = 2;
            // Field is writable
            TRUE = 3;
        }
        // Weave type; defaults to a type derived from proto field type
        // double => FLOAT_8
        // float => FLOAT_4
        // int32, sint32, sfixed32 => SINT_4
        // int64, sint64, sfixed64 => SINT_8
        // uint32, fixed32 => UINT_4
        // uint64, fixed64 => UNIT_8
        // bool => BOOLEEN
        // string => STRING
        // bytes => BYTES
        // Enum type => may be accompanied by weave_type and/or explicit validation
        // Message type => STRUCTURE
        optional WeaveType weave_type = 1;
        // Weave tag kind
        optional WeaveTagKind weave_tag_kind = 2 [ default = CONTEXT];
        // Weave Profile Id, used to annotate top level device fields as profiles
        // and with fully qualified tags
        optional uint64 weave_profile_id = 3;
        // Weave tag number
        optional uint32 weave_tag_ number = 4;
        // Validation applied to the field both at manifest creation time and
        // update validation time
        optional Validation validation = 5;
        // Allow updating field in the payload, api required fields are api writable
        optional ApiSemantics api_writable = 6;
        // Require updating field in the payload
        optional ApiSemantics api_required = 7;
        // Allow setting field in the manifest
        optional bool manifest_writable = 8 [ default = true ];
        // Require setting field in the manifest
        optional bool manifest_required = 9;
    }
    Validation
    // Describes how a field is validated, the only supported validation
    message Validation {
        // Describes Orderly validation statement
        // See http:orderlyjson.org/docs for Orderly details
        message OrderlyValidation {
            // Anything that goes before the field name in Orderly, aka definition
            // prefix; includes type and range
            optional string prefix = 1;
            // Anything that goes after the field name in Orderly, aka definition
            // suffix; includes enum values
            optional string suffix = 2;
        }
        optional Orderly Validation orderly = 1;
    }
}
```

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A processor-implemented method, comprising:
provisioning vendor information to associate rights to access and write vendor data of a data model comprising information related to one or more smart-devices, one or more smart-device environment structures comprising the one or more smart-devices, or any combination thereof with a vendor;
provisioning a particular electronic device type of the vendor, for a particular electronic device, by providing compatibility information about the particular electronic device type to a service that interprets the compatibility information to understand subsequent data submissions of the particular electronic device, the provisioning of the particular electronic device type being associated with the vendor by associating the particular electronic device type with the provisioned vendor information;
provisioning the particular electronic device, comprising:
accessing one or more build-time profiles for the particular electronic device that provide a description of capabilities of the particular electronic device, metadata related to data provided by the particular electronic device, or both; and using the one or more build-time profiles to understand the subsequent data submissions of the particular electronic device, by importing the one or more build-time profiles to the service and generating one or more device type manifests that are used to describe, translate, validate, or any combination thereof, the subsequent data submissions and any other data submissions by other devices having a device type in common with the particular electronic device;

pairing the particular electronic device with a system hosting the data model by registering the particular electronic device with the system hosting the data model by associating the particular electronic device with the provisioned particular electronic device type; and sending the subsequent data submissions from the one or more smart-devices to the service after the particular electronic device is registered with the system hosting the data model.

2. The processor-implemented method of claim 1, wherein provisioning the vendor comprises:

sending, receiving, or both a request from a vendor cloud or a vendor device to interact with the system hosting the data model;

sending, receiving, or both an identification of the vendor; and upon approval of the request, generating an entry for the vendor in a vendor entity of a service tracking the vendor data access rights, vendor data writing rights, or both.

3. The processor-implemented method of claim 2, comprising:

associating an application-layer protocol vendor identifier with the vendor by populating an application-layer protocol vendor identifier field in the entry of the vendor entity;

associating a vendor path with the vendor by populating a path field in the entry of the vendor entity;

associating a name with the vendor by populating a name field in the entry of the vendor entity; or any combination thereof.

4. The processor-implemented method of claim 1, comprising:

generating an entry for the device type of the particular electronic device in a device type entity.

5. The processor-implemented method of claim 4, wherein provisioning the particular electronic device comprises:

associating the one or more device type manifests with the device type by populating a manifest field in the entry of the device type entity.

6. The processor-implemented method of claim 4, wherein provisioning the particular electronic device comprises:

associating a path of the device type with the device type by populating a path field in the entry of the device type entity.

7. The processor-implemented method of claim 4, wherein provisioning the particular electronic device comprises:

if the device type is compatible with an application-layer protocol, associating application-layer protocol compatibility information of the device type with the device type by populating an application-layer protocol profile identifier in the entry of the device type entity.

8. The processor-implemented method of claim 1, wherein pairing the particular electronic device comprises:

generating an entry for the particular electronic device in a device entity of the system hosting the data model;

receiving a location of the particular electronic device, a unique identifier of the particular electronic device, or both; and associating the location, the unique identifier, or both with the particular electronic device in the system hosting the data model by populating one or more fields in the entry of the device entity.

9. The processor-implemented method of claim 8, if the particular electronic device is compatible with an application-layer protocol, associating application-layer protocol information of the device with the device by populating an application-layer protocol identifier in the entry of the device entity.

10. The processor-implemented method of claim 8, comprising:

associating the particular electronic device with a smart-device environment structure housing the particular electronic device by populating a pairing status field of the device entity with an identifier of the smart-device environment structure housing the particular electronic device.

11. The processor-implemented method of claim 1, comprising:

generating an entry for at least one of the smart-device environment structures in a structure entity, wherein the entry for the smart-device environment comprises a unique identifier and an indication of devices paired to the smart-device environment; or generating an authorized user entry in an authorized user entity, the authorized user entry representative of a user associated with the smart-device environment structure; and associating the authorized user entity with the structure entity; or both.

12. The processor-implemented method of claim 1, comprising:

each time an electronic device is paired, generating a pairing history entry in a device history entity, the pairing history entry noting a pairing of the electronic device with at least one of the smart-device environment structures.

13. A system, comprising:

a processor; and memory, comprising instructions executable by the processor to configure the processor to:

provision vendor information to associate rights to access and write vendor data of a data model comprising information related to one or more smart-devices, one or more smart-device environment structures comprising the one or more smart-devices, or any combination thereof with a vendor;

provision a particular electronic device type of the vendor, by providing compatibility information about the particular electronic device type to a service that interprets the compatibility information to understand subsequent data submissions of the particular electronic device, the provisioning of the particular electronic device type being associated with the vendor by associating the particular electronic device type with the provisioned vendor information;
provision the particular electronic device by:
accessing one or more build-time profiles for the particular electronic device that provide a description of capabilities of the particular electronic device, metadata related to data provided by the particular electronic device, or both; and
using the one or more build-time profiles to understand the subsequent data submissions of the particular electronic device, by importing the one or more build-time profiles to the service and generating one or more device type manifests that are used to describe, translate, validate, or any combination thereof, the subsequent data submissions and any other data submissions by other devices having a device type in common with the particular electronic device;
pair the particular electronic device with a system hosting the data model by registering the particular electronic device with the system hosting the data model by associating the particular electronic device with the provisioned particular electronic device type; and
send the subsequent data submissions from the one or more smart-devices to the service after the particular electronic device is registered with the system hosting the data model.

14. The system of claim 13, comprising:
the particular electronic device that comprises the processor; and
an application programming interface (API);
wherein the processor is configured to provide a pairing message to the API, wherein the pairing message comprises a request to pair to the system, such that authorized data requests, submissions, or both are registered with the data model; and
wherein the API is configured to receive the pairing message in a first format and convert the pairing message into a second format expected by downstream services of the system.

15. The system of claim 14, comprising the downstream services, wherein:
the downstream services are configured to retrieve an associated device type based upon the device type provisioning, wherein the associated device type provides a manifest comprising compatibility information between an API client electronic device and the system; and
the system is configured to:
retrieve the authorized data requests, submissions, or both from the API client electronic device via the API and interpret the authorized data requests, submissions, or both using at least the manifest; and
process the authorized data requests, submissions, or both using the data model.

16. The system of claim 13, wherein the instructions to pair the particular electronic device are executable by the processor to:
generate an entry for the particular electronic device in a device entity of the system hosting the data model;
receive a location of the particular electronic device, a unique identifier of the particular electronic device, or both; and
associate the location, the unique identifier, or both with the particular electronic device in the system hosting the data model by populating one or more fields in the entry of the device entity.

17. A tangible, non-transitory, machine-readable medium, comprising machine-readable instructions to:
provision vendor information to associate rights to access and write vendor data of a data model comprising information related to one or more smart-devices, one or more smart-device environment structures comprising the one or more smart-devices, or any combination thereof with a vendor;
provision a particular electronic device type of the vendor, for a particular electronic device, by providing compatibility information about the particular electronic device type to a service that interprets the compatibility information to understand subsequent data submissions of the particular electronic device, wherein the provisioning of the particular electronic device type being associated with the vendor by associating the particular electronic device type with the provisioned vendor information;
provision the particular electronic device by:
accessing one or more build-time profiles for the particular electronic device that provide a description of capabilities of the particular electronic device, metadata related to data provided by the particular electronic device, or both; and
using the one or more build-time profiles to understand the subsequent data submissions of the particular electronic device, by importing the one or more build-time profiles to the service and generating one or more device type manifests that are used to describe, translate, validate, or any combination thereof, the subsequent data submissions and any other data submissions by other devices having a device type in common with the particular electronic device;
pair the particular electronic device with a system hosting the data model by registering the particular electronic device with the system hosting the data model by associating the particular electronic device with the provisioned particular electronic device type; and
send the subsequent data submissions from the one or more smart-devices to the service after the particular electronic device is registered with the system hosting the data model.

18. The machine-readable medium of claim 17, comprising instructions to provision the vendor by:
generating a vendor entry in a vendor entity, the vendor entity comprising an identification field, an application-layer protocol vendor identification field storing application-layer protocol compatibility data, a name field storing the name of the vendor, and a path field.

19. The machine-readable medium of claim 17, comprising instructions to provision the particular electronic device type by:
generating a device type entry in a device type entity, the device type entity comprising a device type identification field, an application-layer protocol product identification field storing application-layer protocol compatibility data for the device type entry, a name field storing a name of the device type entry, and a manifest field storing a device type manifest.

20. The machine-readable medium of claim 17, comprising instructions to pair a pairing device, by:

generating a device entry in a device entity, the device entity comprising a device identification field, an application-layer protocol device identification field storing application-layer protocol compatibility data for the device entry, a name field storing a name of the device entry, and a paired at field storing an indication of a structure where the device is hosted.

\* \* \* \* \*

UNITED STATES PATENT AND TRADEMARK OFFICE
CERTIFICATE OF CORRECTION

PATENT NO. : 9,854,386 B2  
APPLICATION NO. : 14/722012  
DATED : December 26, 2017  
INVENTOR(S) : Igor Karp It is certified that error appears in the above-identified patent and that said Letters Patent is hereby corrected as shown below:

In the Claims

Column 90, Line 18, Claim 17, after "device," before "the" delete "wherein"

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*